United States Patent
Sun et al.

(10) Patent No.: US 10,173,359 B2
(45) Date of Patent: Jan. 8, 2019

(54) MULTI-LAYER TUBE AND PROCESS OF MAKING THE SAME

(71) Applicant: Berry Plastics Corporation, Evansville, IN (US)

(72) Inventors: David Dezhou Sun, Evansville, IN (US); Philip A Driskill, Newburgh, IN (US); Jeffrey C Minnette, Evansville, IN (US); Birju A Surti, Ronks, PA (US); Jonathan K Williams, Lancaster, PA (US); Tony Cain, Spottsville, KY (US); Diane E Marret, Newburgh, IN (US); Jared B Waterman, Evansville, IN (US); Dan L Mackey, Henderson, KY (US); Debra R Wilson, Houston, TX (US); Timothy S Ponrathnam, Evansville, IN (US)

(73) Assignee: Berry Plastics Corporation, Evansville, IN (US)

( * ) Notice: Subject to any disclaimer, the term of this patent is extended or adjusted under 35 U.S.C. 154(b) by 282 days.

(21) Appl. No.: 15/061,005

(22) Filed: Mar. 4, 2016

(65) Prior Publication Data

US 2016/0257030 A1 Sep. 8, 2016

Related U.S. Application Data

(60) Provisional application No. 62/279,177, filed on Jan. 15, 2016, provisional application No. 62/128,195, filed on Mar. 4, 2015.

(51) Int. Cl.
*B29B 11/14* (2006.01)
*B29B 11/10* (2006.01)
(Continued)

(52) U.S. Cl.
CPC .......... *B29C 49/0073* (2013.01); *B29B 11/14* (2013.01); *B29C 47/0054* (2013.01);
(Continued)

(58) Field of Classification Search
CPC ............ B29C 49/0073; B29C 47/0054; B29C 47/068; B29C 49/22; B29C 49/04;
(Continued)

(56) References Cited

U.S. PATENT DOCUMENTS 3,221,954 A 12/1965 Lux
3,290,198 A 12/1966 Lux
(Continued)

FOREIGN PATENT DOCUMENTS

CN 1484602 3/2004
CN 1984763 6/2007
(Continued)

OTHER PUBLICATIONS

Unilever Launches Breakthrough Packaging Technology That Uses 15% Less Plastic, Unilever (Apr. 24, 2014), http://www.unilever.com/mediacentre/pressreleases/2014/Unileverlaunchesbreakthroughpackagingtechnolgythatuses15lessplastics.aspx (2 pages).
(Continued)

*Primary Examiner* — Nahida Sultana
(74) *Attorney, Agent, or Firm* — Barnes & Thornburg LLP

(57) ABSTRACT

A vessel is configured to hold a product in an interior region formed in the vessel. The vessel includes an inner layer arranged to define the interior region and an outer layer. The vessel is formed using a blow-molding process in which a multi-layer parison is blow molded to form the vessel. The multi-layer parison is formed in an extrusion process in
(Continued)

which a number of extruders are arranged to co-extrude associated inner and outer parisons to establish the multi-layer parison.

27 Claims, 22 Drawing Sheets

(51) Int. Cl.

| | | |
|---|---|---|
| B29C 47/06 | (2006.01) | |
| B29C 49/00 | (2006.01) | |
| B29C 49/04 | (2006.01) | |
| B29C 49/22 | (2006.01) | |
| B65D 81/38 | (2006.01) | |
| C08J 9/06 | (2006.01) | |
| C08J 9/12 | (2006.01) | |
| B32B 5/20 | (2006.01) | |
| B32B 1/02 | (2006.01) | |
| B32B 1/00 | (2006.01) | |
| B65D 1/02 | (2006.01) | |
| B65D 1/12 | (2006.01) | |
| B29C 47/00 | (2006.01) | |
| B32B 7/02 | (2006.01) | |
| B32B 27/08 | (2006.01) | |
| B32B 27/30 | (2006.01) | |
| B32B 27/32 | (2006.01) | |
| B29K 23/00 | (2006.01) | |
| B29L 31/00 | (2006.01) | |
| B29K 105/00 | (2006.01) | |
| B29K 105/12 | (2006.01) | |
| B29K 223/00 | (2006.01) | |
| B29L 23/00 | (2006.01) | |
| B29C 47/56 | (2006.01) | |
| B29K 105/04 | (2006.01) | |
| B29C 49/48 | (2006.01) | |
| B29C 49/62 | (2006.01) | |
| B29L 9/00 | (2006.01) | |

(52) U.S. Cl.
CPC .......... *B29C 47/065* (2013.01); *B29C 47/068* (2013.01); *B29C 49/04* (2013.01); *B29C 49/22* (2013.01); *B32B 1/00* (2013.01); *B32B 1/02* (2013.01); *B32B 5/20* (2013.01); *B32B 7/02* (2013.01); *B32B 27/08* (2013.01); *B32B 27/306* (2013.01); *B32B 27/32* (2013.01); *B65D 1/0215* (2013.01); *B65D 1/12* (2013.01); *B65D 81/38* (2013.01); *B65D 81/3846* (2013.01); *C08J 9/06* (2013.01); *C08J 9/122* (2013.01); *B29B 11/10* (2013.01); *B29B 2911/14053* (2013.01); *B29B 2911/14066* (2013.01); *B29B 2911/14093* (2013.01); *B29B 2911/14173* (2013.01); *B29C 47/005* (2013.01); *B29C 47/0023* (2013.01); *B29C 47/56* (2013.01); *B29C 49/48* (2013.01); *B29C 2049/627* (2013.01); *B29K 2023/065* (2013.01); *B29K 2023/0633* (2013.01); *B29K 2105/0005* (2013.01); *B29K 2105/0058* (2013.01); *B29K 2105/04* (2013.01); *B29K 2105/12* (2013.01); *B29K 2223/00* (2013.01); *B29K 2995/0063* (2013.01); *B29L 2009/001* (2013.01); *B29L 2023/00* (2013.01); *B29L 2031/712* (2013.01); *B29L 2031/7158* (2013.01); *B32B 2250/242* (2013.01); *B32B 2250/246* (2013.01); *B32B 2262/0253* (2013.01); *B32B 2262/14* (2013.01); *B32B 2270/00* (2013.01); *B32B 2307/4026* (2013.01); *B32B 2307/71* (2013.01); *B32B 2307/72* (2013.01); *B32B 2307/7242* (2013.01); *B32B 2439/60* (2013.01); *B32B 2439/70* (2013.01); *C08J 2323/06* (2013.01); *C08J 2323/08* (2013.01); *C08J 2423/06* (2013.01)

(58) Field of Classification Search
CPC ............ B29C 47/065; B29C 2049/627; B29C 47/0023; B29C 49/48; B29C 47/56; B29C 47/005; B32B 27/306; B32B 27/08; B32B 7/02; B32B 27/32; B32B 1/00; B32B 5/20; B32B 1/02; B32B 2250/242; B32B 2439/70; B32B 2307/7242; B32B 2307/72; B32B 2307/71; B32B 2307/4026; B32B 2270/00; B32B 2262/14; B32B 2262/0253; B32B 2250/246; B32B 2439/60; B65D 1/0215; B65D 81/3846; B65D 1/12; B65D 81/38; C08J 9/122; C08J 9/06; C08J 2423/06; C08J 2323/08; C08J 2323/06; B29B 11/14; B29B 2911/14093; B29B 2911/14066; B29B 2911/14053; B29B 2911/14173; B29B 11/10; B29L 2031/7158; B29L 2009/001; B29L 2031/712; B29L 2023/00; B29K 2105/04; B29K 2223/00; B29K 2105/12; B29K 2105/0058; B29K 2023/0633; B29K 2105/0005; B29K 2023/065; B29K 2995/0063

See application file for complete search history.

(56) References Cited

U.S. PATENT DOCUMENTS

| | | |
|---|---|---|
| 3,892,828 A | 7/1975 | Weatherly |
| 3,981,412 A | 9/1976 | Asmus |
| 4,047,868 A | 9/1977 | Kudo |
| 4,206,166 A | 6/1980 | Hayashi |
| 4,220,730 A | 9/1980 | Coyne |
| 4,264,672 A | 4/1981 | Taylor-Brown |
| 4,435,344 A | 3/1984 | Iioka |
| 4,468,435 A | 8/1984 | Shimba et al. |
| 4,479,989 A | 10/1984 | Mahal |
| 4,867,664 A | 9/1989 | Fukuhara |
| 4,990,382 A | 2/1991 | Weissenstein |
| 5,037,285 A | 8/1991 | Kudert |
| 5,055,022 A | 10/1991 | Hirschberger |
| 5,328,651 A | 7/1994 | Gallagher |
| 5,332,121 A | 7/1994 | Schmidt |
| 5,405,667 A | 4/1995 | Heider |
| 5,574,074 A | 11/1996 | Zushi |
| 5,575,965 A | 11/1996 | Caronia |
| 5,598,940 A | 2/1997 | Finkelstein |
| 5,601,200 A | 2/1997 | Finkelstein |
| 5,628,453 A | 5/1997 | MacLaughlin |
| 5,688,572 A | 11/1997 | Slat |
| 5,857,572 A | 1/1999 | Bird |
| 5,916,926 A | 6/1999 | Cooper |
| 5,927,525 A | 7/1999 | Darr |
| 5,952,423 A | 9/1999 | Shang |
| 6,053,214 A | 4/2000 | Sjoberg et al. |
| 6,221,925 B1 | 4/2001 | Constant |
| 6,284,810 B1 | 9/2001 | Burnham |
| 6,323,251 B1 | 11/2001 | Perez |
| 6,432,525 B1 | 8/2002 | Gokuraku |
| 6,444,149 B1 | 9/2002 | Valentinsson |
| 6,593,384 B2 | 7/2003 | Anderson |
| 6,616,434 B1 | 9/2003 | Burnham |
| 6,706,223 B1 | 3/2004 | Anderson |
| 6,811,843 B2 | 11/2004 | DeBraal |
| 6,875,484 B1 | 4/2005 | Kogure |

(56) References Cited

U.S. PATENT DOCUMENTS

| | | | |
|---|---|---|---|
| 6,921,571 B2 | 7/2005 | Funakoshi | |
| 6,986,922 B2 | 1/2006 | Hesse | |
| 7,014,801 B2 | 3/2006 | Imanari | |
| 7,169,338 B2 | 1/2007 | Imanari | |
| 7,183,005 B2 | 2/2007 | Poloso | |
| 7,462,307 B2 | 12/2008 | Hesse | |
| 7,588,808 B2 | 9/2009 | Hutchinson | |
| 7,588,810 B2 | 9/2009 | Semersky | |
| 7,704,440 B2 | 4/2010 | Brandner | |
| 7,759,267 B2 | 7/2010 | Conover | |
| 7,871,558 B2 | 1/2011 | Merical | |
| 7,973,100 B2 | 7/2011 | Wada | |
| 8,061,540 B2 | 11/2011 | Toyoda | |
| 8,061,541 B2 | 11/2011 | Trumpp | |
| 8,124,203 B2 | 2/2012 | Semersky | |
| 8,137,600 B2 | 3/2012 | Pierick | |
| 8,263,198 B2 | 9/2012 | Carvell | |
| 8,342,420 B2 | 1/2013 | Roberts, Jr. | |
| 8,397,932 B2 | 3/2013 | Ichikawa | |
| 8,414,823 B2 | 4/2013 | Rudiger | |
| 8,435,615 B2 | 5/2013 | Tsuchida | |
| 8,535,598 B2 | 9/2013 | Imanari | |
| 9,447,248 B2 | 9/2016 | Sun | |
| 9,937,652 B2 * | 4/2018 | Sun | B29C 49/0073 |
| 2002/0006975 A1 | 1/2002 | Welsh | |
| 2002/0172739 A1 | 11/2002 | Anderson | |
| 2003/0065097 A1 | 4/2003 | DeGroot | |
| 2003/0127765 A1 | 7/2003 | Weiland | |
| 2003/0211350 A1 * | 11/2003 | Migliorini | B32B 27/08 428/515 |
| 2004/0013830 A1 | 1/2004 | Nonomura | |
| 2004/0062885 A1 | 4/2004 | Imanari | |
| 2004/0086703 A1 | 5/2004 | Semersky | |
| 2004/0147625 A1 | 7/2004 | Dostal | |
| 2005/0009973 A1 | 1/2005 | Lee | |
| 2006/0091576 A1 | 5/2006 | Takase | |
| 2006/0142495 A1 | 6/2006 | Lalho | |
| 2006/0205833 A1 | 9/2006 | Martinez | |
| 2008/0114131 A1 | 5/2008 | Harris | |
| 2008/0125547 A1 | 5/2008 | Swogger | |
| 2008/0246193 A1 | 10/2008 | Smits | |
| 2008/0261016 A1 | 10/2008 | Tamada | |
| 2009/0269566 A1 | 10/2009 | Eichbauer | |
| 2010/0196641 A1 | 8/2010 | DeVos | |
| 2010/0215879 A1 | 8/2010 | Dooley | |
| 2010/0227092 A1 | 9/2010 | Semersky | |
| 2010/0279046 A1 * | 11/2010 | Ashman | B32B 1/08 428/36.91 |
| 2010/0282759 A1 | 11/2010 | Eckhardt | |
| 2011/0129656 A1 | 6/2011 | Zur | |
| 2011/0172363 A1 | 7/2011 | Share | |
| 2011/0180509 A1 | 7/2011 | Hutchinson | |
| 2011/0250384 A1 | 10/2011 | Sumi | |
| 2012/0024459 A1 | 2/2012 | Igarashi | |
| 2012/0061886 A1 | 3/2012 | Sumi | |
| 2012/0076965 A1 | 3/2012 | Silvers | |
| 2012/0103858 A1 | 5/2012 | Schmidt | |
| 2012/0318805 A1 | 12/2012 | Leser | |
| 2012/0318859 A1 | 12/2012 | Leser | |
| 2013/0052385 A1 | 2/2013 | Leser | |
| 2013/0059102 A1 | 3/2013 | Torchio | |
| 2013/0085244 A1 | 4/2013 | Zhao | |
| 2013/0143975 A1 | 6/2013 | Cassidy | |
| 2014/0037880 A1 | 2/2014 | Siddhamalli | |
| 2015/0014879 A1 * | 1/2015 | Sun | C08J 9/122 264/54 |
| 2015/0061194 A1 | 3/2015 | Sun | |
| 2015/0284521 A1 * | 10/2015 | Abubakar | C08J 5/18 428/220 |
| 2016/0089852 A1 | 3/2016 | Lindenfelzer | |
| 2016/0355659 A1 | 12/2016 | Sun | |

FOREIGN PATENT DOCUMENTS

| | | |
|---|---|---|
| CN | 102313084 | 1/2012 |
| CN | 102762350 | 10/2012 |
| CN | 102892678 A | 1/2013 |
| EP | 1057608 | 4/2002 |
| EP | 1472087 | 4/2006 |
| EP | 1741744 | 1/2007 |
| EP | 0851805 | 12/2008 |
| EP | 1040158 | 4/2012 |
| EP | 1749635 | 9/2012 |
| EP | 2323829 | 10/2012 |
| EP | 2141000 | 2/2014 |
| JP | 4278340 | 10/1992 |
| JP | 04278340 | 10/1992 |
| JP | 404278340 A | 10/1992 |
| JP | 410000748 A | 1/1998 |
| JP | 2001139717 A | 5/1999 |
| JP | 2001138378 A | 5/2001 |
| JP | 2004137377 | 5/2004 |
| JP | 2004137377 A | 5/2004 |
| JP | 2005290329 A | 10/2005 |
| JP | 2008213491 A | 9/2008 |
| JP | 2012526006 | 10/2012 |
| JP | 2013203886 | 10/2013 |
| WO | 2003066320 | 8/2003 |
| WO | 2010015673 | 2/2010 |
| WO | 2012174567 | 12/2012 |
| WO | 2012174567 A2 | 12/2012 |
| WO | 2012174568 | 12/2012 |
| WO | 2013032552 | 3/2013 |
| WO | 2012174567 A3 | 4/2013 |
| WO | 2014099335 | 6/2014 |
| WO | 2015024018 | 2/2015 |

OTHER PUBLICATIONS

Unilever Says It Will Use Less Plastic Per Bottle, Yahoo News (Apr. 22, 2014, 10:20 AM), http://news.yahoo.com/unilever-says-less-plastic-per-bottle-142039401-finance.html (3 pages).

U.S. Office Action dated Sep. 15, 2016 for U.S. Appl. No. 15/239,894; 8 pages.

Chinese Office Action for Application Serial No. 201480021009.9, dated Aug. 7, 2017 including English language summary, 12 pages.

Advisory Action dated Jun. 1, 2017 for U.S. Appl. No. 15/239,894; (pages 1-6).

Chinese Office Action for Chinese App. No. 201480047578.0 dated Jan. 24, 2018, 10 pages.

Office Action dated Mar. 14, 2017 for U.S. Appl. No. 14/475,266.

Office Action dated Mar. 21, 2017 for U.S. Appl. No. 14/475,411.

Office Action dated Jul. 10, 2017 for U.S. Appl. No. 15/239,894; (pp. 1-10).

Office Action dated Jul. 19, 2017 for U.S. Appl. No. 15/059,995; (pp. 1-10).

Chinese Office Action for Chinese App. No. 201480047578.0 dated Jul. 4, 2017, 5 pages.

Chinese Office Action for Chinese App. No. 201480047978.1 dated Jul. 21, 2017, 11 pages.

International Search Report and Written Opinion, International Application No. PCT/US2016/020844, search completed Apr. 14, 2016.

International Search Report and Written Opinion, International Application No. PCT/US2016/020674, search completed Apr. 18, 2016.

Extended European Search Report for European App. No. 14840353.8 dated Mar. 17, 2017, 6 pages.

Extended European Search Report for European App. No. 14838960.4 dated Mar. 17, 2017, 9 pages.

Extended European Search Report for European App. No. 14840262 dated Mar. 23, 2017, 8 pages.

New Zealand Examination Report for New Zealand Patent App. No. 712687 dated Mar. 30, 2017, 10 pages.

Office Action dated Apr. 21, 2017 for U.S. Appl. No. 14/475,411.

Taiwan Search Report for Taiwan Application No. 103109790 completed Apr. 20, 2017, 3 pages.

(56) References Cited

OTHER PUBLICATIONS

Extended European Search Report for European App. No. 14840734.9 dated Apr. 4, 2017, 10 pages.
Australian Examination Report for Australian App. No. 2014286957 dated May 2, 2017, 3 pages.
Office Action dated May 1, 2017 for U.S. Appl. No. 14/211,533.
Office Action dated Jun. 15, 2016 for U.S. Appl. No. 14/787,901.
International Search Report and Written Opinion dated Jan. 21, 2015, relating to International Application No. PCT/US2014/053665.
International Search Report and Written Opinion dated Jan. 27, 2015, relating to International Application No. PCT/US2014/53667.
International Search Report and Written Opinion dated Jul. 18, 2014, relating to International Application No. PCT/US2014/027551.
International Search Report dated Nov. 2, 2014, relating to International Application No. PCT/US2014/53666.
International Search Report dated Nov. 24, 2014, relating to International Application No. PCT/US2014/52606.
International Search Report dated Nov. 7, 2014, relating to International Application No. PCT/US2014/046518.
Office Action dated May 11, 2015 for U.S. Appl. No. 14/331,066.
International Search Report and Written Opinion related to International Application No. PCT/US2014/053666 dated Oct. 29, 2014.
Cheng et al., "Improving processability of polyethylenes by radiation-induced long chain branching," Radiation Physics and Chemistry 79 (2009) 563-566.
International Preliminary Report on Patentability dated Mar. 1, 2016, relating to International Application No. PCT/US2014/053666.
International Preliminary Report on Patentability dated Mar. 1, 2016, relating to International Application No. PCT/US2014/053665.
International Preliminary Report on Patentability, dated Mar. 1, 2016, relating to International Application No. PCT/US2014/052606.
International Preliminary Report on Patentability, dated Mar. 1, 2016, relating to International Application No. PCT/US2014/053667.
English summary of Russian Office Action for Russian Patent Application Serial No. 2016104363, dated Jul. 5, 2016, 3 pages.
ChineseOfficeActionforApplicationSerialNo. 201480021009.9, datedJul. 5, 2016includingEnglishlanguagesummary,17pages.
European Search Report for European Application No. 14768125.8 8 pages.
English Translation of JP404278340A, 23pages.
Office Action dated Aug. 15, 2016 for U.S. Appl. No. 14/468,789.
Office Action dated Aug. 12, 2016 for U.S. Appl. No. 14/475,096.
Chinese Office Action for Application Serial No. 201480021009.9, dated Jan. 2, 2018 including English language summary, 6 pages.
Office Action dated Jan. 17, 2018 for U.S. Appl. No. 15/591,355; (pp. 1-5).
Australian Patent Examination Report for Australian App. No. 2014239318 dated Nov. 25, 2016, 4 pages.
Chinese Office Action for Chinese App. No. 201480047976.2 dated Dec. 9, 2016, 11 pages.
Typical Engineering Properties of Polypropylene information sheet, Ineos Olefins and Polymers USA, archived at https://web.archive.org/web/20160501000000*/http://www.ineos.com/globalassets/ineos-group/businesses/ineos-olefins-and-polymers-usa/products/technical-information-patents/ineos-engineering-properties-of-pp.pdf, Mar. 2016, p. 1.
Office Action dated Dec. 14, 2016 for U.S. Appl. No. 14/211,553.
Chinese Office Action for Chinese App. No. 201480047578.0 sent on Nov. 30, 2016, 10 pages.
Austrialian First Patent Examination Report for Australian App. No. 2014311991 dated Oct. 4, 2017, 4 pages.
Office Action dated Oct. 3, 2017 for U.S. Appl. No. 15/491,443; (pp. 1-6).
Office Action dated Oct. 6, 2017 for U.S. Appl. No. 15/383,115; (pp. 1-5).
Office Action dated Oct. 27, 2017 for U.S. Appl. No. 15/239,894; (pp. 1-7).
Chinese Office Action for Chinese App. No. 20180042446.9 dated Feb. 3, 2018, 9 pages.
Chinese Office Action for Chinese App. No. 20180039581.8 dated Feb. 23, 2018, 13 pages.
Chinese Office Action for Chinese App. No. 201480047978.1 dated Feb. 24, 2018, 11 pages.
Chinese Final Rejection for Chinese App. No. 201480047976.2 dated Mar. 7, 2018, 8 pages.
Vasile et al., Practical Guide to Polyethylene, published by Smithers Rapra Press, 2008, p. 119, 3 pages.
Chinese Office Action for Chinese App. No. 201480047976.2 dated Aug. 22, 2017, 15 pages.
Dongwu Yang, Plastic Material Selection Technology, Light Industry Press, Jan. 2008, 1 page.
Office Action dated Apr. 16, 2018 for U.S. Appl. No. 15/061,070, (pp. 1-13).
Definition of "Base," Dictionary.com, available at http://www.dictionary.com/browse/base, retrieved on Apr. 16, 2018.
Office Action dated Apr. 20, 2018 for U.S. Appl. No. 15/239,894, (pp. 1-13).
Lubrizol Advanced Materials, Inc., Extrusion Guide, 2014, 16 pages.
Chinese Office Action for Application Serial No. 201480021009.9, dated Apr. 20, 2018 including English language summary, 6 pages.
Office Action dated Jun. 15, 2018 for U.S. Appl. No. 15/491,443, pp. 1-6.
Chinese Office Action for Chinese App. No. 201480047578.0 dated Aug. 29, 2018, 4 pages.
Office Action dated Sep. 7, 2018 for U.S. Appl. No. 15/239,894, BP422 US-CON, (pp. 1-9).

* cited by examiner

MULTI-LAYER TUBE AND PROCESS OF MAKING THE SAME

PRIORITY CLAIM

This application claims priority under 35 U.S.C. § 119(e) to U.S. Provisional Application No. 62/128,195, filed Mar. 4, 2015, and Provisional Application No. 62/279,177, filed Jan. 15, 2016, each of which are expressly incorporated by reference herein.

BACKGROUND

The present disclosure relates to extruded materials, and in particular to extruded materials made from polymeric materials. More particularly, the present disclosure relates to a process for making extruded materials.

SUMMARY

A vessel in accordance with the present disclosure is configured to hold a product in an interior region. In illustrative embodiments, the vessel is an insulated container such as a drink cup. In illustrative embodiments, the vessel is a container such as a shampoo bottle.

In illustrative embodiments, a container is formed from a multi-layer tube in a multi-layer co-extrusion blow molding process. The multi-layer tube includes an inner polymeric layer, an outer polymeric layer spaced apart from the inner polymeric material, and a middle cellular non-aromatic polymeric material located between the inner and outer polymeric layers.

In illustrative embodiments, the middle cellular non-aromatic polymeric layer has a density in a range of about 0.01 g/cm$^3$ to about 0.8 g/cm$^3$. In illustrative embodiments, the middle cellular non-aromatic polymeric layer has a density in a range of about 0.2 g/cm$^3$ to about 0.5 g/cm$^3$. In illustrative embodiments, the middle cellular non-aromatic polymeric layer has a density in a range of about 0.25 g/cm$^3$ to about 0.4 g/cm$^3$. In illustrative embodiments, the insulative cellular non-aromatic polymeric material has a density of about 0.35 g/cm$^3$.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

The detailed description particularly refers to the accompanying figures in which:

FIG. 1 is a perspective and diagrammatic view of a co-extrusion system in accordance with the present disclosure used to make a multi-layer tube in accordance with the present disclosure showing that the co-extrusion system includes an outer-layer extruder configured to receive an outer-layer formulation and provide an outer parison, an inner-layer extruder configured to receive an inner-layer formulation and provide an inner parison, a core-layer extruder configured to receive a core-layer formulation and provide a core parison, and a co-extrusion die coupled to each of the extruders to receive the associated parisons and to extrude the inner-layer, core-layer, and outer parisons to establish the multi-layer tube;

FIG. 2 is a diagrammatic view of the co-extrusion process in accordance with the present disclosure showing that the co-extrusion process includes the operations of preparing the inner-layer formulation, extruding the inner parison, preparing the core-layer formulation, extruding the core parison, preparing the outer-layer formulation, extruding the outer parison, aligning the inner-layer, core-layer, and outer parisons, extruding the multi-layer tube, and establishing the multi-layer tube;

Figures 8, 9:
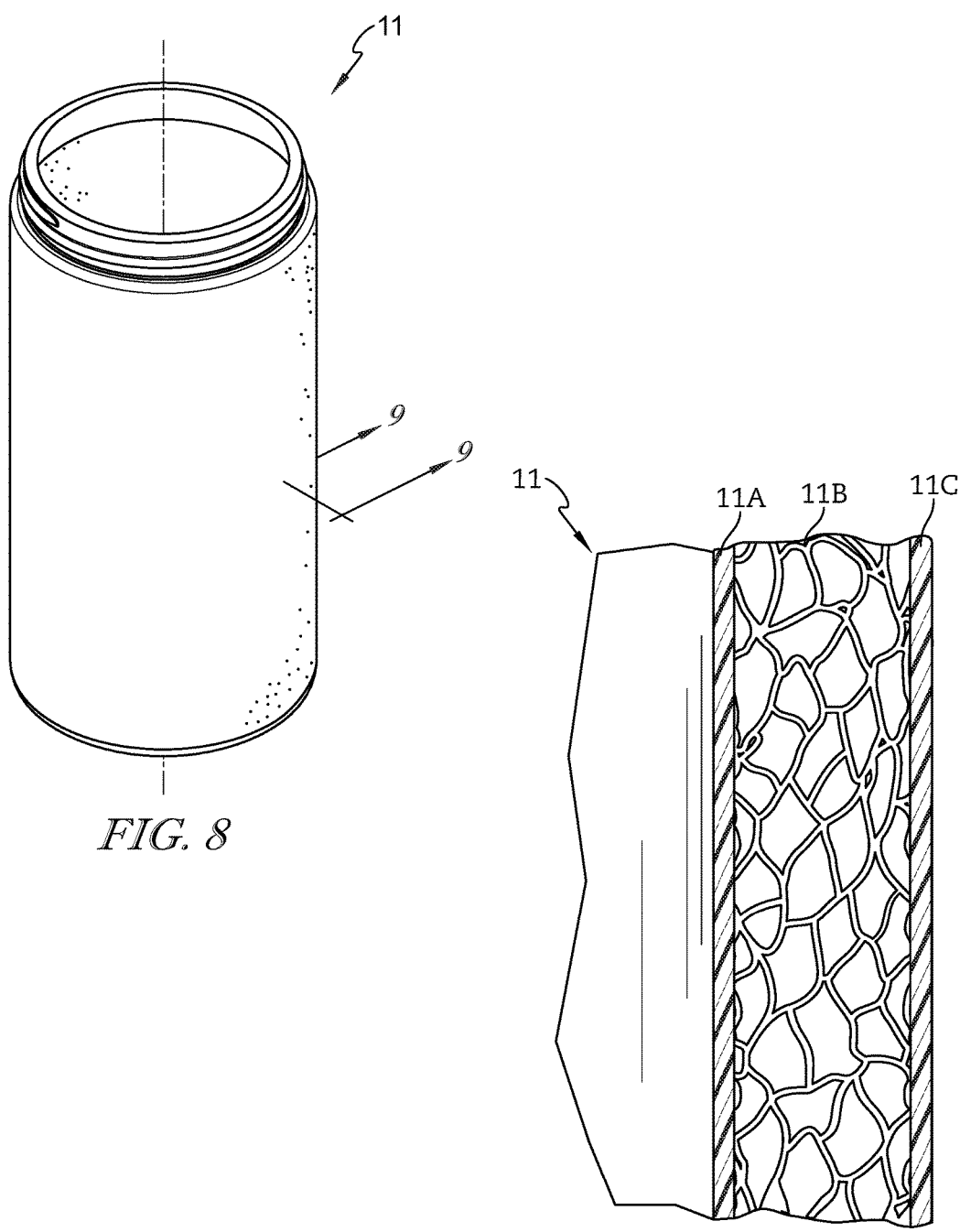
FIG. 8 is a perspective view of the multi-layer container formed from a container-molding process after the extrusion process of FIGS. 1 and 2 after the trimming operation has completed.
Figure 10:
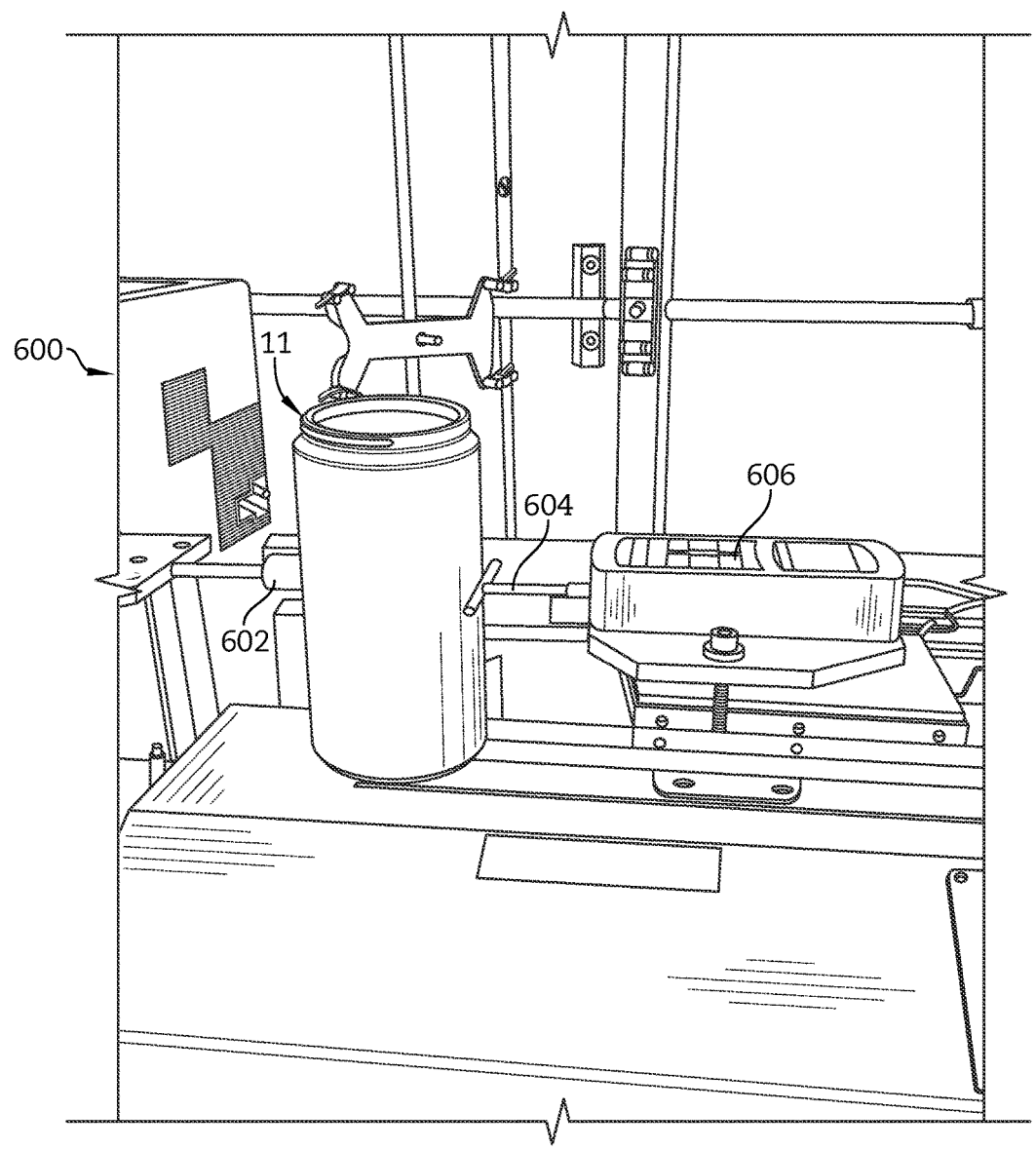
Figure 11:
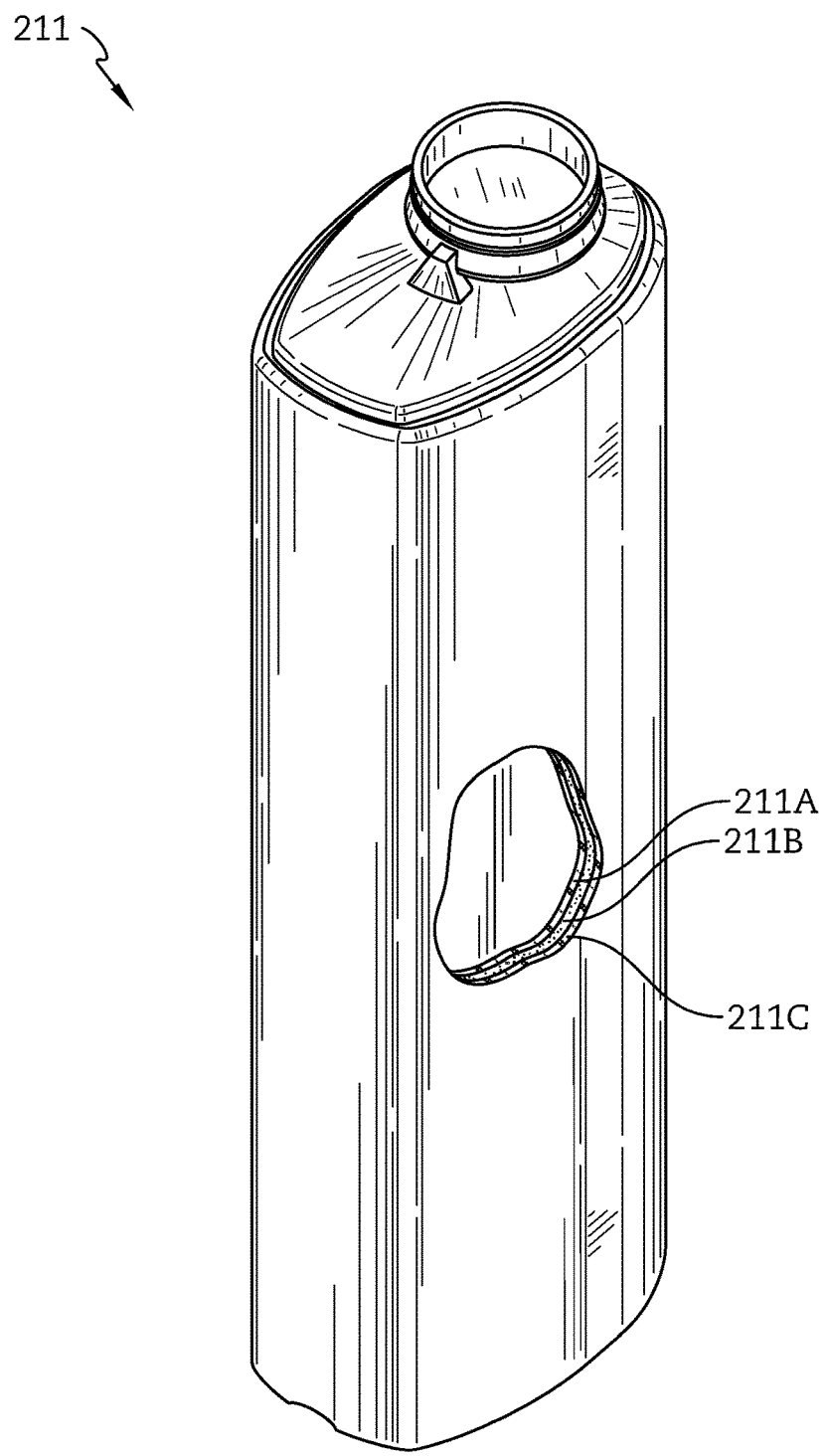
Figure 12:
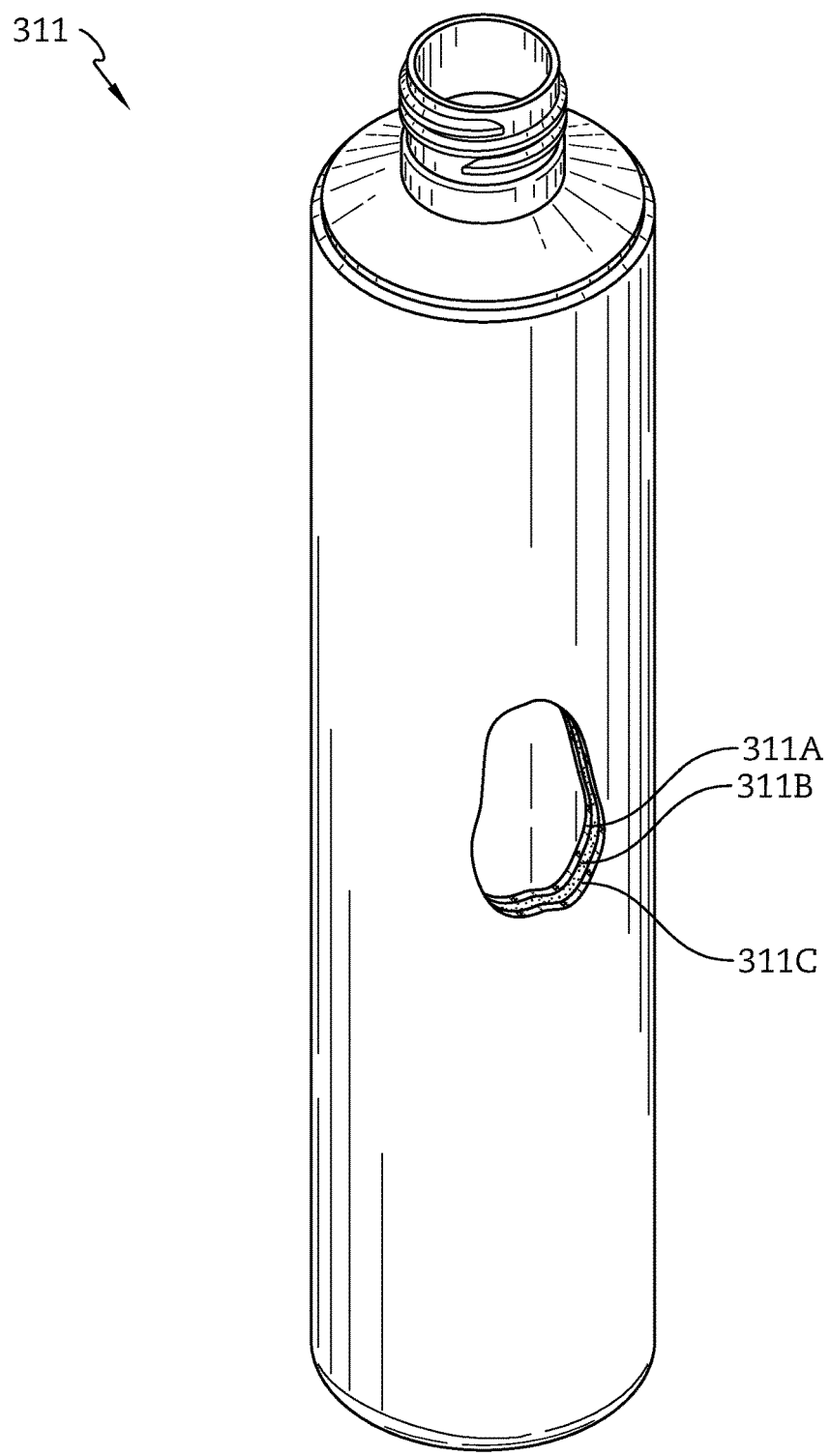
Figure 13:
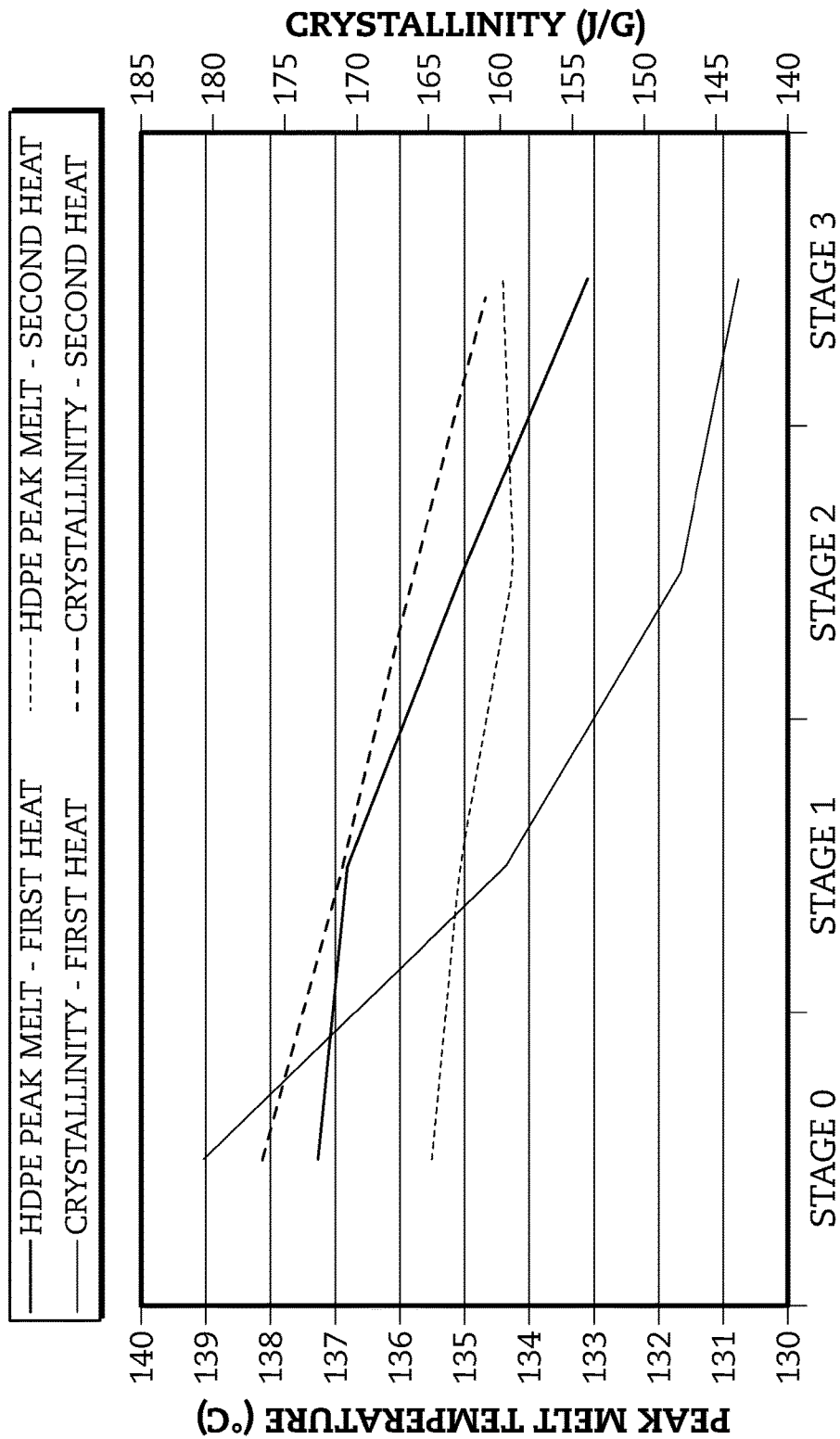
Figure 14:
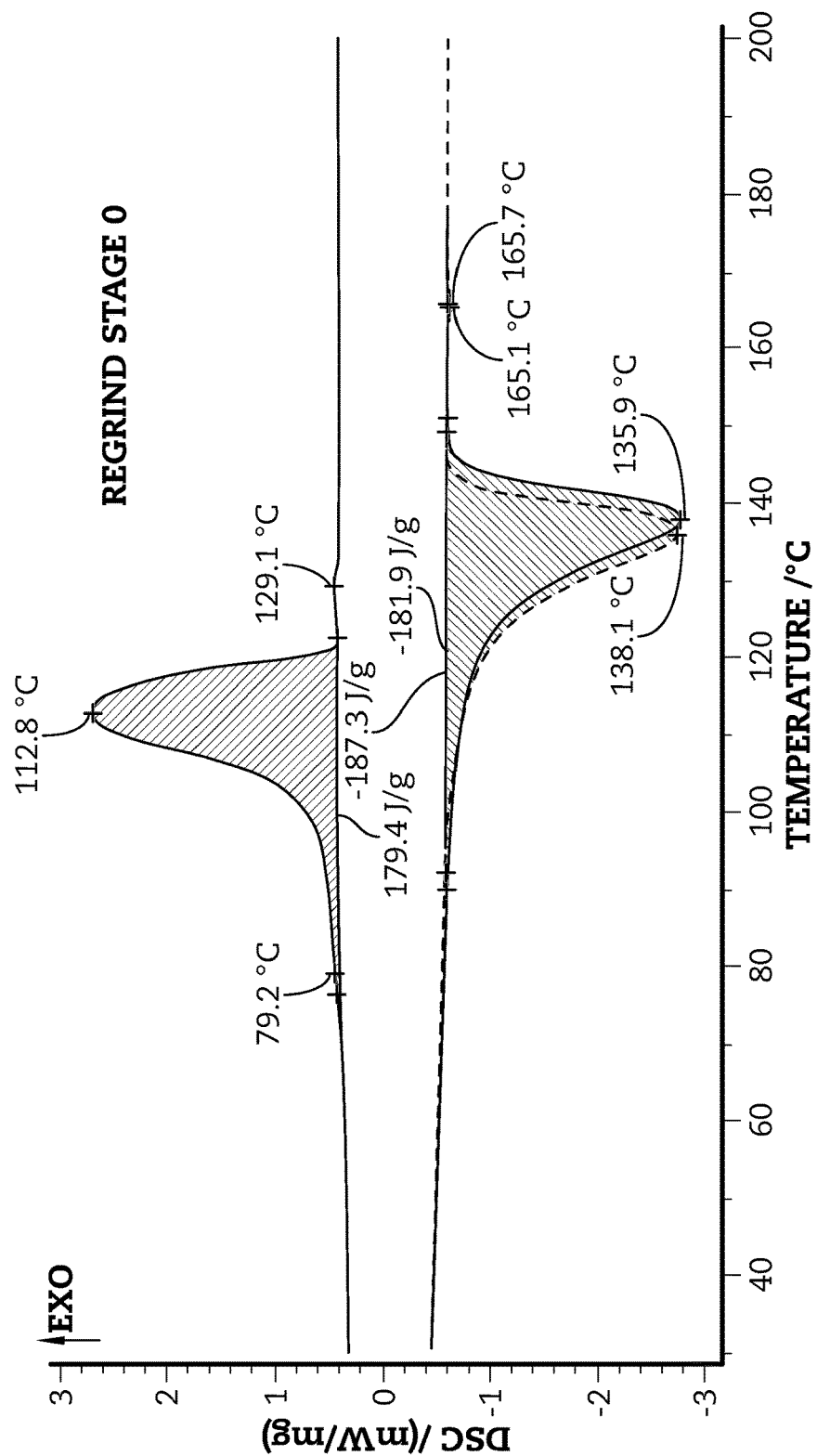
Figure 15:
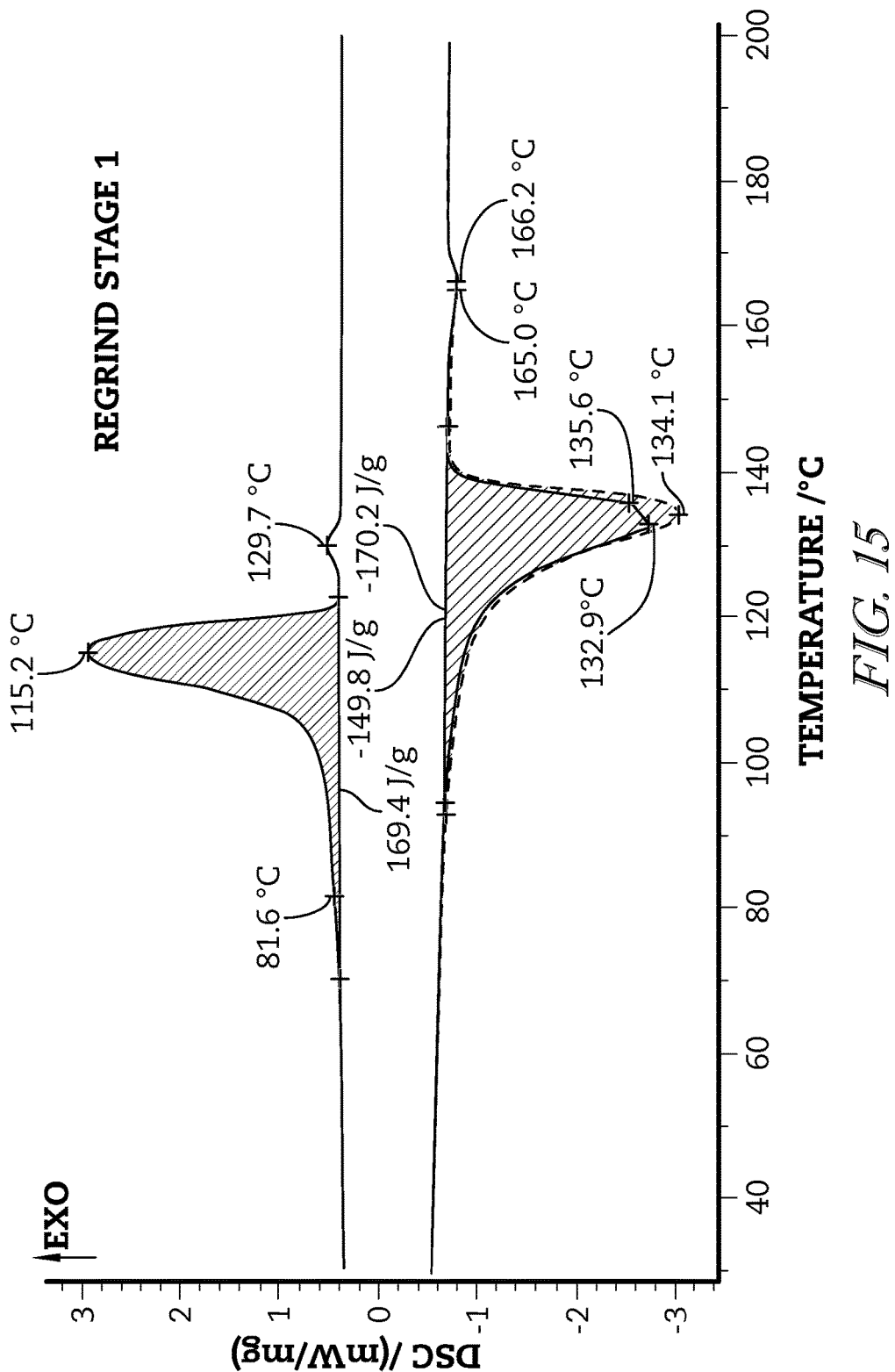
Figure 16:
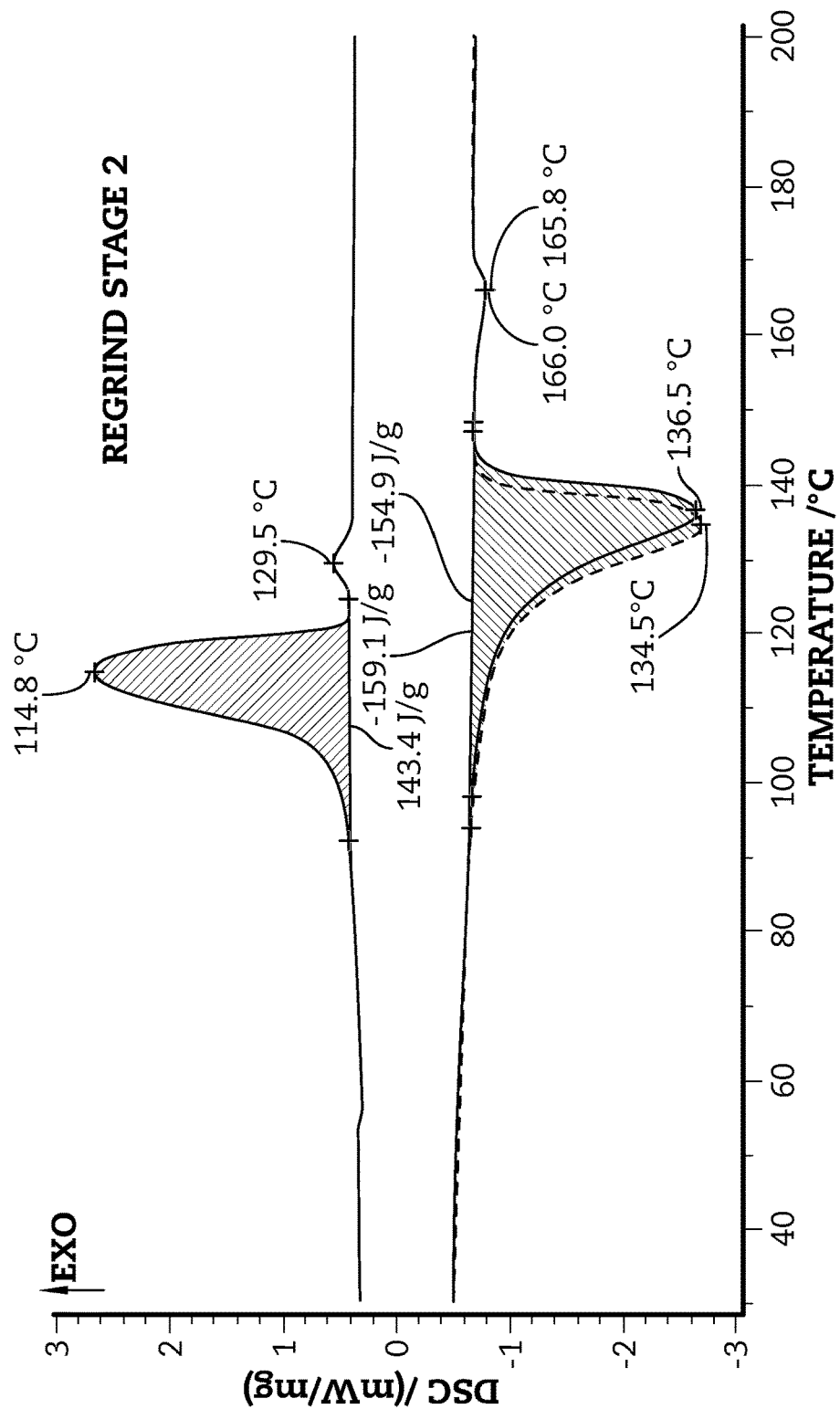
Figure 17:
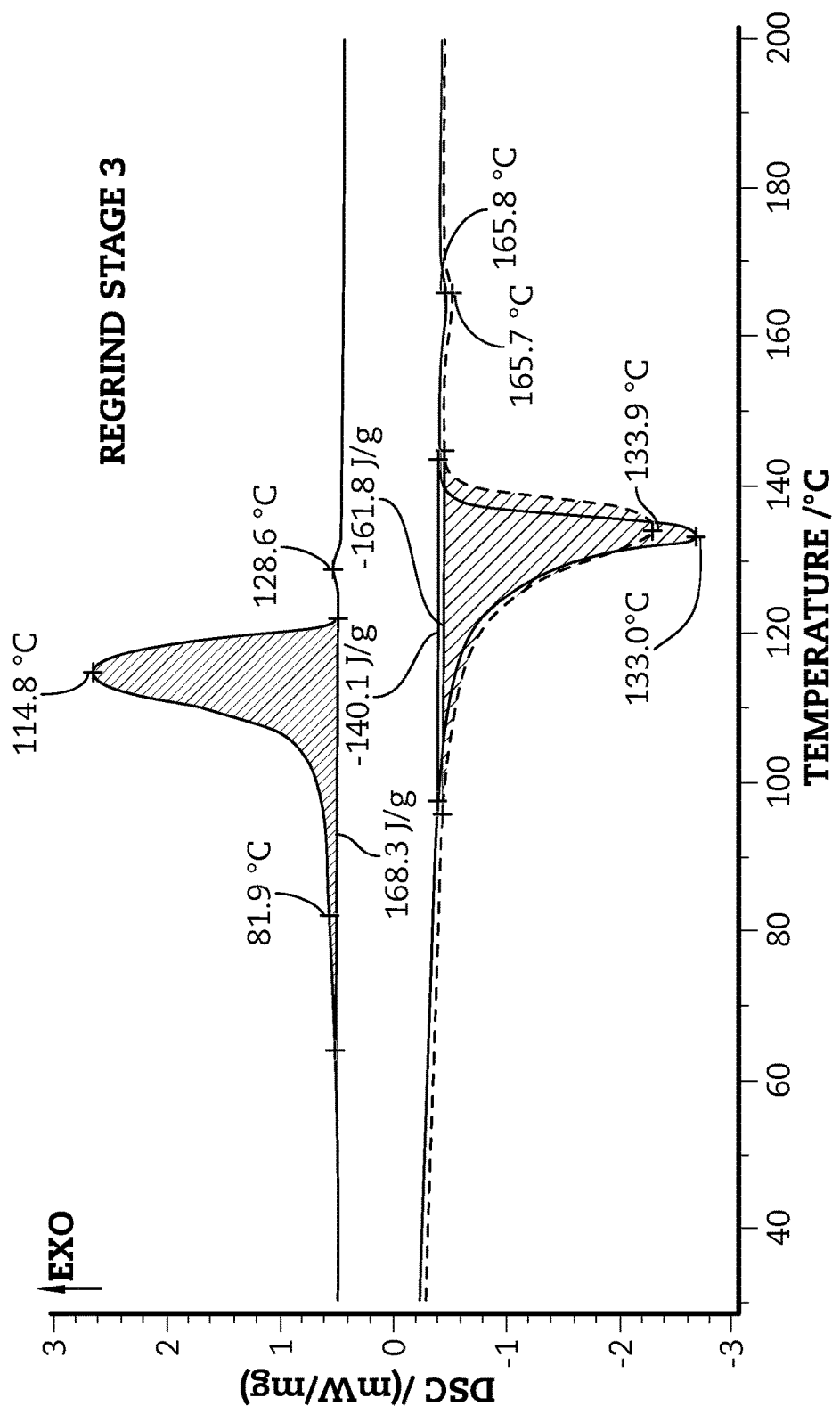
Figure 18:
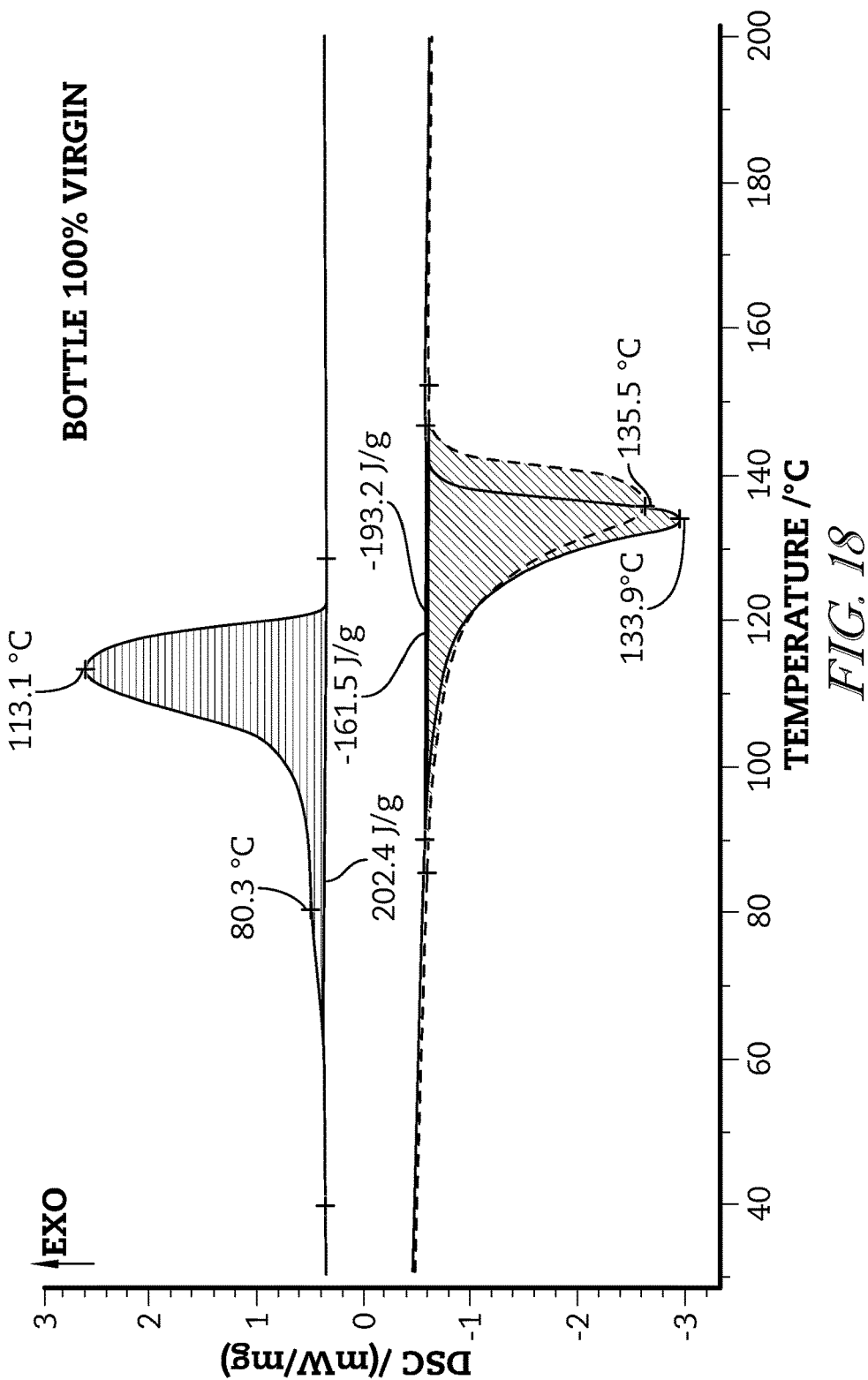
Figure 19:
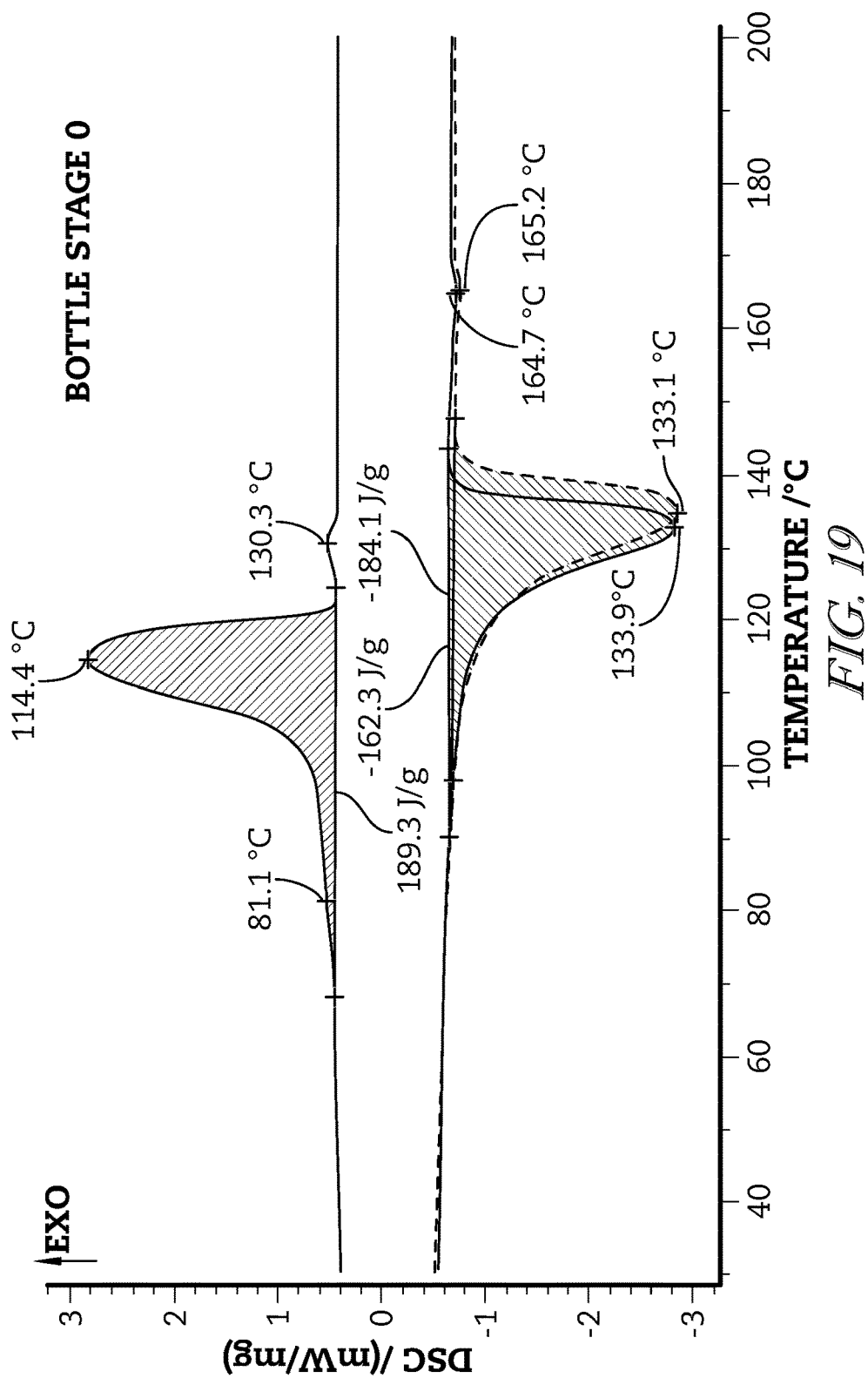
Figure 20:
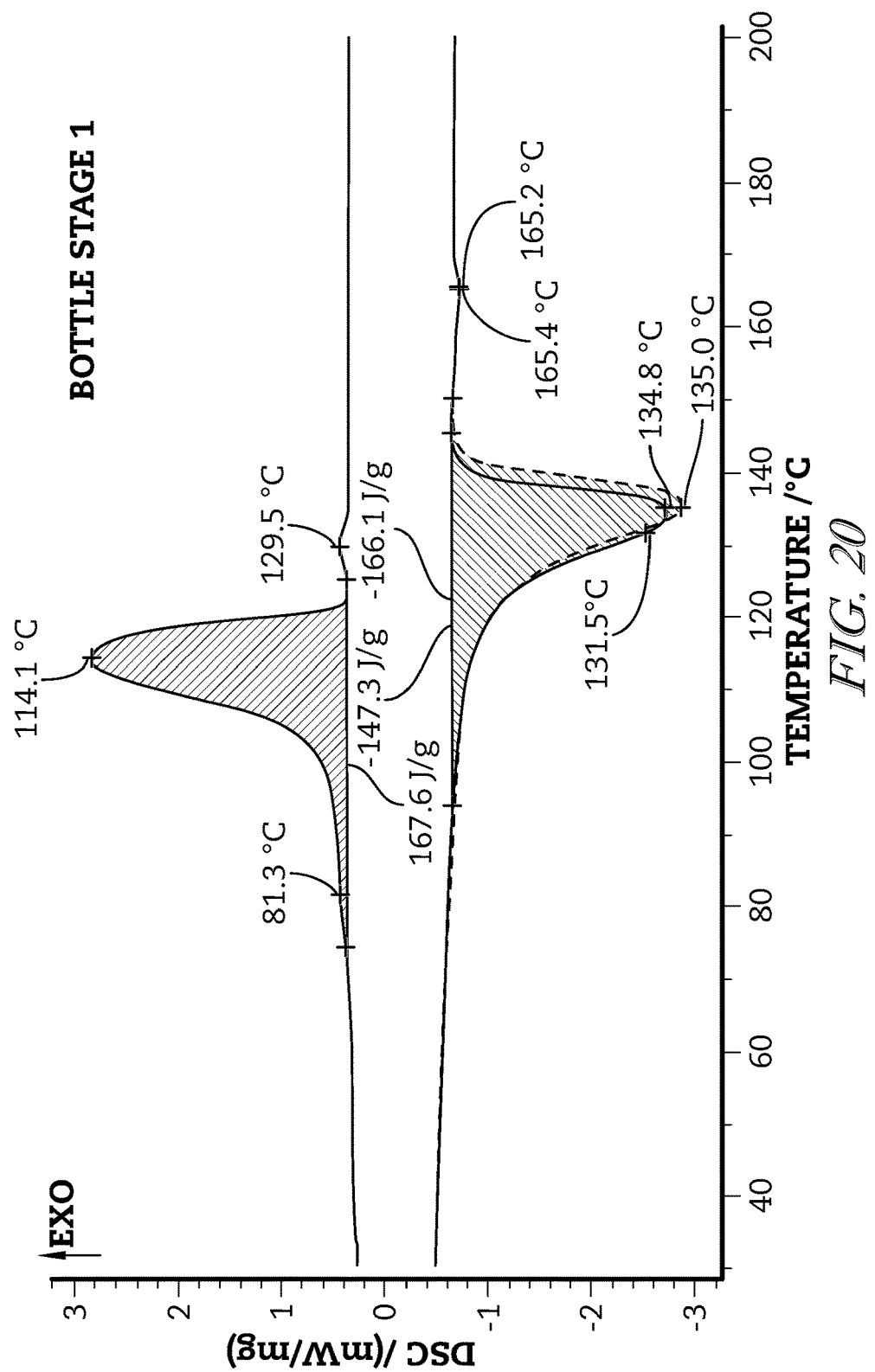
Figure 21:
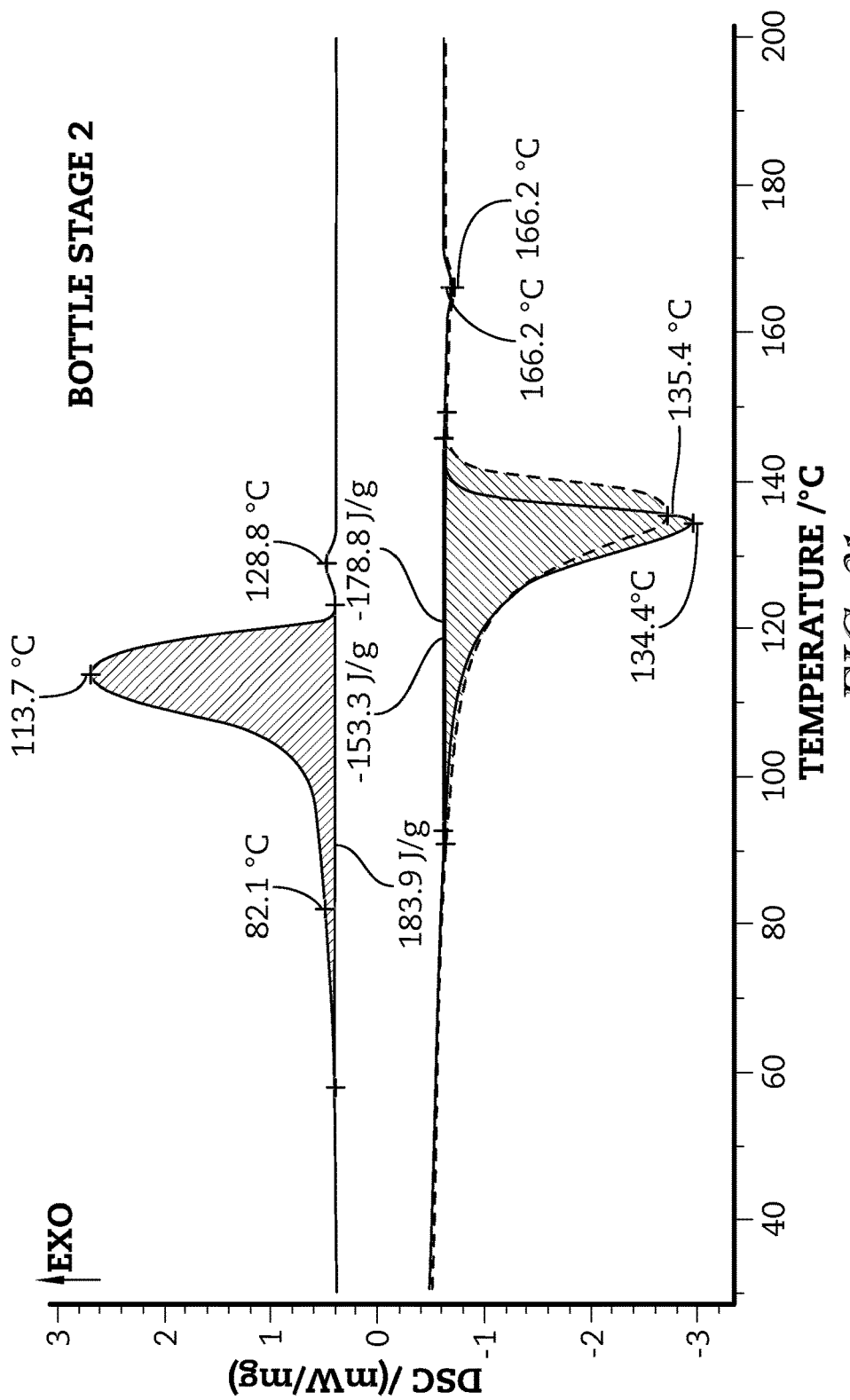
Figure 22:
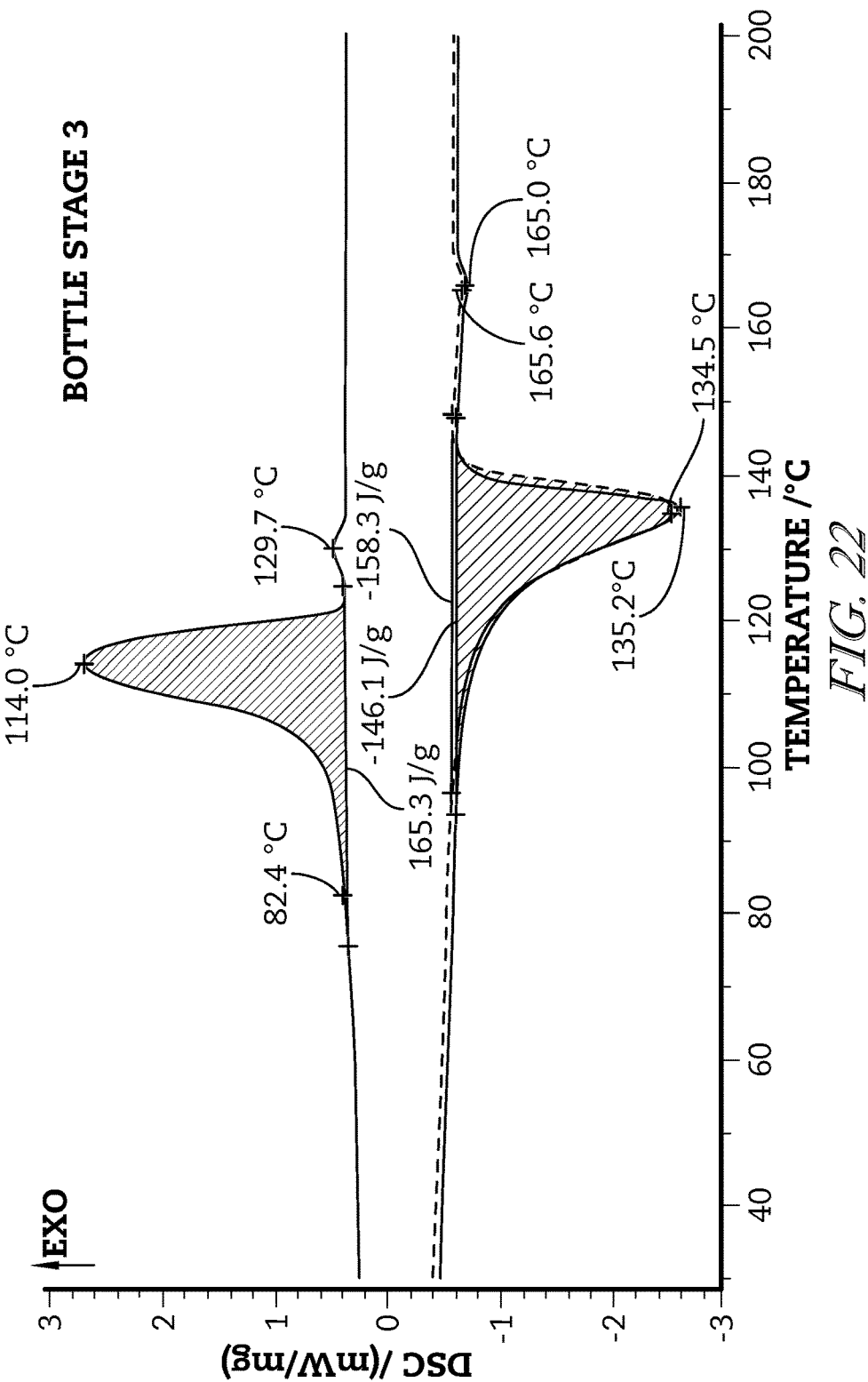
Figure 23:
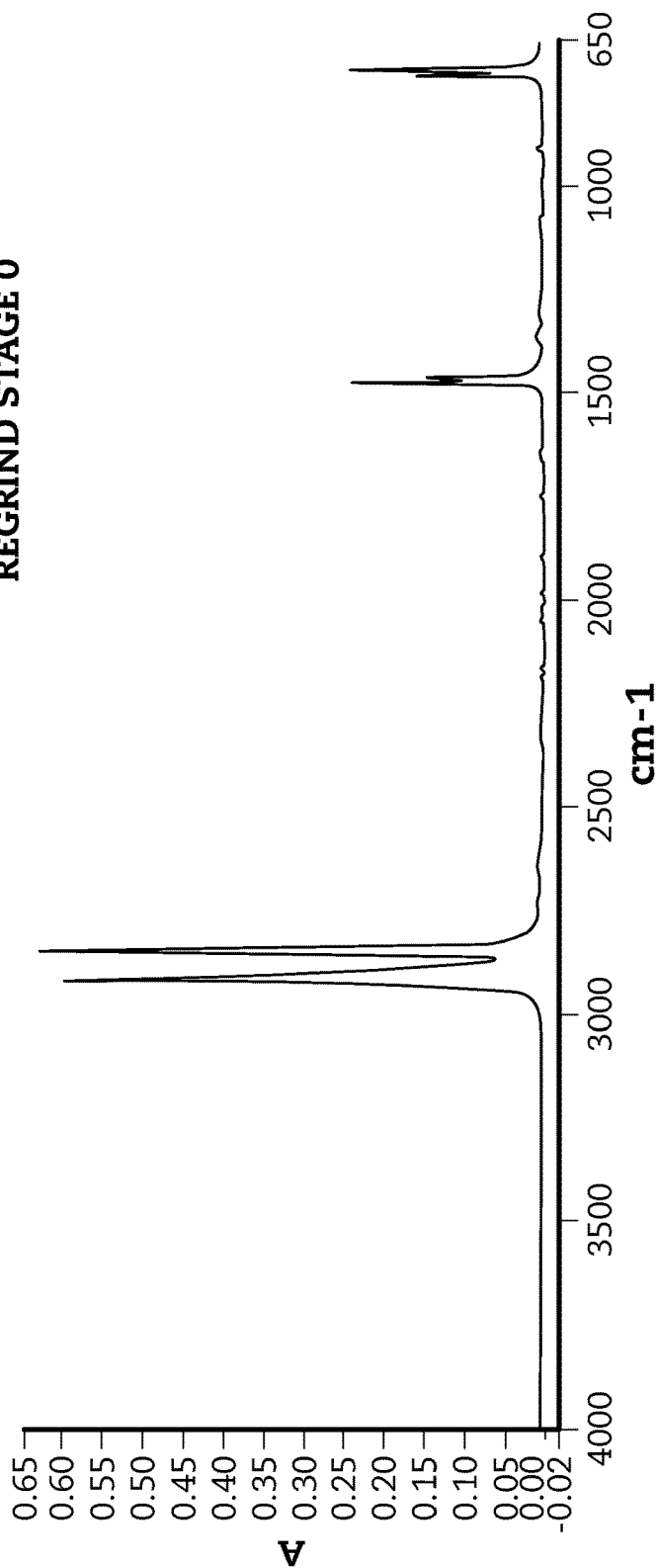
Figure 24:
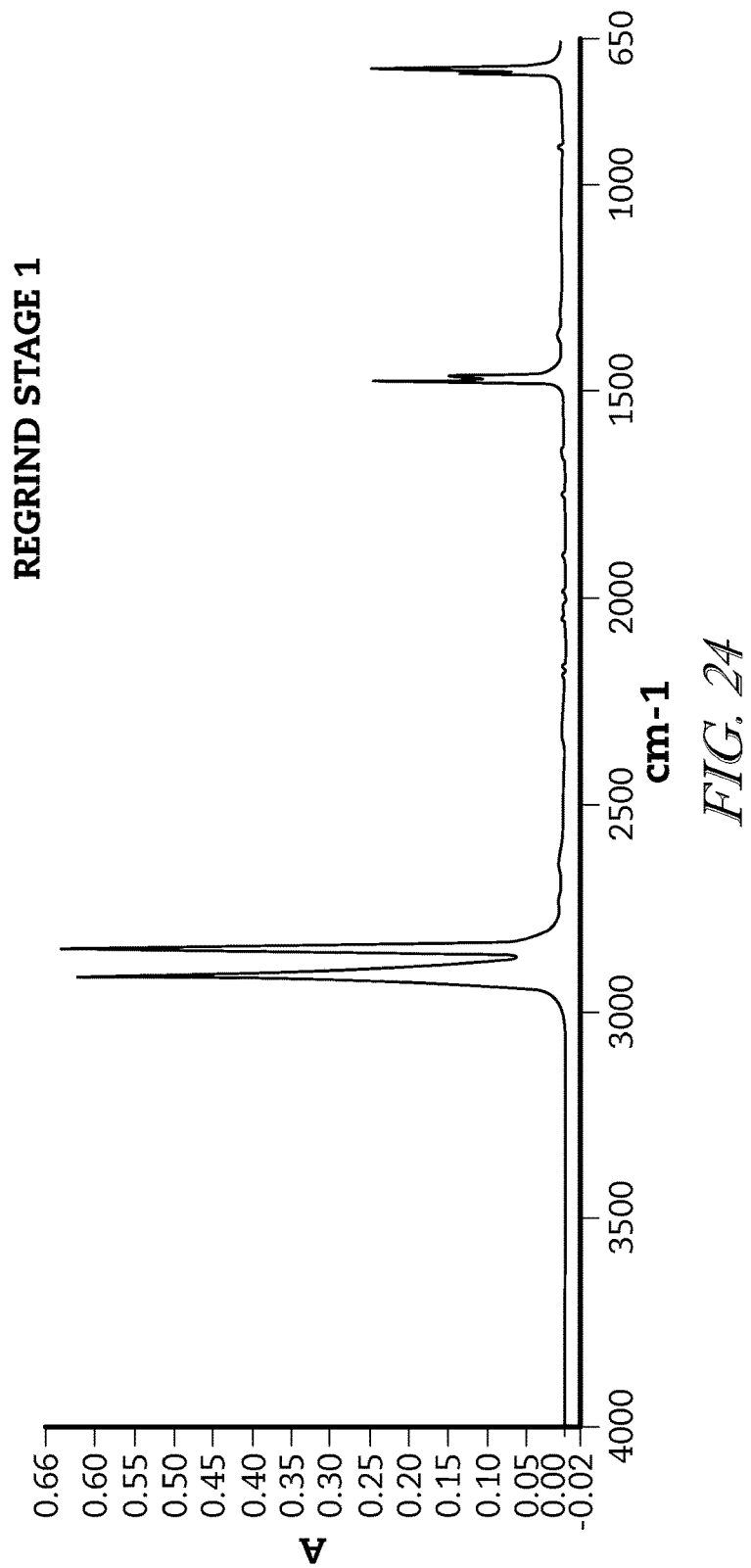

FIG. 9 is a sectional view taken along line 9-9 of FIG. 8 showing that the multi-layer container includes a side wall including the inner layer, the outer layer spaced apart from the inner layer, and a compressed core layer located therebetween and showing that some of the expanded cells have collapsed along the inner and outer layers to cause the compressed core layer to have a relatively greater density than the core layer of the multi-layer tube;

FIG. 10 is a perspective view of the multi-layer container of FIG. 8 coupled to a rigidity testing device undergoing rigidity testing;

FIG. 11 is a perspective view of another embodiment of a multi-layer container made in accordance with the present disclosure with portions broken away to reveal that the multi-layer container includes an inner layer, a core layer, and an outer layer;

FIG. 12 is a perspective view of another embodiment of a multi-layer container made in accordance with the present disclosure with portions broken away to reveal that the multi-layer container includes an inner layer, a core layer, and an outer layer;

FIG. 13 is a plot of DSC analysis of virgin, stage 0, stage 1, stage 2 and stage 3 regrind formulations showing Peak Melt Temperature and Crystallinity as a function of regrind stage;

FIG. 14 is a plot of DSC analysis of a stage-0 regrind formulation;

FIG. 15 is a plot of DSC analysis of a stage-1 regrind formulation;

FIG. 16 is a plot of DSC analysis of a stage-2 regrind formulation;

FIG. 17 is a plot of DSC analysis of a stage-3 regrind formulation;

FIG. 18 is a plot of DSC analysis of a virgin bottle;

FIG. 19 is a plot of DSC analysis of a stage-0 regrind bottle;

FIG. 20 is a plot of DSC analysis of a stage-1 regrind bottle;

FIG. 21 is a plot of DSC analysis of a stage-2 regrind bottle;

FIG. 22 is a plot of DSC analysis of a stage-3 regrind bottle;

FIG. 23 is a plot of an FTIR analysis of a stage-0 regrind formulation;

FIG. 24 is a plot of an FTIR analysis of a stage-1 regrind formulation; and

Figure 25:
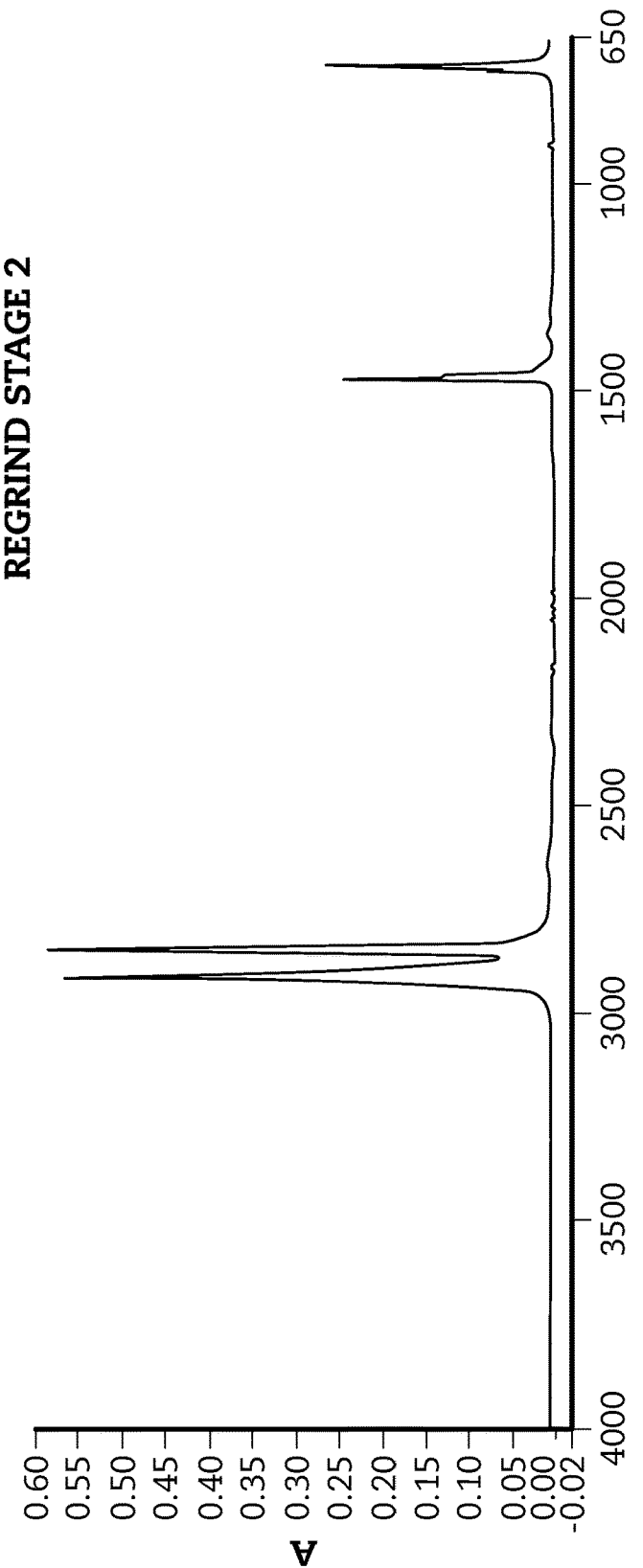

FIG. 25 is a plot of an FTIR analysis of a stage-2 regrind formulation.

DETAILED DESCRIPTION

Figure 1:
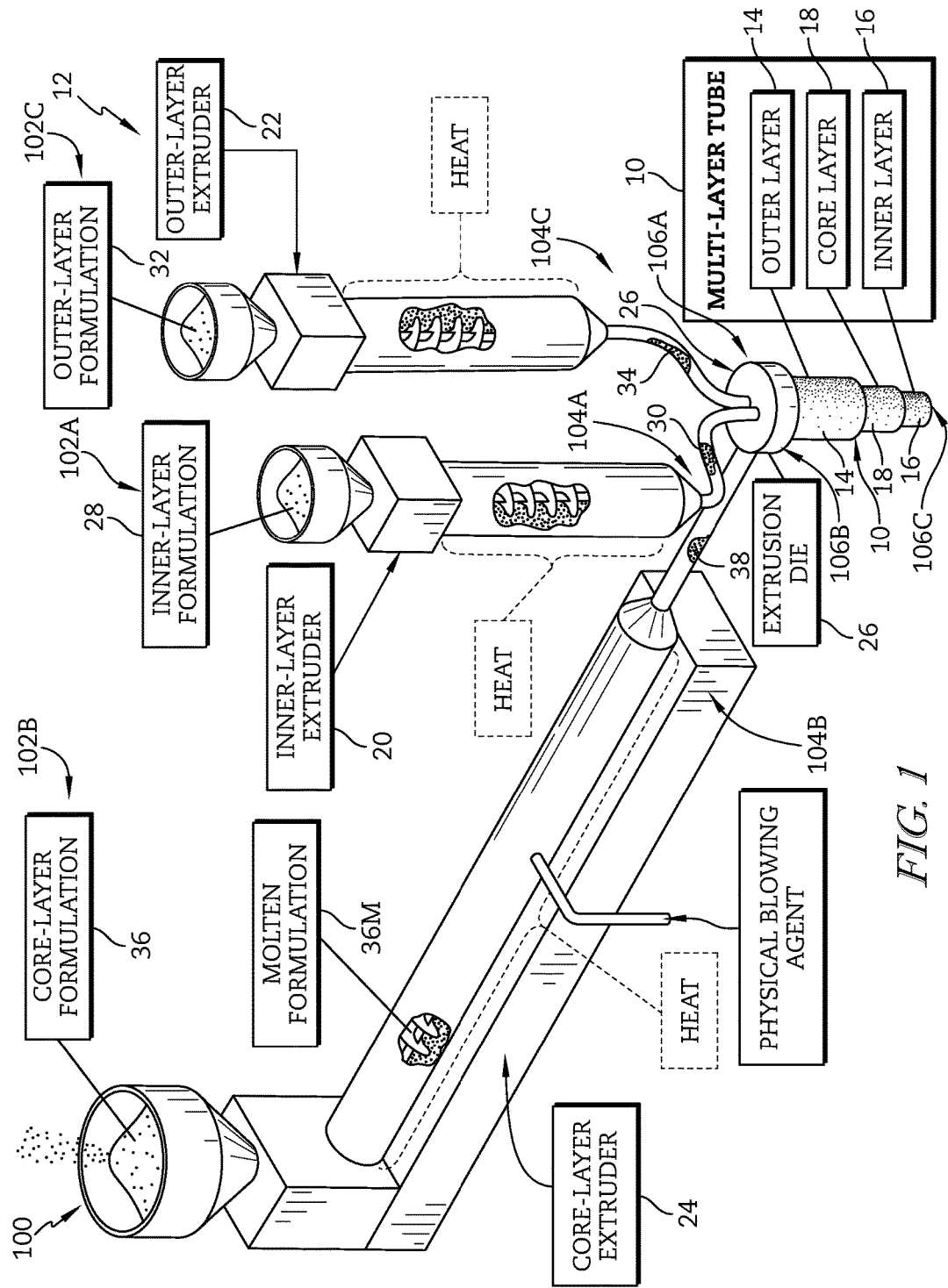
Figure 2:
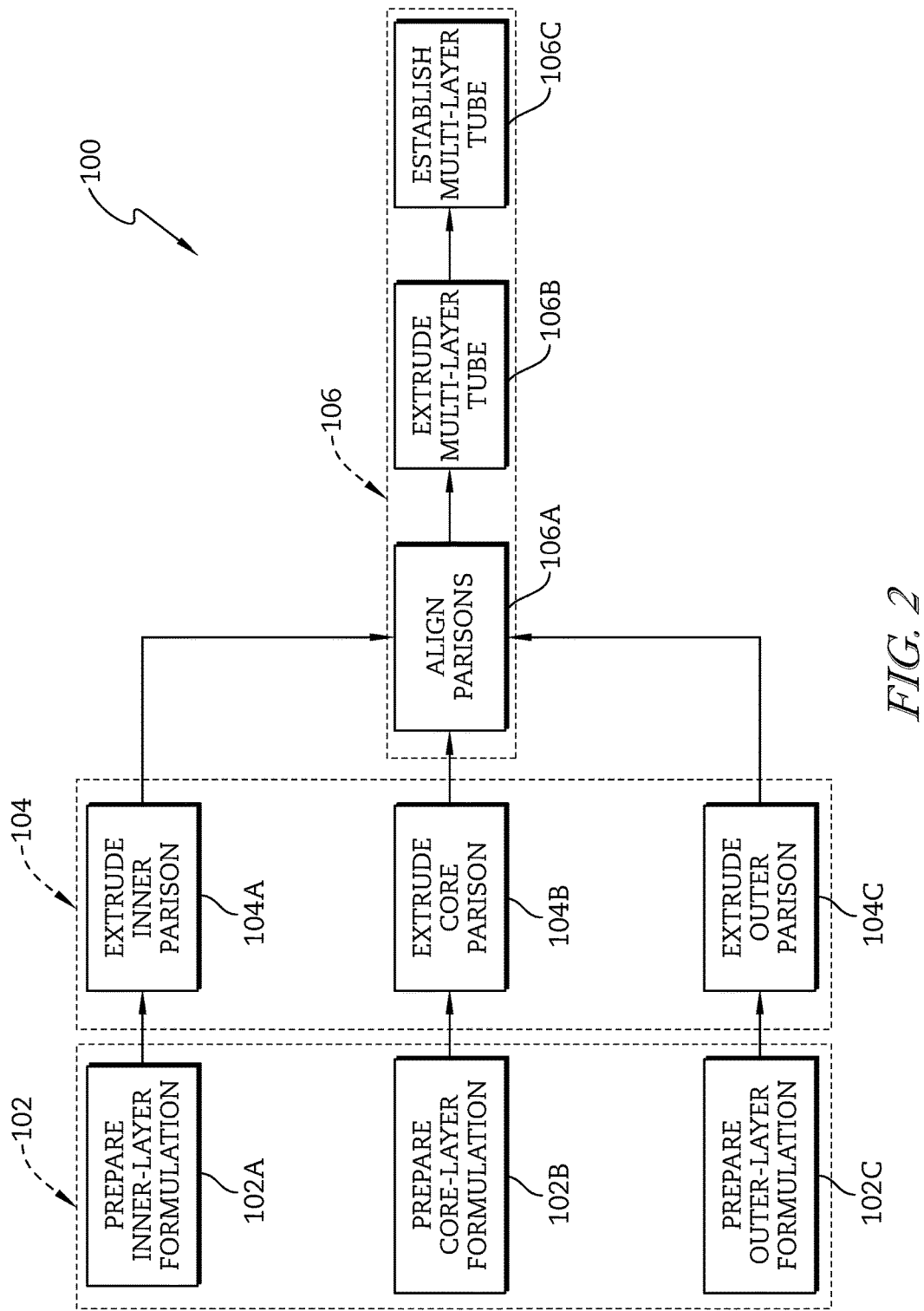
Figure 4:
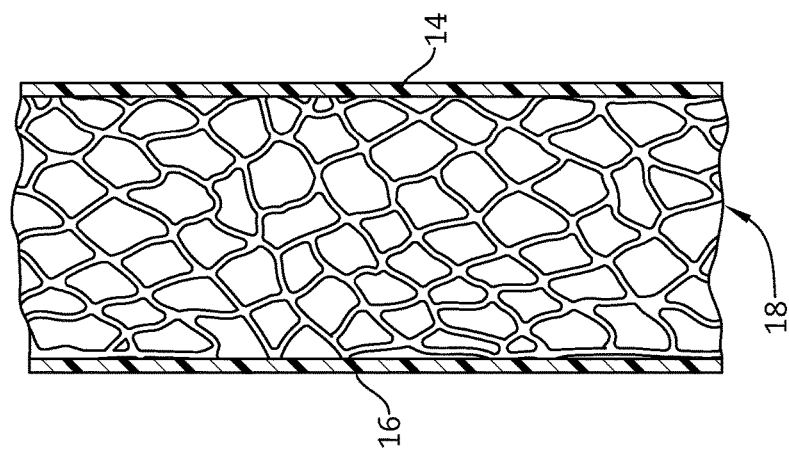
FIG. 4 is an enlarged view taken from the circled region of FIG. 3 showing that the inner layer is made from a relatively high-density polymeric material, the core layer is made from a relatively low-density insulative cellular non-aromatic polymeric material, and that the outer layer is made from a relatively high-density polymeric material.

A multiple layer (multi-layer) tube 10 in accordance with the present disclosure is formed by a co-extrusion process 100 as shown in FIG. 2 using a co-extrusion as shown in FIG. 1. Multi-layer tube 10 includes an outer layer 14, an inner layer 16 spaced apart from outer layer 14, and a core layer 18 located therebetween. Outer layer 14 and inner layer 16 are made from relatively high-density polymeric materials while core layer 18 is made from a relatively low-density insulative cellular non-aromatic polymeric material as suggested in FIG. 4. Core layer 18 is configured to provide means for minimizing a density of multi-layer tube 10 so that an amount of material used during co-extrusion process 100 is minimized. In one illustrative example, multi-layer tube 10 may be used to form a multiple layer container.

Multi-layer tube 10 is formed by co-extrusion process 100 as shown illustratively in FIG. 1 and diagrammatically in FIG. 2. Co-extrusion process 100 includes a preparing stage 102 in which material formulations are provided to co-extrusion system 12, an extrusion stage 104 in which the material formulations are processed by co-extrusion system 12 to provide associated parisons, and a co-extrusion stage 106 in which the parisons are extruded to provide multi-layer tube 10 as shown in FIG. 1 and suggested in FIG. 2.

Co-extrusion process 100 is performed on co-extrusion system 12 as shown in FIG. 1. Co-extrusion system 12 includes an inner-layer extruder 20, an outer-layer extruder 22, a core-layer extruder 24, and an co-extrusion die 26 as shown in FIG. 1. Inner-layer extruder 20 receives an inner-layer formulation 28 of a relatively high-density polymeric material and processes inner-layer formulation 28 to provide an inner parison 30, sometimes called inner-layer parison 30, to co-extrusion die 26 as suggested in FIG. 1 and shown in FIG. 2. Outer-layer extruder 22 receives an outer-layer formulation 32 of a relatively high-density polymeric material and processes outer-layer formulation 32 to provide an outer parison 34, sometimes called outer-layer parison, to co-extrusion die 26 as suggested in FIG. 1 and shown in FIG. 2. Core-layer extruder 24 receives a core-layer formulation 36 of a relatively low-density insulative cellular non-aromatic polymeric material and processes core-layer formulation 36 to provide a core parison 38 to co-extrusion die 26 as suggested in FIG. 1 and shown in FIG. 2. Co-extrusion die 26 receives the various parisons 30, 34, 38 and extrudes multi-layer tube 10 as shown in FIG. 1.

Co-extrusion process 100 begins with preparing stage 102. Preparing stage 102 includes a preparing operation 102A in which inner-layer formulation 28 is prepared and provided to inner-layer extruder 20 as shown in FIG. 1 and suggested in FIG. 2. Preparing stage 102 also includes another preparing operation 102B in which core-layer formulation 36 is prepared and provided to core-layer extruder 24. Preparing stage 102 further includes another preparing operation 102C in which outer-layer formulation 32 is prepared and provided to outer-layer extruder 22. While three formulations are discussed herein, more or less formulations may be fed to associated extruders to produce a multiple layer tube having more or less layers.

Extrusion stage 104 of co-extrusion process 100 begins after preparing stage 102 is complete as suggested in FIG. 2. Extrusion stage 104 begins with an extruding operation 104A in which inner-layer extruder 20 processes inner-layer formulation 28 to provide inner parison 30 as suggested in FIG. 2. Extrusion stage 104 further includes another extruding operation 104B in which core-layer extruder 24 processes core-layer formulation 36 to provide core parison 38, sometimes called core-layer parison 38, as suggested in FIG. 2. Extrusion stage 104 further includes yet another extruding operation 104C in which outer-layer extruder 22 processes outer-layer formulation 32 to provide outer parison 34. While three extruders are discussed herein, more or less extruders may be used to produce associated parisons for use in establishing a multi-layer tube having more or less layers. Reference is hereby made to U.S. patent application Ser. No. 14/475,411, filed Sep. 2, 2014 and titled MULTI-LAYER TUBE AND PROCESS OF MAKING THE SAME for disclosure relating to various extrusion details in accordance with the present disclosure, which application is hereby incorporated herein by reference in its entirety.

Co-extrusion stage 106 of co-extrusion process 100 begins after extrusion stage 104 is complete as shown in FIG. 2. Co-extrusion stage 106 begins with an aligning operation 106A in which the inner-layer, outer-layer, and core parisons 30, 34, 38 are fed from associated extruders 20, 22, 24 to co-extrusion die 26 and aligned by upper tooling included in co-extrusion die 26 so that core parison 38 is located between inner-layer and outer parisons 30, 34 as shown in FIG. 1. Co-extrusion stage 106 then proceeds to an extruding operation 106B in which all three parisons 30, 34, 38 are co-extruded at the same time through lower tooling included in co-extrusion die 26 to begin forming multi-layer tube 10 as suggested in FIG. 1 and shown in FIGS. 3, 6, and 7. Co-extrusion stage 106 then proceeds to an establishing operation 106C when a sufficient length of multi-layer tube 10 has been established. Once establishing operation 106C is complete, multi-layer tube 10 is ready for a subsequent operation such as a blow-molding process in which a multi-layer container 11, 111, sometimes called a vessel, may be established or a slitting process in which a multi-layer sheet may be established. Reference is hereby made to U.S. Provisional Application Ser. No. 61/872,183, filed Aug. 30, 2013 and titled CONTAINER AND PROCESS FOR MAKING SAME and U.S. application Ser. No. 14/475,266, filed Sep. 2, 2014 and titled CONTAINER AND PROCESS FOR MAKING SAME for disclosure relating a process for forming a multi-layer container using a multi-layer tube, which applications are hereby incorporated by reference in their entirety herein.

Non-core layer formulations, such as inner-layer formulation 28 and outer-layer formulation 32 can each comprise an HDPE material and optionally include additives. The optional additives may include fibers for improving structural integrity, colorants, and processing aids to improve the extrusion and blow molding processes. The HDPE material and optional additives can be combined via blending to provide inner-layer formulation 28 and outer-layer formulation 32. In illustrative embodiments, non-core layer formulations can comprise an HDPE material as a base resin and a PE as a second base resin. In an exemplary embodiment described herein, outer-layer formulation 32 comprises an HDPE base resin and an LLDPE base resin.

In an embodiment, a non-core layer can include fiber. A suitable fiber can be a synthetic fiber that reinforces polyolefin formulations to provide, e.g., higher stiffness to the material and better feeding and handling during extrusion or blow molding process. A suitable fiber for a polymeric layer includes a synthetic, mineral based fiber, such as Hyperform® HPR-803i (Milliken & Co., Spartanburg, S.C.). Another suitable fiber blend contains about 15% Hyperform® HPR-803i (available from Milliken Chemical) and about 85% Braskem F020HC High Crystallinity Polypropylene (available from Braskem). In an embodiment, one or more non-core polymeric layers includes fiber. In an illustrative embodiment, a multi-layer tube 10 has fiber in an outer layer 14 but inner layer 16 does not include fiber.

The amount of fiber may be one of several different values or fall within one of several different ranges. It is within the scope of the present disclosure to select an amount of fiber to be one of the following values: about 5%, about 10%, about 15%, about 20%, and about 25% of the layer by weight percentage. It is within the scope of the present disclosure for the amount of fiber in the layer to fall within one of many different ranges. In a first set of ranges, the range of fiber is one of the following ranges: about 0% to about 25% (w/w), about 5% to about 25%, about 10% to about 25%, about 15% to about 25%, and about 20% to about 25 of the total layer by weight percentage. In a second set of ranges, the range of fiber is one of the following ranges: about 0% to about 25%, about 0% to about 20%, about 0% to about 15%, about 0% to about 10%, and about 0% to about 5% of the total layer by weight percentage. In a third set of ranges, the range of fiber is one of the following ranges: about 5% to about 20%, about 5% to about 15%, and about 5% to about 10%. In a fourth set of ranges, the range of fiber is one of the following ranges: about 10% to about 20%, and about 10% to about 15% of the total layer by weight percentage. In an embodiment, non-core layers lack fiber.

In an embodiment, one of the non-core layers can include a colorant. The colorants can be supplied in a Masterbatch mixture and combined via blending with the formulation. In an example, Ampacet 112761 White Polyethylene Masterbatch is used as a colorant. The amount of a colorant may be one of several different values or fall within one of several different ranges. It is within the scope of the present disclosure to select an amount of a colorant to be one of the following values: about 0%, about 0.1%, about 0.25%, about 0.5%, about 0.75%, about 1%, about 2%, about 3%, about 4% about 5%, about 6%, and about 7% of the total formulation of the polymeric layer by weight percentage.

It is within the scope of the present disclosure for the amount of a colorant in the formulation to fall within one of many different ranges. In a first set of ranges, the range of a colorant is one of the following ranges: about 0% to about 7% (w/w), about 0.1% to about 7%, about 0.25% to about 7%, about 0.5% to about 7%, about 0.75% to about 7%, about 1% to about 7%, about 1.25% to about 7%, about 1.5% to about 7%, about 1.5% to about 6%, about 1.5% to about 5%, about 1.75% to about 5%, about 2% to about 5%, about 2.25% to about 5%, about 2.5% to about 5%, about 3% to about 5%, and about 4% to about 5% of the total formulation of the polymeric layer by weight percentage. In a second set of ranges, the range of a colorant is one of the following ranges: about 0% to about 3%, about 0% to about 2.5%, about 0% to about 2.25%, about 0% to about 2%, about 0% to about 1.75%, about 0% to about 1.5%, about 0% to about 1.25%, about 0% to about 1%, about 0% to about 0.75%, and about 0% to about 0.5% of the total formulation of the polymeric layer by weight percentage. In a third set of ranges, the range of a colorant is one of the following ranges: about 0.1% to about 3.5%, about 0.5% to about 3%, about 0.75% to about 2.5%, and about 1% to about 2% of the total formulation by weight percentage. In an embodiment, the formulation lacks a colorant.

During preparing operation 102A of preparing stage 102, inner-layer formulation 28 is prepared and provided to inner-layer extruder 20 as shown in FIG. 1. In one example, inner-layer formulation 28 comprises at least one polymeric material. The polymeric material may include one or more resins. In one example, inner-layer formulation 28 includes a relatively high-density polymeric material. In yet another example, inner-layer formulation 28 is FORMOLENE® HB5502F HDPE hexene copolymer (available from Formosa Plastics Corporation).

In another example, inner-layer formulation 28 comprises a relatively high-density polymeric material and a colorant. The relatively high-density polymeric material may be FORMOLENE® HB5502F HDPE hexene copolymer (available from Formosa Plastics Corporation) and the colorant may be COLORTECH® 11933-19 Titanium Oxide Colorant (available from COLORTECH® a PPM Company).

In another example, inner-layer formulation 28 comprises about 80% to about 100% Marlex® HHM 5502BN HDPE (available from Chevron Phillips Chemical Company) and about 0% to about 20% Hyperform® HPR-803i (available from Milliken Chemical) as a reinforcing fiber.

Various inner-layer formulations 28 were ran through inner-layer extruder 20 for various trial runs. Table 1 below shows operating parameters for inner-layer extruder 20 for each trial run. Each screw used in inner-layer extruder 20, may be defined using a diameter and an L/D ratio where "L" is the length of the screw and "D" is the diameter of the screw.

TABLE 1

| | Inner-Layer Extruder Operating Parameters | | | | | | | | |
|---|---|---|---|---|---|---|---|---|---|
| Trial Run Number | Extruder Screw Size (mm) | L/D Ratio | Melt Pressure (PSI) | Melt Temp (° F.) | Screw RPM | Screw Torque (ft*lbs) | Temp Zone 1 (° F.) | Temp Zone 2 (° F.) | Temp Zone 3 (° F.) |
| 1 | 30 | 25:1 | 2950 | 363 | 18 | 28 | 350 | 360 | 370 |
| 2 | 30 | 25:1 | 2960 | 363 | 18 | 31 | 350 | 360 | 370 |

TABLE 1-continued

Inner-Layer Extruder Operating Parameters

| Trial Run Number | Extruder Screw Size (mm) | L/D Ratio | Melt Pressure (PSI) | Melt Temp (° F.) | Screw RPM | Screw Torque (ft*lbs) | Temp Zone 1 (° F.) | Temp Zone 2 (° F.) | Temp Zone 3 (° F.) |
|---|---|---|---|---|---|---|---|---|---|
| 3 | 30 | 25:1 | 2970 | 363 | 18 | 29 | 350 | 360 | 370 |
| 4 | 30 | 25:1 | 2930 | 363 | 18 | 28 | 350 | 360 | 370 |
| 5 | 30 | 25:1 | 3080 | 364 | 30 | 30 | 350 | 360 | 370 |
| 6 | 30 | 25:1 | 3080 | 364 | 18 | 30 | 350 | 360 | 370 |
| 7 | 30 | 25:1 | 3090 | 364 | 18 | 30 | 350 | 360 | 370 |
| 8 | 30 | 25:1 | 3150 | 364 | 18 | 33 | 350 | 360 | 370 |
| 9 | 30 | 25:1 | 3170 | 364 | 18 | 31 | 350 | 360 | 370 |
| 10 | * | * | * | * | * | * | * | * | * |
| 11 | 30 | 25:1 | 3310 | 363 | 18 | 33 | 350 | 360 | 370 |
| 12 | 30 | 25:1 | 3380 | 364 | 18 | 34 | 350 | 360 | 370 |
| 13 | 30 | 25:1 | 3370 | 364 | 18 | 32 | 350 | 360 | 370 |
| 14 | 30 | 25:1 | 3240 | 364 | 18 | 32 | 350 | 360 | 370 |
| 15 | 30 | 25:1 | 3250 | 364 | 18 | 31 | 350 | 360 | 370 |
| 16 | 30 | 25:1 | 3500 | 364 | 22 | 35 | 350 | 360 | 370 |
| 17 | 30 | 25:1 | 3430 | 366 | 22 | 34 | 350 | 360 | 370 |
| 18 | 30 | 25:1 | 3430 | 366 | 22 | 34 | 350 | 360 | 370 |
| 19 | 30 | 25:1 | 3480 | 366 | 26 | 34 | 350 | 360 | 370 |
| 20 | 30 | 25:1 | 4150 | 325 | 35 | 40 | 320 | 322 | 325 |
| 21 | 30 | 25:1 | 4150 | 325 | 35 | 38 | 320 | 322 | 325 |

* No data available for this trial run

During preparing operation 102C of preparing stage 102, outer-layer formulation 32 is prepared and provided to outer-layer extruder 22 as shown in FIG. 1. In one example, outer-layer formulation 32 comprises at least one polymeric material. The polymeric material may include one or more resins. In another example, outer-layer formulation 32 comprises relatively high-density polymeric material. In yet another example, outer-layer formulation 32 is FOR-MOLENE® HB5502F HDPE hexene copolymer (available from Formosa Plastics Corporation).

In another example, outer-layer formulation 32 comprises a relatively high-density polymeric material and a colorant. The relatively high-density polymeric material may be FOR-MOLENE® HB5502F HDPE hexene copolymer (available from Formosa Plastics Corporation) and the colorant may be COLORTECH® 11933-19 Titanium Oxide Colorant (available from COLORTECH® a PPM Company).

In another example, outer-layer formulation 32 comprises about 95% to about 100% Marlex® HHM 5502BN HDPE (available from Chevron Phillips Chemical Company) and about 5% COLORTECH® 11933-19 Titanium Oxide Colorant (available from COLORTECH® a PPM Company).

In another example, outer-layer formulation 32 comprises about 75% to about 100% Marlex® HHM 5502BN HDPE (available from Chevron Phillips Chemical Company), about 0% to about 5% COLORTECH® 11933-19 Titanium Oxide Colorant (available from COLORTECH® a PPM Company), and about 0% to about 20% Hyperform® HPR-803i (available from Milliken Chemical) as a reinforcing fiber. In another example, outer-layer formulation 32 comprises about 87% to about 92% Marlex® HHM 5502BN HDPE (available from Chevron Phillips Chemical Company), about 5% Ampacet 112761 White Polyethylene Masterbatch (available from Ampacet Corporation), and about 3% to about 8% Hyperform® HPR-803i (available from Milliken Chemical) as a reinforcing fiber.

In another example, outer-layer formulation 32 comprises about 75% to about 95% Marlex® HHM 5502BN HDPE (available from Chevron Phillips Chemical Company), about 5% Ampacet 112761 White Polyethylene Masterbatch (available from Ampacet Corporation) as a coloring agent, and about 0% to about 20% of a reinforcing fiber blend of about 15% Hyperform® HPR-803i (available from Milliken Chemical) and about 85% Braskem F020HC High Crystallinity Polypropylene (available from Braskem).

In another example, outer-layer formulation 32 comprises about 75% Marlex® HHM 5502BN HDPE (available from Chevron Phillips Chemical Company), about 12.5% Braskem Polypropylene Inspire 6025N (available from Braskem), about 5% Ampacet 112761 White Polyethylene Masterbatch (available from Ampacet Corporation) as a coloring agent, and about 7.5% Hyperform® HPR-803i (available from Milliken Chemical).

In another example, outer-layer formulation 32 comprises about 72% to about 75% of a base resin blend of about 50% Marlex® HHM 5502BN HDPE (available from Chevron Phillips Chemical Company) and about 50% DOW LLDPE 50041 Polyethylene, Low Density (available from the Dow Chemical Company), about 5% Ampacet 112761 White Polyethylene Masterbatch (available from Ampacet Corporation) as a coloring agent, about 20% of a reinforcing fiber blend of about 15% Hyperform® HPR-803i (available from Milliken Chemical) and about 85% Braskem F020HC High Crystallinity Polypropylene (available from Braskem), and between about 0% and about 3% of an Ampacet 102823 as a process aid.

In another example, outer-layer formulation 32 comprises about 95% DOW® DMDA 6400 NT7 (available from the DOW Chemical Company), and about 5% Ampacet 11078 White Polyethylene Masterbatch (available from Ampacet Corporation) as a coloring agent, Any of the foregoing examples of outer-layer formulations may further include between about 0% and about 3% of an Ampacet 102823 as a process aid.

Various outer-layer formulations 32 were ran through outer-layer extruder 22 for various trial runs. Table 2 below shows operating parameters for outer-layer extruder 22 for each trial run. Each screw used in outer-layer extruder 22, may be defined using a diameter and an L/D ratio where "L" is the length of the screw and "D" is the diameter of the screw.

TABLE 2

Outer-Layer Extruder Operating Parameters

| Trial Run Number | Extruder Screw Size (mm) | L/D Ratio | Melt Pressure (PSI) | Melt Temp (° F.) | Screw RPM | Screw Torque (ft*lbs) | Temp Zone 1 (° F.) | Temp Zone 2 (° F.) | Temp Zone 3 (° F.) |
|---|---|---|---|---|---|---|---|---|---|
| 1 | 30 | 25:1 | 2230 | 363 | 18 | 37 | 350 | 360 | 370 |
| 2 | 30 | 25:1 | 2200 | 363 | 18 | 36 | 350 | 360 | 370 |
| 3 | 30 | 25:1 | 2230 | 362 | 18 | 38 | 350 | 360 | 370 |
| 4 | 30 | 25:1 | 2210 | 362 | 18 | 33 | 350 | 360 | 370 |
| 5 | 30 | 25:1 | 2250 | 365 | 18 | 39 | 350 | 360 | 370 |
| 6 | 30 | 25:1 | 2350 | 365 | 18 | 43 | 350 | 360 | 370 |
| 7 | 30 | 25:1 | 2330 | 363 | 18 | 40 | 350 | 360 | 370 |
| 8 | 30 | 25:1 | 2360 | 363 | 18 | 38 | 350 | 360 | 370 |
| 9 | 30 | 25:1 | 2390 | 362 | 18 | 39 | 350 | 360 | 370 |
| 10 | * | * | * | * | * | * | * | * | * |
| 11 | 30 | 25:1 | 2960 | 360 | 18 | 41 | 350 | 360 | 370 |
| 12 | 30 | 25:1 | 2560 | 361 | 18 | 39 | 350 | 360 | 370 |
| 13 | 30 | 25:1 | 2580 | 361 | 18 | 42 | 350 | 360 | 370 |
| 14 | 30 | 25:1 | 2400 | 361 | 18 | 36 | 350 | 360 | 370 |
| 15 | 30 | 25:1 | 2410 | 361 | 18 | 37 | 350 | 360 | 370 |
| 16 | 30 | 25:1 | 2590 | 360 | 22 | 42 | 350 | 360 | 370 |
| 17 | 30 | 25:1 | 2500 | 362 | 22 | 42 | 350 | 360 | 370 |
| 18 | 30 | 25:1 | 2500 | 362 | 22 | 42 | 350 | 360 | 370 |
| 19 | 30 | 25:1 | 2540 | 363 | 26 | 40 | 350 | 360 | 370 |
| 20 | 30 | 25:1 | 2710 | 320 | 25 | 49 | 320 | 322 | 325 |
| 21 | 30 | 25:1 | 2720 | 321 | 25 | 47 | 320 | 322 | 325 |

* No data available for this trial run

In some examples, inner-layer formulation 28 and outer-layer formulation 32 may be the same. In other examples, inner-layer formulation 28 and outer-layer formulation 32 may be different.

During preparing operation 102B of preparing stage 102, core-layer formulation 36 is prepared and provided to core-layer extruder 24 as shown in FIG. 1. Core-layer formulation 36 is an insulative cellular non-aromatic polymeric material. In one example, core-layer formulation 36 comprises a polyethylene base resin and one or more cell-forming agents. Core-layer formulation 36 uses a polyethylene-based formulation to produce insulative cellular non-aromatic polymeric material after being processed through core-layer extruder 24. Core-layer formulation 36 is heated in core-layer extruder 24 where a cell-forming agent is introduced into the molten core-layer formulation 36M prior to moving the materials from core-layer extruder 24 to co-extrusion die 26. As molten core-layer formulation 36M exits co-extrusion die 26 between inner and outer layers 16, 14, cells nucleate in the molten material and the material expands to form core layer 18 made from insulative cellular non-aromatic polymeric material.

In one exemplary embodiment, core-layer formulation 36 used to produce the insulative cellular non-aromatic polymeric material includes at least one polymeric material. The polymeric material may include one or more base resins. In one example, the base resin is High Density Polyethylene (HDPE). In another example, the base resin is a unimodal HDPE. In yet another example, the base resin is unimodal, high-melt strength HDPE. In still yet another example, the base resin is a unimodal, high-melt strength HDPE such as DOW® DOWLEX™ IP 41 HDPE (available from The Dow Chemical Company) that has been electron beam modified to provide long chain branching and a melt index of about 0.25 g/10 min. Another example of a unimodal, high-melt strength HDPE is EQUISTAR® ALATHON® H5520 HDPE copolymer (available from Lyondell Chemical Company) which has been electron beam modified to have long-chain branching and a melt index of about 0.25 g/10 min. Another example of a suitable unimodal HDPE is FORMOLENE® HB5502F HDPE hexene copolymer (available from Formosa Plastics Corporation). In some embodiments, the HDPE has a melt index from about 0.1 g/10 min to about 0.4 g/10 min. In another example the HDPE has a melt index between 0.7 g/10 min and 0.9 g/10 min. In another example, the HDPE resin is DOW DMDA 6400 NT7 (available from The DOW Chemical Company).

In certain exemplary embodiments, core-layer formulation 36 may include two base resins that are HDPE. Reference is hereby made to U.S. patent application Ser. No. 14/331,066, filed Jul. 14, 2014 and titled POLYMERIC MATERIAL FOR CONTAINER, for disclosure relating to possible core-layer formulation options, which application is hereby incorporated in its entirety. One illustrative example of core-layer formulation 36 includes a first base resin of FORMOLENE® HB5502F HDPE hexene copolymer (available from Formosa Plastics Corporation) and a second base resin of EQUISTAR® ALATHON® H5520 HDPE copolymer (available from Lyondell Chemical Company). In embodiments with more than one HDPE copolymer, different HDPE copolymers can be used depending on the attributes desired in the formulation. For example, core-layer formulation 36 may include both e-beam modified EQUISTAR® ALATHON® H5520 and FORMOLENE® HB5502F HDPE. In such an embodiment the EQUISTAR® ALATHON® H5520 provides higher melt strength which increases foaming potential, and has less flexural modulus or brittleness. The FORMOLENE® HB5502F HDPE provides wide unimodal polydispersity index or distribution and maximizes economic advantage.

In certain exemplary embodiments, core-layer formulation 36 may include two base resins wherein the first base resin is an HDPE resin and the second base resin is a Low-Density Polyethylene (LDPE). In an example the LDPE resin has a melt index between 0.7 g/10 min and 0.9 g/10 min as measured by ASTM D1238. In another example, the LDPE resin is DOW™ LDPE 692 LDPE HEALTH+™ available from The Dow Chemical Company®.

In an illustrative example, the formulation comprises a blend of a certain percentage by weight of an HDPE resin and the remainder of the blend is an LDPE resin. In embodiments described herein, the percentage amount of HDPE in the blend may be 100%, 90%, 80%, 70%, 60%, 50%, 40%, 30%, 20%, 10% or 0 and the remainder of the blend is LDPE. It is within the present disclosure for the amount of HDPE in the blend to fall within one of many different ranges. In a set of ranges, the amount of HDPE in the blend can be about 0% to about 100%, about 20% to about 100%, about 40% to about 100%, about 60% to about 100%, about 70% to about 100%, about 80% to about 100%, about 80% to about 95%, and about 85% to about 95% of the blend. Polymeric material as disclosed herein includes at least one base resin. In illustrative embodiments, the at least one base resin can be HDPE.

In certain exemplary embodiments, the formulation may include two base resins that wherein one is HDPE and the other is a polypropylene. One illustrative example of the formulation includes a first base resin of FORMOLENE® HB5502F HDPE hexene copolymer (available from Formosa Plastics Corporation) and a second base resin of Braskem Polypropylene Inspire 6025N. In embodiments with more than one base resin, different HDPE or polypropylene copolymers can be used depending on the attributes desired in the formulation.

In certain exemplary embodiments, core-layer formulation 36 comprised VERSALITE (A) or VERSALITE (B). Reference is hereby made to U.S. patent application Ser. No. 14/462,073, filed Aug. 18, 2014 and titled POLYMERIC MATERIAL FOR AN INSULATED CONTAINER for disclosure relating to various formulations of VERSALITE in accordance with the present disclosure, which application is hereby incorporated herein by reference in its entirety. In further examples, LLDPE comprised DOW® DOWLEX™ 2045G LLDPE (available from The Dow Chemical Company), electron beam modified to have long-chain branching and a melt index of about 0.2 or 0.13 g/10 min. In another example, DOW® DOWLEX™ 2045G LLDPE (available from The Dow Chemical Company), electron beam modified to have long-chain branching and a melt index of about 0.15 g/10 min, was used as a second material of a second polyethylene base resin.

In another exemplary embodiment, core-layer formulation 36 comprised about 98% to about 100 Marlex® HHM 5502BN HDPE (available from Chevron Phillips Chemical Company) which was used as a polyethylene base resin.

In another exemplary embodiment, core-layer formulation 36 comprised about 100% Marlex® HHM 5502BN HDPE (available from Chevron Phillips Chemical Company) as a first material of a polyethylene base resin. EQUISTAR® ALATHON® H5520 HDPE copolymer (available from Lyondell Chemical Company), electron beam modified to have long-chain branching and a melt index of about 0.75 g/10 min, was used as a second material of the polyethylene base resin.

In another exemplary embodiment, core-layer formulation 36 comprised FORMOSA PLASTICS® FORMOLENE® HB5502F HDPE hexene copolymer as a first material of a polyethylene base resin. In some examples, the FORMOSA PLASTICS® FORMOLENE® HB5502F HDPE hexene copolymer comprises various amounts of virgin and second pass regrind material. Second pass regrind material uses material produced by bottles made from virgin and first pass regrind materials. In examples, the ratio of virgin HDPE material to regrind HDPE material is about 100%/0%, about 80%/20%, about 60%/40%, about 40%/60%, about 20%/80%, or about 0%/100%. The regrind material may include only first pass regrind material or it may include first pass and second pass regrind material.

In another example, core-layer formulation 36 comprised about 50% first-pass regrind material and about 50% of a formulation comprising about 99.6% Marlex® HHM 5502BN HDPE (available from Chevron Phillips Chemical Company), which was used as a polyethylene base resin.

In another exemplary embodiment, core-layer formulation 36 comprised levels of the various stages of regrind material. The core-layer formulation 36 may include, alone or in combination, first pass regrind material, second pass regrind material, third pass regrind material, fourth pass regrind material, fifth pass regrind material, or sixth pass regrind material. Each pass comprises about 50% of material produced by regrinding a bottle produced by the prior pass and about 50% virgin material. The combined material is used to make a new bottle. First pass regrind was obtained from bottles made of virgin material (stage 0), second pass regrind was obtained from bottles made of material from stage 1, third pass regrind was obtained from bottles made of material from stage 2, fourth pass regrind was obtained from bottles made of material from stage 3, fifth pass regrind was obtained from bottles made of material from stage 4, and sixth pass regrind was obtained from bottles made of material from stage 5.

In some embodiments, the HDPE base resin comprises up to about 90% regrind, up to about 80% regrind, up to about 60% regrind, up to about 40% regrind, up to about 20% regrind, about 20% to about 90% regrind, about 30% to about 90% regrind, about 40% to about 90% regrind, about 50% to about 90% regrind, about 20% to about 75% regrind, about 30% to about 75% regrind, about 40% to about 75% regrind, about 50% to about 75% regrind, about 20% to about 60% regrind, about 30% to about 60% regrind, about 40% to about 60% regrind, or about 50% to about 60% regrind. The regrind may be first pass regrind, second pass regrind, third pass regrind, and the like.

In another example, core-layer formulation 36 includes about 50% e-beam modified EQUISTAR® ALATHON® H5520 and about 50% FORMOLENE® HB5502F HDPE. Together the combination provides a film having drop resistance capability associated with a non-modified HDPE resin and increased melt strength of an e-beam modified long-chain branched HDPE. Depending on the desired characteristics, the percentage of two HDPE copolymers may be varied, e.g., about 25%/75%, about 30%/70%, about 35%/65%, about 40%/60%, about 45%/55%, about 50%/50%, etc. In an embodiment, core-layer formulation 36 includes three HDPE copolymers in the base resin. Again, depending on the desired characteristics, the percentage of three HDPE copolymers may be varied, about 33%/33%/33%, about 30%/30%/40%, about 25%/25%/50%, etc.

Core-layer formulations include one or more base resins. The amount of HDPE base resin may be one of several different values or fall within one of several different ranges. It is within the scope of the present disclosure to select an amount of HDPE base resin to be one of the following values: about 85%, about 90%, about 95%, about 97%, about 98%, about 99%, about 99.5%, and about 99.9% of the total formulation by weight percentage. It is within the scope of the present disclosure for the amount of HDPE base resin in the formulation to fall within one of many different ranges. In a first set of ranges, the range of HDPE base resin is one of the following ranges: about 85% to about 99.9%, about 86% to about 99.9%, about 87% to about 99.9%, about 87.5% to about 99.9%, about 88% to about 99.9%, about 89% to about 99.9%, about 90% to about 99.9%, about 91% to about 99.9%, about 92% to about 99.9%, about 93% to about 99.9%, about 94% to about 99.9%, about 95% to about 99.9%, about 96% to about 99.9%, about 96.5% to about 99.9%, about 97% to about 99.9%, and about 98% to about 99.9%, of the total formulation by weight percentage. In a second set of ranges, the range of HDPE base resin is one of the following ranges: about 85% to about 99.5%, about 85% to about 99%, about 85% to about 98%, about 85% to about 97%, about 85% to about 96%, about 85% to about 96.5%, about 85% to about 95%, about 85% to about 94%, about 85% to about 93%, about 85% to about 92%, about 85% to about 91%, about 85% to about 90%, about 85% to about 89%, about 85% to about 88%, about 85% to about 87%, and about 85% to about 86% of the total formulation by weight percentage. In a third set of ranges, the range of HDPE base resin is one of the following ranges: about 87.5% to about 96.5%, about 87.5% to about 96%, about 87.5% to about 95.5%, about 87.5% to about 95%, about 95% to about 99%, about 95.5% to about 99%, about 96% to about 99%, and about 96.5% to about 99% of the total formulation by weight percentage. Each of these values and ranges is embodied in the Examples.

Long chain branching refers to the presence of polymer side chains (branches) that have a length that is comparable or greater than a length of the backbone to which the polymer side chains are coupled to. Long chain branching creates viscoelastic chain entanglements (polymer entanglements) that hamper flow during extensional or oriented stretching and provide for a strain hardening phenomenon. The strain hardening phenomenon may be observed through two analytical methods.

The first analytical method used to observe the presence of strain hardening on an extensional rheometer. During extensional or oriented flow on an extensional rheometer, strain hardening will occur when polymer entanglements do not allow the polymer to flow under Linear Viscoelastic (LVE) conditions. As a result, these polymer entanglements hamper flow and create a deviation from the LVE conditions as observed as a hook formation. The strain hardening phenomenon becomes more severe as strain and strain rate increase due to faster and more severe polymer chain entanglement motion. Virgin polymers without long chain branching will exhibit LVE flow characteristics. In comparison, long chain branched polymers will exhibit strain hardening and which causes a deviation from the LVE flow characteristics of the virgin polymer providing the hook formation under the same test conditions.

The second analytical method used to observe the presence of long chain branching is evaluating melt strength data as tested per ISO 16790 which is incorporated by reference herein in its entirety. An amount of melt strength is known to be directly related to the presence of long chain branching when compared to similar virgin polymers lacking long chain branching. By way of example, Borealis DAPLOY™ WB140HMS Polypropylene (PP) (available from Borealis AG) is compared to other polymers having similar molecular weight, polydispersity index, and other physical characteristics. The DAPLOY™ WB140HMS PP has a melt strength which exceeds about 36 cN while other similar PP resins lacking long chain branching have a melt strength of less than about 10 cN.

Core-layer formulation 36 used to produce the insulative cellular non-aromatic polymeric material may further include one or more cell-forming agents. Cell-forming agents include nucleating agents and blowing agents. A nucleating agent is used to provide and control nucleation sites within a molten formulation to promote formation of cells, bubbles, or voids in the molten formulation during extrusion. A blowing agent is used to grow cells in the molten material at nucleation sites. Blowing agents may be used alone in the formulation or with nucleating agents.

Nucleating agent means a chemical or physical material that provides sites for cells to form in a molten formulation mixture. Nucleating agents may include chemical nucleating agents and physical nucleating agents. The nucleating agent may be blended with the formulation that is introduced into the hopper of the extruder. Alternatively, the nucleating agent may be added to the molten resin mixture in the extruder.

A core-layer formulation can include a nucleating agent. The amount of a nucleating agent may be one of several different values or fall within one of several different ranges. It is within the scope of the present disclosure to select an amount of a nucleating agent and be one of the following values: about 0.1%, about 0.25%, about 0.5%, about 0.75%, about 1%, about 1.5%, about 2%, about 2.5%, about 3%, about 3.5%, about 4%, about 5%, about 10%, and 1 about 5% of the total formulation by weight percentage. It is within the scope of the present disclosure for the amount of a nucleating agent in the formulation to fall within one of many different ranges. In a first set of ranges, the range of a nucleating agent is one of the following ranges: about 0.1% to about 15%, about 0.25% to about 15%, about 0.5% to about 15%, about 1% to about 15%, about 1.5% to about 15%, about 2% to about 15%, about 2.5% to about 15%, about 3% to about 15%, about 3.5% to about 15%, about 4% to about 15%, about 4.5% to about 15%, and about 5% to about 15% of the total formulation by weight percentage. In a second set of ranges, the range of a nucleating agent is one of the following ranges: about 0.1% to about 10%, about 0.25% to about 10%, about 0.5% to about 10%, about 0.75% to about 10%, about 1% to about 10%, about 1.5% to about 10%, about 2% to about 10%, about 2.5% to about 10%, about 3% to about 10%, about 3.5% to about 10%, about 4% to about 10%, about 4.5% to about 10%, and about 5% to about 10% of the total formulation by weight percentage. In a third set of ranges, the range of a nucleating agent is one of the following ranges: about 0.1% to about 5%, about 0.25% to about 5%, about 0.5% to about 5%, about 0.75% to about 5%, about 1% to about 5%, about 1.5% to about 5%, about 2% to about 5%, about 2.5% to about 5%, about 3% to about 5%, about 3.5% to about 5%, about 4% to about 5%, and about 4.5% to about 5% of the total formulation by weight percentage. Each of these values and ranges is embodied in the Examples.

Suitable physical nucleating agents have desirable particle size, aspect ratio, and top-cut properties. Examples include, but are not limited to, talc, $CaCO_3$, mica, and mixtures of at least two of the foregoing. One representative example is Heritage Plastics HT6000 Linear Low Density Polyethylene (LLDPE) Based Talc Concentrate.

A core-layer formulation can include a physical nucleating agent. The amount of a physical nucleating agent may be one of several different values or fall within one of several different ranges. It is within the scope of the present disclosure to select an amount of a physical nucleating agent to be one of the following values: about 0%, about 0.1%, about 0.25%, about 0.5%, about 0.75%, about 1%, about 1.25%, about 1.5%, about 1.75%, about 2%, about 2.25%, about 2.5%, about 3%, about 4%, about 5%, about 6%, or about 7% of the total formulation by weight percentage. It is within the scope of the present disclosure for the amount of a physical nucleating agent in the formulation to fall within one of many different ranges. In a first set of ranges, the range of a physical nucleating agent is one of the following ranges: about 0% to about 7% (w/w), about 0.1% to about 7%, about 0.25% to about 7%, about 0.5% to about 7%, about 0.75% to about 7%, about 1% to about 7%, about 1.25% to about 7%, about 1.5% to about 7%, about 1.75% to about 7%, about 2.0% to about 7%, about 2.25% to about 7%, about 2.5% to about 7%, about 3% to about 7%, about 4% to about 7%, about 5% to about 7%, and about 6% to about 7% of the total formulation by weight percentage. In a second set of ranges, the range of a physical nucleating agent is one of the following ranges: about 0% to about 6%, about 0% to about 5%, about 0% to about 4%, about 0% to about 3%, about 0% to about 2.5%, about 0% to about 2.25%, about 0% to about 2%, about 0% to about 1.75%, about 0% to about 1.5%, about 0% to about 1.25%, about 0% to about 1%, about 0% to about 0.75%, and about 0% to about 0.5% of the total formulation by weight percentage. In a third set of ranges, the range of a physical nucleating agent is one of the following ranges: about 0.1% to about 6%, about 0.1% to about 5%, about 0.1% to about 4%, about 0.1% to about 3.5%, about 0.1% to about 3%, about 0.1% to about 2.5%, about 0.1% to about 2.25%, about 0.1% to about 2%, about 0.1% to about 1.75%, about 0.1% to about 1.5%, about 0.1% to about 1.25%, about 0.1% to about 1%, about 0.1% to about 0.75%, and about 0.1% to about 0.5% of the total formulation by weight percentage. In an embodiment, the formulation lacks talc. Each of these values and ranges is embodied in the Examples.

Suitable chemical nucleating agents decompose to create cells in the molten formulation when a chemical reaction temperature is reached. These small cells act as nucleation sites for larger cell growth from a physical or other type of blowing agent. In one example, the chemical nucleating agent is citric acid or a citric acid-based material. One representative example is HYDROCEROL™ CF-40E (available from Clariant Corporation), which contains citric acid and a crystal nucleating agent.

Formulations used to produce insulative cellular non-aromatic polymeric materials can include a chemical nucleating agent. The amount of a chemical nucleating agent may be one of several different values or fall within one of several different ranges. It is within the scope of the present disclosure to select an amount of a chemical nucleating agent to be one of the following values: about 0.1%, about 0.25%, about 0.5%, about 0.75%, about 1%, about 1.5%, about 2%, about 2.5%, about 3%, about 3.5%, about 4%, about 5%, 1 about 0%, and about 15% of the total formulation by weight percentage. It is within the scope of the present disclosure for the amount of a chemical nucleating agent in the formulation to fall within one of many different ranges. In a first set of ranges, the range of a chemical nucleating agent is one of the following ranges: about 0.1% to about 15%, about 0.25% to about 15%, about 0.5% to about 15%, about 1% to about 15%, about 1.5% to about 15%, about 2% to 1 about 5%, about 2.5% to about 15%, about 3% to about 15%, about 3.5% to about 15%, about 4% to about 15%, about 4.5% to about 15%, and about 5% to about 15% of the total formulation by weight percentage. In a second set of ranges, the range of a chemical nucleating agent is one of the following ranges: about 0.1% to about 10%, about 0.25% to about 10%, about 0.5% to about 10%, about 0.75% to about 10%, about 1% to about 10%, about 1.5% to about 10%, about 2% to about 10%, about 2.5% to about 10%, about 3% to about 10%, about 3.5% to about 10%, about 4% to about 10%, about 4.5% to about 10%, and about 5% to about 10% of the total formulation by weight percentage. In a third set of ranges, the range of a chemical nucleating agent is one of the following ranges: about 0.1% to about 5%, about 0.25% to about 5%, about 0.5% to about 5%, about 0.75% to about 5%, about 1% to about 5%, about 1.5% to about 5%, about 2% to about 5%, about 2.5% to about 5%, about 3% to about 5%, about 3.5% to about 5%, about 4% to about 5%, and about 4.5% to about 5% of the total formulation by weight percentage. Each of these values and ranges is embodied in the Examples.

A blowing agent refers to a physical or a chemical material (or combination of materials) that acts to expand nucleation sites. Blowing agents may include only chemical blowing agents, only physical blowing agents, combinations thereof, or several types of chemical and physical blowing agents. The blowing agent acts to reduce density by forming cells in the molten formulation at the nucleation sites. The blowing agent may be added to the molten resin mixture in the extruder.

Chemical blowing agents are materials that degrade or react to produce a gas. Chemical blowing agents may be endothermic or exothermic. Chemical blowing agents typically degrade at a certain temperature to decompose and release gas. One example of a chemical blowing agent is citric acid or citric-based material. One representative example is HYDROCEROL™ CF-40E (available from Clariant Corporation), which contains citric acid and a crystal nucleating agent. Here, the citric acid decomposes at the appropriate temperature in the molten formulation and forms a gas which migrates toward the nucleation sites and grows cells in the molten formulation. If sufficient chemical blowing agent is present, the chemical blowing agent may act as both the nucleating agent and the blowing agent.

In another example, chemical blowing agents may be selected from the group consisting of azodicarbonamide; azodiisobutyro-nitrile; benzenesulfonhydrazide; 4,4-oxybenzene sulfonylsemicarbazide; p-toluene sulfonyl semicarbazide; barium azodicarboxylate; N,N'-dimethyl-N,N'-dinitrosoterephthalamide; trihydrazino triazine; methane; ethane; propane; n-butane; isobutane; n-pentane; isopentane; neopentane; methyl fluoride; perfluoromethane; ethyl fluoride; 1,1-difluoroethane; 1,1,1-trifluoroethane; 1,1,1,2-tetrafluoro-ethane; pentafluoroethane; perfluoroethane; 2,2-difluoropropane; 1,1,1-trifluoropropane; perfluoropropane; perfluorobutane; perfluorocyclobutane; methyl chloride; methylene chloride; ethyl chloride; 1,1,1-trichloroethane; 1,1-dichloro-1-fluoroethane; 1-chloro-1,1-difluoroethane; 1,1-dichloro-2,2,2-trifluoroethane; 1-chloro-1,2,2,2-tetrafluoroethane; trichloromonofluoromethane; dichlorodifluoromethane; trichlorotrifluoroethane; dichlorotetrafluoroethane; chloroheptafluoropropane; dichlorohexafluoropropane; methanol; ethanol; n-propanol; isopropanol; sodium bicarbonate; sodium carbonate; ammonium bicarbonate; ammonium carbonate; ammonium nitrite; N,N'-dimethyl-N,N'-dinitrosoterephthalamide; N,N'-dinitrosopentamethylene tetramine; azodicarbonamide; azobisisobutylonitrile; azocyclohexylnitrile; azodiaminobenzene; bariumazodicarboxylate; benzene sulfonyl hydrazide; toluene sulfonyl hydrazide; p,p'-oxybis(benzene sulfonyl hydrazide); diphenyl sulfone-3,3'-disulfonyl hydrazide; calcium azide; 4,4'-diphenyl disulfonyl azide; p-toluene sulfonyl azide, and combinations thereof.

In one aspect of the present disclosure, where a chemical blowing agent is used, the chemical blowing agent may be introduced into the material formulation that is added to the hopper. The amount of a chemical blowing agent may be one of several different values or fall within one of several different ranges. It is within the scope of the present disclosure to select an amount of a chemical blowing agent to be one of the following values: about 0%, about 0.05%, about 0.1%, about 0.5%, about 0.75%, about 1%, about 1.5%, about 2%, about 3%, about 4%, and about 5%, of the total formulation of the polymeric layer by weight percentage. It is within the scope of the present disclosure for the amount of a chemical blowing agent in the formulation to fall within one of many different ranges. In a first set of ranges, the range of a chemical blowing agent is one of the following ranges: about 0.1% to about 5% (w/w), about 0.25% to about 5%, about 0.5% to about 5%, about 0.75% to about 5%, about 1% to about 5%, about 1.5% to about 5%, and about 2% to 5 about % of the total formulation of the polymeric layer by weight percentage. In a second set of ranges, the range of a chemical blowing agent is one of the following ranges: about 0.1% to about 2%, about 0.25% to about 2%, about 0.5% to about 2%, about 0.75% to about 2%, about 1% to about 2%, and about 1.5% to about 2% of the total formulation by weight percentage. In a third set of ranges, the range of a chemical blowing agent is one of the following ranges: about 0.1% to about 1%, about 0.25% to about 1%, about 0.5% to about 1%, and about 0.75% to about 1%, of the total formulation of the polymeric layer by weight percentage.

One example of a physical blowing agent is nitrogen ($N_2$). The $N_2$ is pumped into the molten formulation via a port in the extruder as a supercritical fluid. The molten material with the $N_2$ in suspension then exits the extruder via a die where a pressure drop occurs. As the pressure drop happens, $N_2$ moves out of suspension toward the nucleation sites where cells grow. Excess gas blows off after extrusion with the remaining gas trapped in the cells formed in the extrudate. Other suitable examples of physical blowing agents include, but are not limited to, carbon dioxide ($CO_2$), helium, argon, air, pentane, butane, or other alkane mixtures of the foregoing and the like.

In an illustrative example, a physical blowing agent may be introduced at a rate of about 0.02 pounds per hour (lbs/h) to about 1.3 (lbs/h). In another illustrative example, the physical blowing agent may be introduced at a rate of about 0.03 (lbs/h) to about 1.25 (lbs/h). In another illustrative example, the physical blowing agent may be introduced at a rate of about 0.02 (lbs/h) to about 0.15 (lbs/h). In another illustrative example, the physical blowing agent may be introduced at a rate of about 0 (lbs/h) to about 0.15 (lbs/h). In another illustrative example, the physical blowing agent may be introduced at a rate of about 0.02 (lbs/h) to about 0.22 (lbs/h). In another illustrative example, the physical blowing agent may be introduced at a rate of about 0.02 (lbs/h) to about 0.25 (lbs/h). In still yet another illustrative example the physical blowing agent may be introduced at a rate of about 0.07 (lbs/h) to about 0.27 (lbs/h). In some embodiments, the physical blowing agent is used between about 0.01 lbs/h to about 0.2 lbs/h, about 0.01 lbs/h to about 0.17 lbs/h, about 0.01 lbs/h to about 0.15 lbs/h, about 0.01 lbs/h to about 0.1 lbs/h, about 0.05 lbs/h to about 0.2 lbs/h, about 0.05 lbs/h to about 0.17 lbs/h, about 0.05 lbs/h to about 0.15 lbs/h, about 0.05 lbs/h to about 0.1 lbs/h, about 0.1 lbs/h to about 0.2 lbs/h, about 0.1 lbs/h to about 0.17 lbs/h, or about 0.1 lbs/h to about 0.15 lbs/h.

In further embodiments, the physical blowing agent is measured in saturation percentage (%). In exemplary embodiments, physical blowing agent saturation can have a range that is about 0.1% to about 0.4%, about 0.1% to about 0.35%, about 0.1% to about 0.3%, about 0.1% to about 0.25%, 0.15% to about 0.4%, about 0.15% to about 0.35%, about 0.15% to about 0.3%, about 0.15% to about 0.25%, 0.2% to about 0.4%, about 0.2% to about 0.35%, about 0.2% to about 0.3%, or about 0.2% to about 0.25%.

In one aspect of the present disclosure, at least one slip agent may be incorporated into the formulation to aid in increasing production rates. Slip agent (also known as a process aid) is a term used to describe a general class of materials which are added to the formulation and provide surface lubrication to the polymer during and after conversion. Slip agents may also reduce or eliminate die drool. Representative examples of slip agent materials include amides of fats or fatty acids, such as, but not limited to, erucamide and oleamide. In one exemplary aspect, amides from oleyl (single unsaturated C-18) through erucyl (C-22 single unsaturated) may be used. Other representative examples of slip agent materials include low molecular weight amides and fluoroelastomers. Combinations of two or more slip agents can be used. Slip agents may be provided in a master batch pellet form and blended with the resin formulation. One example of a suitable slip agent is Ampacet 102823 Process Aid PE MB LLDPE.

A core-layer formulation 36 can include a slip agent. The amount of a slip agent may be one of several different values or fall within one of several different ranges. It is within the scope of the present disclosure to select an amount of a slip agent to be one of the following values: about 0%, about 0.1%, 0 about 0.25%, 0 about 0.5%, about 0.75%, about 1%, about 1.25%, about 1.5%, about 1.75%, about 2%, about 2.25%, about 2.5%, and about 3%, of the total formulation by weight percentage. It is within the scope of the present disclosure for the amount of a slip agent in the formulation to fall within one of many different ranges. In a first set of ranges, the range of a slip agent is one of the following ranges: about 0% to about 3%, about 0.1% to about 3%, about 0.25% to about 3%, about 0.5% to about 3%, about 1% to about 3%, about 1.25% to about 3%, about 1.5% to about 3%, about 1.75% to about 3%, about 2% to about 3%, about 2.25% to about 3%, and about 2.5% to about 3% of the total formulation by weight percentage. In a second set of ranges, the range of a slip agent is one of the following ranges: about 0% to about 2.5%, about 0% to about 2%, about 0% to about 1.75%, about 0% to about 1.5%, about 0% to about 1.25%, about 0% to about 1%, about 0% to about 0.75%, about 0% to about 0.5%, and about 0.1% to about 2.5% of the total formulation by weight percentage. In a third set of ranges, the range of a slip agent is one of the following ranges: about 0.1% to about 2.5%, about 0.1% to about 2%, about 0.1% to about 1.75%, about 0.1% to about 1.5%, about 0.1% to about 1.25%, about 0.1% to about 1%, about 0.1% to about 0.75%, and about 0.1% to about 0.5% of the total formulation by weight percentage. Each of these values and ranges is embodied in the Examples.

In another aspect of the present disclosure, an impact modifier may be incorporated into the formulation to minimize fracturing of the insulative cellular non-aromatic polymeric material when subjected to an impact such as a drop test. One representative example of a suitable impact modifier is DOW® AFFINITY™ PL 1880G polyolefin plastomer. Another representative impact modifier is Vistamaxx available from the ExxonMobil™ Corporation. In an embodiment the core-layer formulation comprises an impact modifier. In another embodiment, a skin-layer formulation can comprise an impact modifier. In some embodiments, the impact modifier can be 2.5% or can be 5% by weight of the total formulation.

A core-layer formulation 36 may include a colorant. The amount of a colorant may be one of several different values or fall within one of several different ranges. It is within the scope of the present disclosure to select an amount of a colorant to be one of the following values: about 0%, about 0.1%, about 0.25%, about 0.5%, about 0.75%, about 1%, about 1.25%, about 1.5%, about 1.75%, about 2%, about 2.25%, about 2.5%, about 3%, and about 4% of the total formulation by weight percentage. It is within the scope of the present disclosure for the amount of a colorant in the formulation to fall within one of many different ranges. In a first set of ranges, the range of a colorant is one of the following ranges: about 0% to about 4%, about 0.1% to about 4%, about 0.25% to about 4%, about 0.5% to about 4%, about 1% to about 4%, about 1.25% to about 4%, about 1.5% to about 4%, about 1.75% to about 4%, about 2% to about 4%, about 2.25% to about 4%, about 2.5% to about 4%, and about 3% to about 4% of the total formulation by weight percentage. In a second set of ranges, the range of a colorant is one of the following ranges: about 0% to about 3%, about 0% to about 2.5%, about 0% to about 2.25%, about 0% to about 2%, about 0% to about 1.75%, about 0% to about 1.5%, about 0% to about 1.25%, about 0% to about 1%, about 0% to about 0.75%, and about 0% to about 0.5% of the total formulation by weight percentage. In a third set of ranges, the range of a colorant is one of the following ranges: about 0.1% to about 3.5%, about 0.1% to about 3%, about 0.1% to about 2.5%, about 0.1% to about 2.25%, about 0.1% to about 2%, about 0.1% to about 1.75%, about 0.1% to about 1.5%, about 0.1% to about 1.25%, about 0.1% to about 1%, about 0.1% to about 0.75%, and about 0.1% to about 0.5% of the total formulation by weight percentage. Each of these values and ranges is embodied in the Examples.

Various core-layer formulations 36 were ran through core-layer extruder 24 for various trial runs. Table 3 below shows some operating parameters for core-layer extruder 24 for each trial run include screw size dimension. In these illustrative examples, the screw used was a modified barrier screw. Each screw used in core-layer extruder 24, may be defined using a diameter and an L/D ratio where "L" is the length of the screw and "D" is the diameter of the screw. Table 4 below shows some other operating parameters for core-layer extruder 24 for each trial run.

TABLE 3

Core-Layer Extruder Operating Parameter

| Trial Run Number | Screw Size (mm) | L/D Ratio | Melt Pressure (PSI) | Melt Temp | Screw RPM | $N_2$ Injection Pressure (PSI) |
|---|---|---|---|---|---|---|
| 1 | 60 | 32:1 | 2,800 | 351 | 30 | 2,856 |
| 2 | 60 | 32:1 | 2,780 | 351 | 30 | 2,826 |
| 3 | 60 | 32:1 | 2,840 | 351 | 30 | 2,902 |
| 4 | 60 | 32:1 | 2,840 | 352 | 30 | 2,896 |
| 5 | 60 | 32:1 | 2,860 | 352 | 30 | 2,926 |
| 6 | 60 | 32:1 | 2,880 | 351 | 30 | 2,950 |
| 7 | 60 | 32:1 | 2,870 | 351 | 30 | 2,938 |
| 8 | 60 | 32:1 | 2,950 | 345 | 30 | 3,018 |
| 9 | 60 | 32:1 | 3,070 | 336 | 30 | 3,178 |
| 10 | 60 | 32:1 | 3,160 | 329 | 30 | 3,258 |
| 11 | 60 | 32:1 | 3,160 | 330 | 30 | 3,260 |
| 12 | 60 | 32:1 | 3,210 | 330 | 30 | 3,302 |
| 13 | 60 | 32:1 | 3,230 | 331 | 30 | 3,308 |
| 14 | 60 | 32:1 | 3,080 | 333 | 30 | 3,164 |
| 15 | 60 | 32:1 | 3,120 | 330 | 30 | 3,208 |
| 16 | 60 | 32:1 | 3,150 | 329 | 30 | 3,240 |
| 17 | 60 | 32:1 | 3,060 | 331 | 30 | 3,142 |
| 18 | 60 | 32:1 | 3,060 | 331 | 30 | 3,146 |
| 19 | 60 | 32:1 | 3,050 | 335 | 30.1 | 3,134 |
| 20 | 60 | 32:1 | 3,040 | 319 | 30 | 3,034 |
| 21 | 60 | 32:1 | 3,070 | 319 | 30 | 3,074 |

* No data available for this trial run

TABLE 4

Additional Core-Layer Extruder Operating Parameters

| Trial Run Number | Temp Zone 1 (° F.) | Temp Zone 2 (° F.) | Temp Zone 3 (° F.) | Temp Zone 4 (° F.) | Temp Zone 5 (° F.) | Temp Zone 6 (° F.) | Temp Zone 7 (° F.) |
|---|---|---|---|---|---|---|---|
| 1 | 330 | 340 | 350 | 350 | 370 | 355 | 350 |
| 2 | 330 | 340 | 350 | 350 | 370 | 355 | 350 |
| 3 | 330 | 340 | 350 | 350 | 370 | 355 | 350 |
| 4 | 330 | 340 | 350 | 350 | 370 | 355 | 350 |
| 5 | 330 | 340 | 350 | 350 | 370 | 355 | 350 |
| 6 | 330 | 340 | 350 | 350 | 370 | 355 | 350 |
| 7 | 330 | 340 | 350 | 350 | 370 | 355 | 350 |
| 8 | 330 | 340 | 350 | 350 | 350 | 350 | 350 |
| 9 | 350 | 345 | 340 | 350 | 330 | 330 | 330 |
| 10 | 350 | 345 | 360 | 350 | 320 | 320 | 320 |
| 11 | 350 | 345 | 360 | 350 | 320 | 320 | 320 |
| 12 | 350 | 345 | 360 | 350 | 320 | 320 | 320 |
| 13 | 350 | 345 | 360 | 350 | 320 | 320 | 320 |
| 14 | 350 | 345 | 360 | 350 | 320 | 320 | 320 |
| 15 | 350 | 345 | 360 | 350 | 320 | 320 | 320 |
| 16 | 350 | 345 | 360 | 350 | 320 | 320 | 320 |
| 17 | 350 | 345 | 360 | 350 | 320 | 320 | 320 |
| 18 | 350 | 345 | 360 | 350 | 320 | 320 | 320 |
| 19 | 350 | 345 | 360 | 350 | 320 | 320 | 320 |
| 20 | 300 | 310 | 315 | 320 | 320 | 320 | 320 |
| 21 | 300 | 310 | 315 | 320 | 320 | 320 | 320 |

* No data available for this trial run

In an embodiment, core-layer formulation 36 is processed by core-layer extruder 24 and extruded between inner and outer layers 14, 16 to produce multi-layer tube 10, also called multi-layer parison 10, as shown in FIG. 1. The density of core-layer 18 may be one of several different values or fall within one of several different ranges. It is within the scope of the present disclosure to select a density to be one of the following values: about 0.2 $g/cm^3$, about 0.25 $g/cm^3$, about 0.3 $g/cm^3$, about 0.35 $g/cm^3$, about 0.4 $g/cm^3$, about 0.45 $g/cm^3$, about 0.5 $g/cm^3$, about 0.55 $g/cm^3$, about 0.6 $g/cm^3$, about 0.65 $g/cm^3$, about 0.7 $g/cm^3$, about 0.75 $g/cm^3$, about 0.785 $g/cm^3$, and about 0.8 $g/cm^3$. It is within the scope of the present disclosure for the density of the formulation to fall within one of many different ranges. In a first set of ranges, the range of density is one of the following ranges: about 0.25 $g/cm^3$ to about 1 $g/cm^3$, about 0.25 $g/cm^3$ to about 0.9 $g/cm^3$, about 0.3 $g/cm^3$ to about 0.9 $g/cm^3$, about 0.35 $g/cm^3$ to about 0.9 $g/cm^3$, about 0.4 $g/cm^3$ to about 0.9 $g/cm^3$, about 0.45 $g/cm^3$ to about 0.8 $g/cm^3$, about 0.5 $g/cm^3$ to about 0.8 $g/cm^3$, about 0.55 $g/cm^3$ to about 0.8 $g/cm^3$, about 0.6 $g/cm^3$ to about 0.8 $g/cm^3$, about 0.65 $g/cm^3$ to about 0.8 $g/cm^3$, about 0.7 $g/cm^3$ to about 0.8 $g/cm^3$, and about 0.75 $g/cm^3$ to about 0.8 $g/cm^3$. In a second set of ranges, the range of density is one of the following ranges: about 0.25 $g/cm^3$ to about 0.785 $g/cm^3$, about 0.3 $g/cm^3$ to about 0.785 $g/cm^3$, about 0.35 $g/cm^3$ to about 0.785 $g/cm^3$, about 0.4 $g/cm^3$ to about 0.785 $g/cm^3$, about 0.45 $g/cm^3$ to about 0.785 $g/cm^3$, about 0.5 $g/cm^3$ to about 0.785 $g/cm^3$, about 0.55 $g/cm^3$ to about 0.785 $g/cm^3$, about 0.6 $g/cm^3$ to about 0.785 $g/cm^3$, about 0.65 $g/cm^3$ to about 0.785 $g/cm^3$, about 0.7 $g/cm^3$ to about 0.785 $g/cm^3$, and about 0.75 $g/cm^3$ to about 0.785 $g/cm^3$. In a third set of ranges, the range of density is one of the following ranges: about 0.4 $g/cm^3$ to about 0.7 $g/cm^3$, about 0.45 $g/cm^3$ to about 0.7 $g/cm^3$, about 0.5 $g/cm^3$ to about 0.7 $g/cm^3$, about 0.55 $g/cm^3$ to about 0.7 $g/cm^3$, about 0.6 $g/cm^3$ to about 0.7 $g/cm^3$, and about 0.65 $g/cm^3$ to about 0.7 $g/cm^3$. In a fourth set of ranges, the range of density is one of the following ranges: about 0.2 $g/cm^3$ to about 0.5 $g/cm^3$, about 0.25 $g/cm^3$ to about 0.45 $g/cm^3$, about 0.25 $g/cm^3$ to about 0.4 $g/cm^3$, about 0.3 g/cm³ to about 0.45 g/cm³, about 0.3 g/cm³ to about 0.4 g/cm³, about 0.35 g/cm³ to about 0.4 g/cm³, and about 0.3 g/cm³ to about 0.35 g/cm³. In a fifth set of ranges, the range of density is one of the following ranges: about 0.4 g/cm³ to about 0.65 g/cm³, about 0.45 g/cm³ to about 0.65 g/cm³, about 0.5 g/cm³ to about 0.6 g/cm³, about 0.55 g/cm³ to about 0.65 g/cm³, about 0.6 g/cm³ to about 0.65 g/cm³, about 0.4 g/cm³ to about 0.6 g/cm³, about 0.45 g/cm³ to about 0.6 g/cm³, about 0.5 g/cm³ to about 0.6 g/cm³, about 0.4 g/cm³ to about 0.55 g/cm³, about 0.45 g/cm³ to about 0.55 g/cm³, about 0.5 g/cm³ to about 0.55 g/cm³, about 0.4 g/cm³ to about 0.5 g/cm³, and about 0.45 g/cm³ to about 0.5 g/cm³. In a sixth set of ranges, the range of density is one of the following ranges: about 0.40 g/cm³ to about 0.70 g/cm³, about 0.37 g/cm³ to about 0.56 g/cm³, about 0.470 g/cm³ to about 0.526 g/cm³, about 0.421 g/cm³ to about 0.571 g/cm³, about 0.406 g/cm³ to about 0.644 g/cm³, about 0.397 g/cm³ to about 0.468 g/cm³, and about 0.429 g/cm³ to about 0.431 g/cm³. Each of these values and ranges is embodied in the Examples. Density was determined according to the density test procedure outlined in Example 2.

In an embodiment, multi-layer tube 10 includes core layer 18 located between inner and outer layers 14, 16. The density of multi-layer tube 10 may be one of several different values or fall within one of several different ranges. It is within the scope of the present disclosure to select a density to be one of the following values: about 0.1 g/cm³, about 0.15 g/cm³, about 0.2 g/cm³, about 0.25 g/cm³, about 0.3 g/cm³, about 0.35 g/cm³, about 0.4 g/cm³ about 0.45 g/cm³, about 0.5 g/cm³, about 0.55 g/cm³, about 0.6 g/cm³, about 0.65 g/cm³, about 0.7 g/cm³, about 0.75 g/cm³, about 0.785 g/cm³, and about 0.8 g/cm³. It is within the scope of the present disclosure for the density of the formulation to fall within one of many different ranges. In a first set of ranges, the range of density is one of the following ranges: about 0.1 g/cm³ to about 0.8 g/cm³, about 0.15 g/cm³ to about 0.8 g/cm³, about 0.2 g/cm³ to about 0.8 g/cm³, about 0.25 g/cm³ to about 0.8 g/cm³, about 0.3 g/cm³ to about 0.8 g/cm³, about 0.35 g/cm³ to about 0.8 g/cm³, about 0.4 g/cm³ to about 0.8 g/cm³, about 0.45 g/cm³ to about 0.8 g/cm³, about 0.5 g/cm³ to about 0.8 g/cm³, about 0.55 g/cm³ to about 0.8 g/cm³, about 0.6 g/cm³ to about 0.8 g/cm³, about 0.65 g/cm³ to about 0.8 g/cm³, about 0.7 g/cm³ to about 0.8 g/cm³, and about 0.75 g/cm³ to about 0.8 g/cm³. In a second set of ranges, the range of density is one of the following ranges: about 0.1 g/cm³ to about 0.75 g/cm³, about 0.1 g/cm³ to about 0.7 g/cm³, about 0.1 g/cm³ to about 0.65 g/cm³, about 0.1 g/cm³ to about 0.6 g/cm³, about 0.1 g/cm³ to about 0.55 g/cm³, about 0.1 g/cm³ to about 0.5 g/cm³, about 0.1 g/cm³ to about 0.45 g/cm³, about 0.1 g/cm³ to about 0.4 g/cm³, about 0.1 g/cm³ to about 0.35 g/cm³, about 0.1 g/cm³ to about 0.3 g/cm³, about 0.1 g/cm³ to about 0.25 g/cm³, about 0.1 g/cm³ to about 0.2 g/cm³, and about 0.1 g/cm³ to about 0.15 g/cm³. In a third set of ranges, the range of density is one of the following ranges: about 0.3 g/cm³ to about 0.8 g/cm³, about 0.35 g/cm³ to about 0.8 g/cm³, about 0.35 g/cm³ to about 0.75 g/cm³, about 0.4 g/cm³ to about 0.75 g/cm³, about 0.4 g/cm³ to about 0.7 g/cm³, about 0.4 g/cm³ to about 0.65 g/cm³, and about 0.4 g/cm³ to about 0.6 g/cm³. Each of these values and ranges is embodied in the Examples. Density was determined according to the density test procedure outlined in Example 2.

In an embodiment, the density of the insulative cellular non-aromatic polymeric material may be one of several different values or fall within one of several different ranges. It is within the scope of the present disclosure to select a density and be one of the following values: about 0.1 g/cm³, about 0.15 g/cm³, about 0.2 g/cm³, about 0.25 g/cm³, about 0.3 g/cm³, about 0.35 g/cm³, about 0.4 g/cm³ about 0.45 g/cm³, about 0.5 g/cm³, about 0.55 g/cm³, about 0.6 g/cm³, about 0.65 g/cm³, about 0.7 g/cm³, about 0.75 g/cm³, about 0.785 g/cm³, and about 0.8 g/cm³. It is within the scope of the present disclosure for the density of the insulative cellular non-aromatic polymeric material to fall within one of many different ranges. In a first set of ranges, the range of density is one of the following ranges: about 0.1 g/cm³ to about 0.8 g/cm³, about 0.15 g/cm³ to about 0.8 g/cm³, about 0.2 g/cm³ to about 0.8 g/cm³, about 0.25 g/cm³ to about 0.8 g/cm³, about 0.3 g/cm³ to about 0.8 g/cm³, about 0.35 g/cm³ to about 0.8 g/cm³, about 0.4 g/cm³ to about 0.8 g/cm³, about 0.45 g/cm³ to about 0.8 g/cm³, about 0.5 g/cm³ to about 0.8 g/cm³, about 0.55 g/cm³ to about 0.8 g/cm³, about 0.6 g/cm³ to about 0.8 g/cm³, about 0.65 g/cm³ to about 0.8 g/cm³, about 0.7 g/cm³ to about 0.8 g/cm³, and about 0.75 g/cm³ to about 0.8 g/cm³. In a second set of ranges, the range of density is one of the following ranges: about 0.1 g/cm³ to about 0.75 g/cm³, about 0.1 g/cm³ to about 0.7 g/cm³, about 0.1 g/cm³ to about 0.65 g/cm³, about 0.1 g/cm³ to about 0.6 g/cm³, about 0.1 g/cm³ to about 0.55 g/cm³, about 0.1 g/cm³ to about 0.5 g/cm³, about 0.1 g/cm³ to about 0.45 g/cm³, about 0.1 g/cm³ to about 0.4 g/cm³, about 0.1 g/cm³ to about 0.35 g/cm³, about 0.1 g/cm³ to about 0.3 g/cm³, about 0.1 g/cm³ to about 0.25 g/cm³, about 0.1 g/cm³ to about 0.2 g/cm³, and about 0.1 g/cm³ to about 0.15 g/cm³. In a third set of ranges, the range of density is one of the following ranges: about 0.1 g/cm³ to about 0.8 g/cm³, about 0.15 g/cm³ to about 0.75 g/cm³, about 0.2 g/cm³ to about 0.6 g/cm³, about 0.2 g/cm³ to about 0.5 g/cm³, about 0.2 g/cm³ to about 0.45 g/cm³, about 0.25 g/cm³ to about 0.45 g/cm³, and about 0.25 g/cm³ to about 0.4 g/cm³. Each of these values and ranges is embodied in the Examples. Density of the insulative cellular non-aromatic polymeric material may be determined by any suitable method. One example of determining density includes measuring a density of the multi-layer tube or multi-layer container, determining relative thicknesses of each layer, and calculating the density of the insulative cellular non-aromatic polymeric material using the relative thicknesses of the layers, the known density of the other layers, and the known density of the multi-layer tube or container.

In an embodiment, the insulative cellular non-aromatic polymeric material is located between and coupled to inner polymeric layer 16 and outer polymeric layer 14 to produce multi-layer tube 10. The outer layer thickness of multi-layer tube 10 may be one of several different values or fall within one several different ranges. It is within the scope of the present disclosure for the thickness of outer layer 14 of multi-layer tube 10 to fall within one of many different ranges. In a first set of ranges, the thickness of outer layer 14 is one of the following ranges: about 5 mils to about 26 mils, about 6 mils to about 24 mils, about 8 mils to about 24 mils, and about 10 mils to about 24 mils. In a second set of ranges, the thickness of the outer layer of a multi-layer parison is one of the following ranges: about 5 mils to about 26 mils, about 6 mils to about 24 mils, about 8 mils to about 24 mils, and about 10 mils to about 24 mils. In another set of ranges, the outer layer thickness can be a percentage of the overall thickness of multi-layer tube 10. In a set of ranges, the percentage thickness of outer layer 14 can be about 4% to about 30%, about 4% to about 25%, about 4% to about 20%, about 6% to about 20%, about 10% to about 20% of the overall thickness of multi-layer tube 10. In a second set of ranges, the percentage thickness of outer layer 14 can be about 5% to about 9%, about 5% to about 8%, about 5.5% to about 8%, and about 5.5% to about 7% of the overall thickness of multi-layer tube 10.

In an embodiment, the insulative cellular non-aromatic polymeric material is located between and coupled to inner polymeric layer 16 and outer polymeric layer 14 to produce multi-layer tube 10. The core layer thickness of multi-layer tube 10 may be one of several different values or fall within one several different ranges. It is within the scope of the present disclosure for the thickness of core layer 18 of the multi-layer tube 10 to fall within one of many different ranges. In a first set of ranges, the thickness is one of the following ranges: about 14 mils to 130 mils, about 20 mils to about 130 mils, about 40 mils to about 130 mils, and about 50 mils to about 130 mils. In a second set of ranges, the thickness of the core layer is one of the following ranges: about 60 mils to about 130 mils, about 70 mils to about 130 mils, about 80 mils to about 130 mils, about 90 mils to about 130 mils, and about 100 mils to about 130 mils, and about 6.5 mils to about 8 mils. In another set of ranges, the core layer thickness can be a percentage of the overall thickness of the multi-layer parison. In a first set of ranges, the percentage thickness of core layer 18 can be about 30% to about 90%, about 35% to about 90%, about 40% to about 90%, about 45% to about 90%, about 45% to about 85%, 50% to about 85%, about 55% to about 85%, about 55% to about 80% and about 60% to about 80% of the overall thickness of multi-layer tube 10.

In an embodiment, the insulative cellular non-aromatic polymeric material is located between and coupled to inner polymeric layer 16 and outer polymeric layer 14 to produce multi-layer tube 10. The inner layer thickness of multi-layer tube 10 may be one of several different values or fall within one several different ranges. It is within the scope of the present disclosure for the thickness of inner layer 14 of multi-layer tube 10 to fall within one of many different ranges. In a first set of ranges, the thickness of outer layer 14 is one of the following ranges: about 5 mils to about 26 mils, about 6 mils to about 24 mils, about 8 mils to about 24 mils, and about 10 mils to about 24 mils. In a second set of ranges, the thickness of the outer layer of a multi-layer parison is one of the following ranges: about 5 mils to about 26 mils, about 6 mils to about 24 mils, about 8 mils to about 24 mils, and about 10 mils to about 24 mils. In another set of ranges, the inner layer thickness can be a percentage of the overall thickness of multi-layer tube 10. In a set of ranges, the percentage thickness of inner layer 16 can be about 4% to about 30%, about 4% to about 25%, about 4% to about 20%, about 6% to about 20%, about 10% to about 20% of the overall thickness of multi-layer tube 10. In a second set of ranges, the percentage thickness of outer layer 14 can be about 5% to about 9%, about 5% to about 8%, about 5.5% to about 8%, and about 5.5% to about 7% of the overall thickness of multi-layer tube 10.

Figure 3:
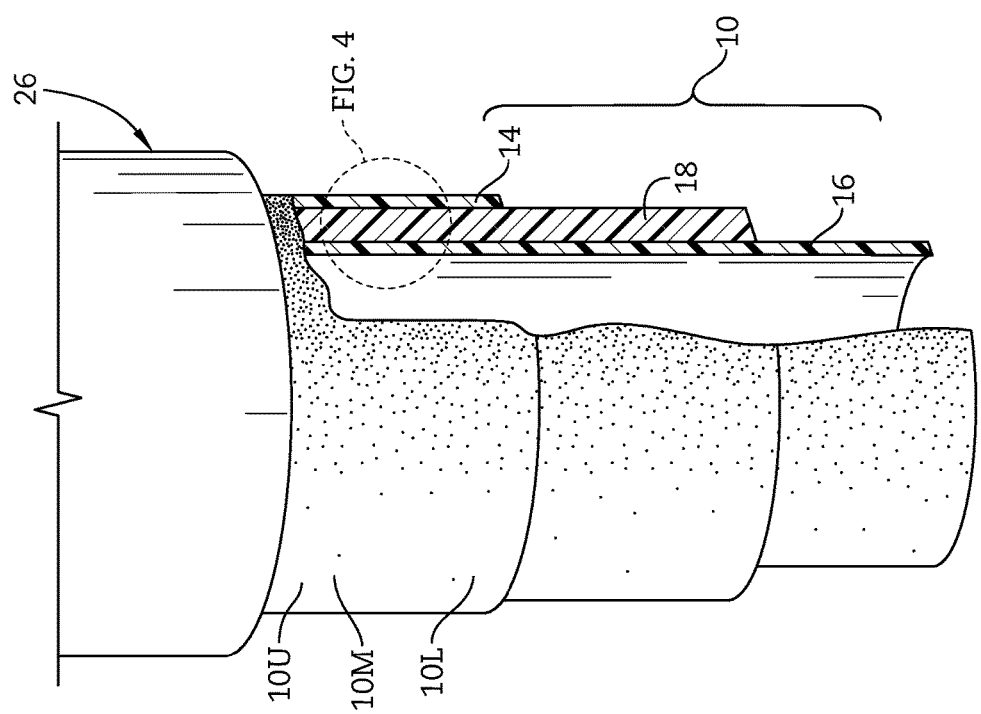
FIG. 3 is an enlarged partial-perspective view of the extrusion die and multi-layer tube of FIG. 1 with portions of the multi-layer tube broken away to reveal that the multi-layer tube includes, from inside to outside, the inner layer, the core layer, and the outer layer.

Together, inner-layer, outer-layer, and core parisons 30, 34, 38 were provided to co-extrusion die 26. There the parisons 30, 34, 38 were aligned and extruded together to establish multi-layer tube 10. Various formulations 28, 32, 36, were passed through associated extruders 20, 22, 24 to establish associated parisons 30, 34, 38 which were then passed through co-extrusion die 26. Table 5 below shows operating parameters of co-extrusion die 26 for the various trial runs. Co-extrusion die 26 includes, for example, a W. Müller Co-Ex 6 head and lower tooling as shown in FIG. 3.

TABLE 5

Co-extrusion Die Operating Parameters

| Trial Run Number | Head Type | Head Temp Divider Top (° F.) | Head Temp Divider Bottoms-Sides (° F.) | Head Temp Lower Housing (° F.) | Head Temp Upper Housing (° F.) | Front Temp Divider Top (° F.) | Front Temp Divider Bottom (° F.) | Front Temp Bushing (° F.) |
|---|---|---|---|---|---|---|---|---|
| 1 | W. Müller Co-Ex 6 | 330 | 330 | 330 | 330 | 330 | — | 350 |
| 2 | W. Müller Co-Ex 6 | 330 | 330 | 330 | 330 | 330 | — | 350 |
| 3 | W. Müller Co-Ex 6 | 330 | 330 | 330 | 330 | 330 | — | 350 |
| 4 | W. Müller Co-Ex 6 | 330 | 330 | 330 | 330 | 330 | — | 350 |
| 5 | W. Müller Co-Ex 6 | 330 | 330 | 330 | 330 | 330 | — | 350 |
| 6 | W. Müller Co-Ex 6 | 330 | 330 | 330 | 330 | 330 | — | 350 |
| 7 | W. Müller Co-Ex 6 | 330 | 330 | 330 | 330 | 330 | — | 350 |
| 8 | W. Müller Co-Ex 6 | 330 | 330 | 330 | 330 | 330 | — | 350 |
| 9 | W. Müller Co-Ex 6 | 330 | 330 | 330 | 330 | 330 | — | 335 |
| 10 | W. Müller Co-Ex 6 | 330 | 330 | 330 | 330 | 330 | — | 320 |
| 11 | W. Müller Co-Ex 6 | 330 | 330 | 330 | 330 | 330 | — | 320 |
| 12 | W. Müller Co-Ex 6 | 330 | 330 | 330 | 330 | 330 | — | 320 |
| 13 | W. Müller Co-Ex 6 | 330 | 330 | 330 | 330 | 330 | — | 320 |
| 14 | W. Müller Co-Ex 6 | 330 | 330 | 330 | 330 | 330 | — | 320 |
| 15 | W. Müller Co-Ex 6 | 330 | 330 | 330 | 330 | 330 | — | 320 |

TABLE 5-continued

Co-extrusion Die Operating Parameters

| Trial Run Number | Head Type | Head Temp Divider Top (° F.) | Head Temp Divider Bottoms- Sides (° F.) | Head Temp Lower Housing (° F.) | Head Temp Upper Housing (° F.) | Front Temp Divider Top (° F.) | Front Temp Divider Bottom (° F.) | Front Temp Bushing (° F.) |
|---|---|---|---|---|---|---|---|---|
| 16 | W. Müller Co-Ex 6 | 330 | 330 | 330 | 330 | 330 | — | 320 |
| 17 | W. Müller Co-Ex 6 | 330 | 330 | 330 | 330 | 330 | — | 320 |
| 18 | W. Müller Co-Ex 6 | 330 | 330 | 330 | 330 | 330 | — | 320 |
| 19 | W. Müller Co-Ex 6 | 330 | 330 | 330 | 330 | 330 | — | 320 |
| 20 | W. Müller Co-Ex 6 | 320 | 305 | 305 | 305 | 305 | — | 350 |
| 21 | W. Müller Co-Ex 6 | 320 | 305 | 305 | 305 | 305 | — | 350 |

* No data available for this trial run

According to an aspect of the present invention, there is provided a method of forming a multi-layer parison formed from an insulative cellular non-aromatic polymeric material, the parison comprising an inner parison, an outer parison and a core parison disposed between the inner parison and the outer parison, the method comprising the steps of:
(a) extruding an inner-layer formulation to form the inner parison,
(b) extruding a core-layer formulation to form the core parison,
(c) extruding an outer-layer formulation to form the outer parison,
(d) aligning the inner parison from step (a), the core parison from step (b), and the outer parison from step (c) such that the core parison is located between the inner parison and the outer parison to form an extruded multi-layer parison,
wherein the multi-layer parison has a density of about 0.4 g/cm$^3$ to 0.5 g/cm$^3$.

The inner, core and outer parisons forming the multi-layer parison are disposed one directly on top of the other, in the sense that the core parison is coupled to the inner parison on one side and the outer parison on the other side.

In an embodiment, in step (d), the inner parison from step (a), the core parison from step (b), and the outer parison from step (c) are aligned such that the core parison is located between the inner parison and the outer parison and the aligned parisons are then co-extruded to form the multi-layer parison. Suitably, co-extrusion may be performed without the use of a tandem extruder.

In an embodiment, the multi-layer parison is extruded in the form of a multi-layer tube in which the core parison surrounds the inner parison and the outer parison surrounds the core parison.

In another embodiment, the outer and inner skin layers each comprise a high density polymeric material. Suitably, the high-density polymeric material is high density polyethylene. In an embodiment, the high density polyethylene is a HDPE hexene copolymer. In a particular embodiment, the high density polyethylene is FORMOLENE® HB5502F HDPE hexene copolymer (available from Formosa Plastics Corporation).

In certain embodiments, one or both of the inner and outer layers comprise a high-density polymeric material as hereinbefore defined and a colorant. For example, one or both of the inner and outer layers may comprise about 93-99.9% (w/w) of a high-density polymeric material as hereinbefore defined and about 0.1 to about 7% (w/w) of a colorant. In an embodiment, one or both of the inner and outer layers may comprise 97-99.9% (w/w) of a high-density polymeric material as hereinbefore defined and 0.1 to 3% (w/w) a colorant. In a further embodiment, one or both of the inner and outer layers may comprise 98-99.5% (w/w) of a high-density polymeric material as hereinbefore defined and 0.5 to 2% (w/w) a colorant. The relatively high-density polymeric material may be FORMOLENE® HB5502F HDPE hexene copolymer (available from Formosa Plastics Corporation) and the colorant may be COLORTECH® 11933-19 Titanium Oxide Colorant (available from COLORTECH® a PPM Company).

Multi-layer tube 10 has an upper portion 10U, a lower portion 10L, and a middle portion 10M extending between and interconnecting the upper portion 10U and the lower portion 10L, as shown in FIG. 3. Each of the upper portion 10U, the lower portion 10L, and the middle portion 10M have a width that is transverse to the direction of tube formation. In an example, each of lower portion 10L, middle portion 10M and lower portion 10L have the same width.

Figures 6, 7:
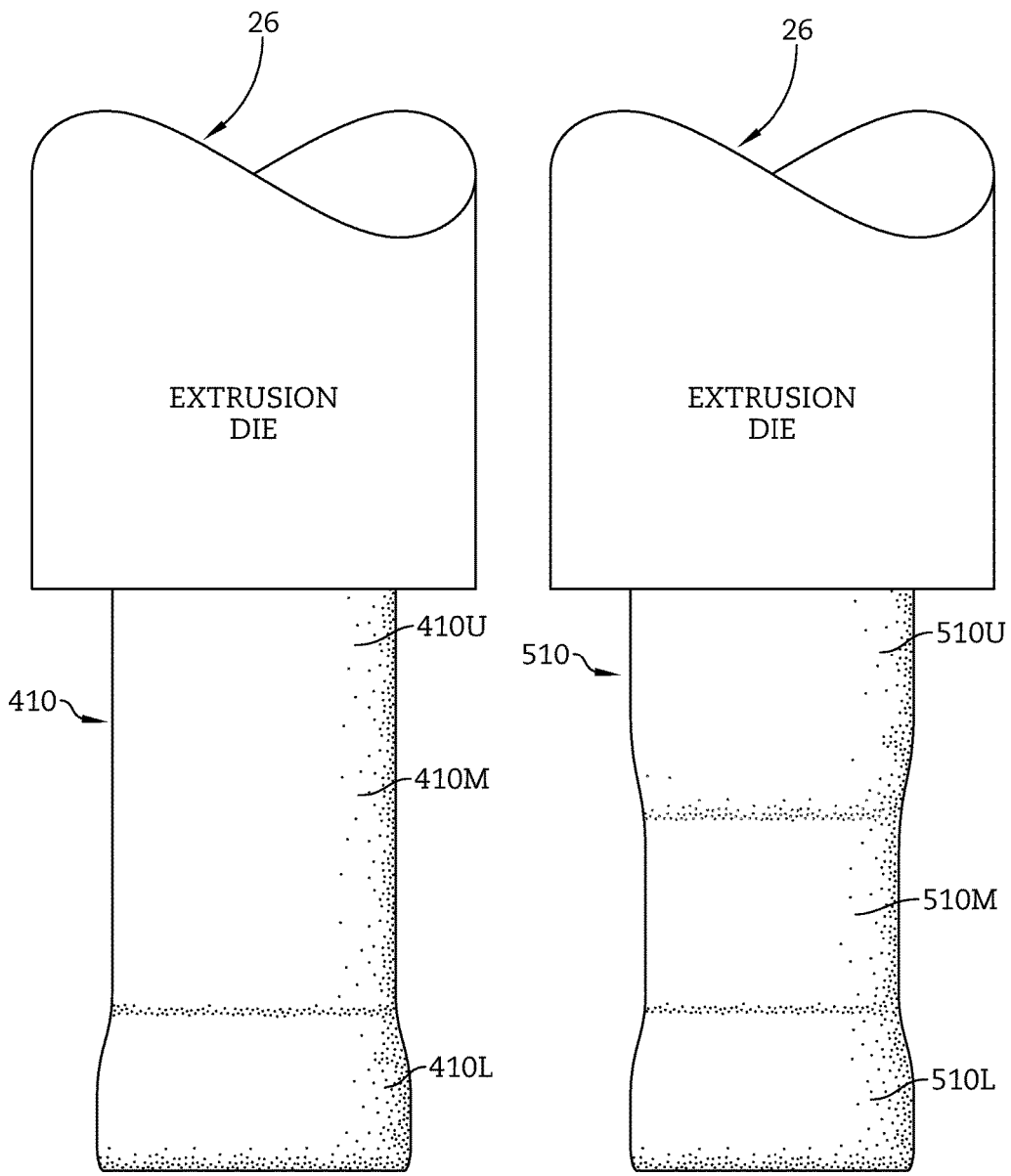
FIG. 6 is a diagrammatic view of one embodiment of a multi-layer tube formed in accordance with the present disclosure and showing that the multi-layer tube has a second profile shape in which a lower portion of the profile has a relatively greater width than both a middle portion and a top portion of the profile.
FIG. 7 is a diagrammatic view of one embodiment of a multi-layer tube formed in accordance with the present disclosure showing that the multi-layer tube has a third profile shape in which both a lower portion and an upper portion of the profile have relatively greater widths than a middle portion of the profile.

In another embodiment, a multi-layer tube 410 has an upper portion 410U, a lower portion 410L, and a middle portion 410M extending between and interconnecting the upper portion 410U and the lower portion 410L, as shown in FIG. 6. In an example, multi-layer tube 410 has a non-uniform profile C1. Each of the upper portion 410U, the lower portion 410L, and the middle portion 410M have a width that is transverse to the direction of tube formation, as shown in FIG. 6. The width of upper portion 410U is generally the same as the width of middle portion 410M. The width of lower portion 410L is generally greater than the width of upper portion 410U and middle portion 410M.

In another embodiment, a multi-layer tube 510 has an upper portion 510U, a lower portion 510L, and a middle portion 510M extending between and interconnecting the upper portion 510U and the lower portion 510L, as shown in FIG. 7. In an example, multi-layer tube 510 has a non-uniform profile C2. Each of the upper portion 510U, the lower portion 510L, and the middle portion 510M have a width that is transverse to the direction of tube formation, as shown in FIG. 7. The width of upper portion 510U is generally the same as the width of lower portion 410L. The width of middle portion 510M is generally less than the width of upper portion 510U and lower portion 510L.

Parison cell counting is a method to measure the quality of the foam of the extruded material from co-extrusion process 100. The extruded material, for example a multi-layer tube 10, 410, 510, is cut in cross sections and viewed with microscopy. The number of cells are counted in a given unit volume, for example cubic inches. In an example, a square of a sample to be subjected to the parison cell counting method is cut from multi-layer tube 10, 410, 510. The excised square of the multi-layer tube 10, 410, 510 is then divided by cutting across the diagonal exposing the underlying cell structure. The cells are then visualized using microscopy and counted to give a cell density.

The cell density measured using the parison cell counting method may be one of several different values or fall within one of several different ranges. It is within the scope of the present disclosure to select a density to be one of the following values: about $0.9 \times 10^6$ cells/in$^3$, about $0.95 \times 10^6$ cells/in$^3$, about $1 \times 10^6$ cells/in$^3$, about $1.2 \times 10^6$ cells/in$^3$, about $1.4 \times 10^6$ cells/in$^3$, about $1.6 \times 10^6$ cells/in$^3$, about $1.7 \times 10^6$ cells/in$^3$, about $1.8 \times 10^6$ cells/in$^3$, about $1.9 \times 10^6$ cells/in$^3$, about $2 \times 10^6$ cells/in$^3$, about $2.1 \times 10^6$ cells/in$^3$, about $2.2 \times 10^6$ cells/in$^3$, about $2.3 \times 10^6$ cells/in$^3$, about $2.4 \times 10^6$ cells/in$^3$, about $2.5 \times 10^6$ cells/in$^3$, about $2.6 \times 10^6$ cells/in$^3$, about $2.7 \times 10^6$ cells/in$^3$, about $2.8 \times 10^6$ cells/in$^3$, about $2.9 \times 10^6$ cells/in$^3$, about $3 \times 10^6$ cells/in$^3$, about $3.1 \times 10^6$ cells/in$^3$, about $3.2 \times 10^6$ cells/in$^3$, and about $3.5 \times 10^6$ cells/in$^3$. It is within the scope of the present disclosure to select a density to be within one of the following ranges: about $0.9 \times 10^6$ cells/in$^3$ to about $3.5 \times 10^6$ cells/in$^3$, about $1 \times 10^6$ cells/in$^3$ to about $3.5 \times 10^6$ cells/in$^3$, about $1 \times 10^6$ cells/in$^3$ to about $3.2 \times 10^6$ cells/in$^3$, about $1 \times 10^6$ cells/in$^3$ to about $3 \times 10^6$ cells/in$^3$, about $1.2 \times 10^6$ cells/in$^3$ to about $3 \times 10^6$ cells/in$^3$, about $1.2 \times 10^6$ cells/in$^3$ to about $2.8 \times 10^6$ cells/in$^3$ about $1.2 \times 10^6$ cells/in$^3$ to about $2.5 \times 10^6$ cells/in$^3$ and about $1.2 \times 10^6$ cells/in$^3$ to about $2.2 \times 10^6$ cells/in$^3$.

In some examples, inner-layer formulation and outer-layer formulation may be the same. In other examples, inner-layer formulation and outer-layer formulation may be different.

The core-layer formulation is suitably as defined hereinbefore. In an embodiment, the core-layer formulation comprises:
- 85-99.9% (w/w) of a high density polyethylene (HDPE) as defined herein;
- 0.1-15% (w/w) of a nucleating agent as defined herein;
- 0-3% (w/w) of a slip agent as defined herein;
- 0-4% (w/w) of a colorant as defined herein.

In a further embodiment, the core-layer formulation comprises:
- 97-99.9% (w/w) of a high density polyethylene (HDPE) as defined herein;
- 0.1-3% (w/w) of a nucleating agent as defined herein;
- 0-3% (w/w) of a slip agent as defined herein; and
- 0-3% (w/w) of a colorant as defined herein.

According to another aspect of the present disclosure, there is provided a multi-layer parison obtainable, obtained, or directly obtained by a process defined herein.

In another embodiment, the method further comprises a step e) of blow-molding the multi-layer parison resulting from step d) to provide a container formed from insulative cellular non-aromatic polymeric material.

According to another aspect of the present disclosure, there is provided a method of forming a container formed from a multi-layer parison, wherein the multilayer parison is formed from an insulative cellular non-aromatic polymeric material and comprises an inner parison, an outer parison and a core parison disposed between the inner parison and the outer parison, the method comprising the steps of:
(a) extruding an inner-layer formulation to form the inner parison,
(b) extruding a core-layer formulation to form the core parison,
(c) extruding an outer-layer formulation to form the outer parison,
(d) aligning the inner parison from step (a), the core parison from step (b), and the outer parison from step (c) such that the core parison is located between the inner parison and the outer parison to form an extruded multi-layer parison;
(e) blow-molding the multi-layer parison resulting from step d) to provide a container formed from insulative cellular non-aromatic polymeric material, wherein the multi-layer parison has a density of about 0.4 g/cm3 to 0.5 g/cm3.

According to another aspect of the present disclosure, there is provided a container obtainable, obtained, or directly obtained by a process defined herein.

The multi-layer tubes 10, 410, 510 in accordance with the present disclosure can be blow molded to form multi-layer containers 11, 211, 311 as shown in FIGS. 8, 9, 11, and 12. Each multi-layer container 11, 211, 311 includes an inner layer 11A, 211A, 311A an outer layer 11C, 211C, 311C, and a core layer 11B, 211B, 311B located therebetween, as shown in FIGS. 8, 9, 11, and 12. The embodiments of multi-layer tubes 10, 410, 510 described herein can give rise to improved properties of the multi-layer containers 11, 211, 311 as shown in the test results in the Examples.

In an illustrative example, a multi-layer container 11, 211, 311 is a bottle having a) a core layer comprising HDPE, a chemical blowing agent, and talc; b) an outer polymeric layer comprising HDPE, a colorant, and optionally a fiber; and c) an inner polymeric layer comprising HDPE and optionally a fiber. In one example, the density of multi-layer container 11, 211, 311 is less than about 0.6 g/cm$^3$. In another example, the density of multi-layer container 11, 211, 311 is less than about 0.55 g/cm$^3$. In another example, the density of multi-layer container 11, 211, 311 is less than about 0.5 g/cm$^3$. In another example, the density of multi-layer container 11, 211, 311 is less than about 0.45 g/cm$^3$. In another example, the density of multi-layer container 11, 211, 311 is less than about 0.4 g/cm$^3$. In one example, the density of multi-layer container 11, 211, 311 is one of the following ranges: about 0.4 g/cm$^3$ to about 0.8 g/cm$^3$, about 0.4 g/cm$^3$ to about 0.7 g/cm$^3$, about 0.4 g/cm$^3$ to about 0.55 g/cm$^3$, about 0.4 g/cm$^3$ to about 0.5 g/cm$^3$, or about 0.4 g/cm$^3$ to about 0.45 g/cm$^3$.

EXAMPLES

Example 1

Formulations and Test Results

Inner-layer formulation 28 comprises about 100% FORMOSA PLASTICS® FORMOLENE® HB5502F HDPE hexene copolymer. Outer-layer formulation 32 comprises about 99% FORMOSA PLASTICS® FORMOLENE® HB5502F HDPE hexene copolymer and about 1% COLORTECH® 11933-19.

Core-layer formulation 36 comprises FORMOSA PLASTICS® FORMOLENE® HB5502F HDPE hexene copolymer which was used as polyethylene base resin. The polyethylene base resin was used in various percentages from about 97.95% to about 100% of the formulation. In some examples, the polyethylene base resin was blended with HYDROCEROL® CF 40E as a nucleating agent and Heritage Plastics HT6000 LLDPE talc as another nucleating agent, and N$_2$ as a blowing agent. The blowing agent was used at levels between about 0.05 lbs/hr to about 0.15 lbs/hour. COLORTECH® 11933-19 was added as a colorant in some examples. The various formulations and resulting multi-layer tube densities are shown below in Table 6.

TABLE 6

Comparison of different insulative cellular non-aromatic polymeric material formulations to create various multi-layer parison and insulative container densities.

| | Inner-Layer Formulation | Core-Layer Formulation | | | | Outer-Layer Formulation | | Tube |
|---|---|---|---|---|---|---|---|---|
| Trial | Formosa 5502F | Formosa 5502F | Color-tech | CF-40E | HT6000 | $N_2$ [lbs/hr] | Formosa 5502F | Color-tech | Density [g/cm$^3$] |
| 1 | 100% | 97.95% | 1% | 0.75% | 0.3% | 0.1222 | 99% | 1% | * |
| 2 | 100% | 98% | 0% | 2% | 0% | 0.0529 | 99% | 1% | * |
| 3 | 100% | 99.25% | 0% | 0.75% | 0% | 0.0534 | 99% | 1% | * |
| 4 | 100% | 99% | 0% | 1.0% | 0% | 0.0511 | 99% | 1% | 0.4292 |
| 5 | 100% | 98.7% | 0% | 1.0% | 0.3% | 0.0514 | 99% | 1% | 0.4272 |
| 6 | 100% | 98.45% | 0% | 1.25% | 0.3% | 0.0521 | 99% | 1% | 0.4276 |
| 7 | 100% | 98.75% | 0% | 1.25% | 0% | 0.0529 | 99% | 1% | 0.4236 |
| 8 | 100% | 98.75% | 0% | 1.25% | 0% | 0.0522 | 99% | 1% | 0.4234 |
| 9 | 100% | 98.75% | 0% | 1.25% | 0% | 0.0538 | 99% | 1% | 0.4304 |
| 10 | 0% | 100% | 0% | 0% | 0% | 0.1468 | 0% | 0% | * |
| 11 | 100% | 100% | 0% | 0% | 0% | 0.1392 | 99% | 1% | * |
| 12 | 100% | 99.9% | 0% | 0% | 0.1% | 0.1393 | 99% | 1% | * |
| 13 | 100% | 99.5% | 0% | 0% | 0.5% | 0.0656 | 99% | 1% | * |
| 14 | 100% | 99.4% | 0% | 0.1% | 0.5% | 0.0702 | 99% | 1% | * |
| 15 | 100% | 99.3% | 0% | 0.2% | 0.5% | 0.0692 | 99% | 1% | * |
| 16 | 100% | 99.7% | 0% | 0.1% | 0.2% | 0.0673 | 99% | 1% | * |
| 17 | 100% | 99.7% | 0% | 0.1% | 0.2% | 0.0892 | 99% | 1% | * |
| 18 | 100% | 99.7% | 0% | 0.1% | 0.2% | 0.105 | 99% | 1% | * |
| 19 | 100% | 99.7% | 0% | 0.1% | 0.2% | 0.1188 | 99% | 1% | * |
| 20 | 100% | 99.7% | 0% | 0.1% | 0.2% | 0.0915 | 99% | 1% | * |
| 21 | 100% | 99.05% | 0% | 0.75% | 0.2% | 0.0906 | 99% | 1% | * |

* Data not available

Example 2

Density Measurements

This Example demonstrates the test used to measure the density of filled and unfilled polymer parts.

Procedure

Figure 5:
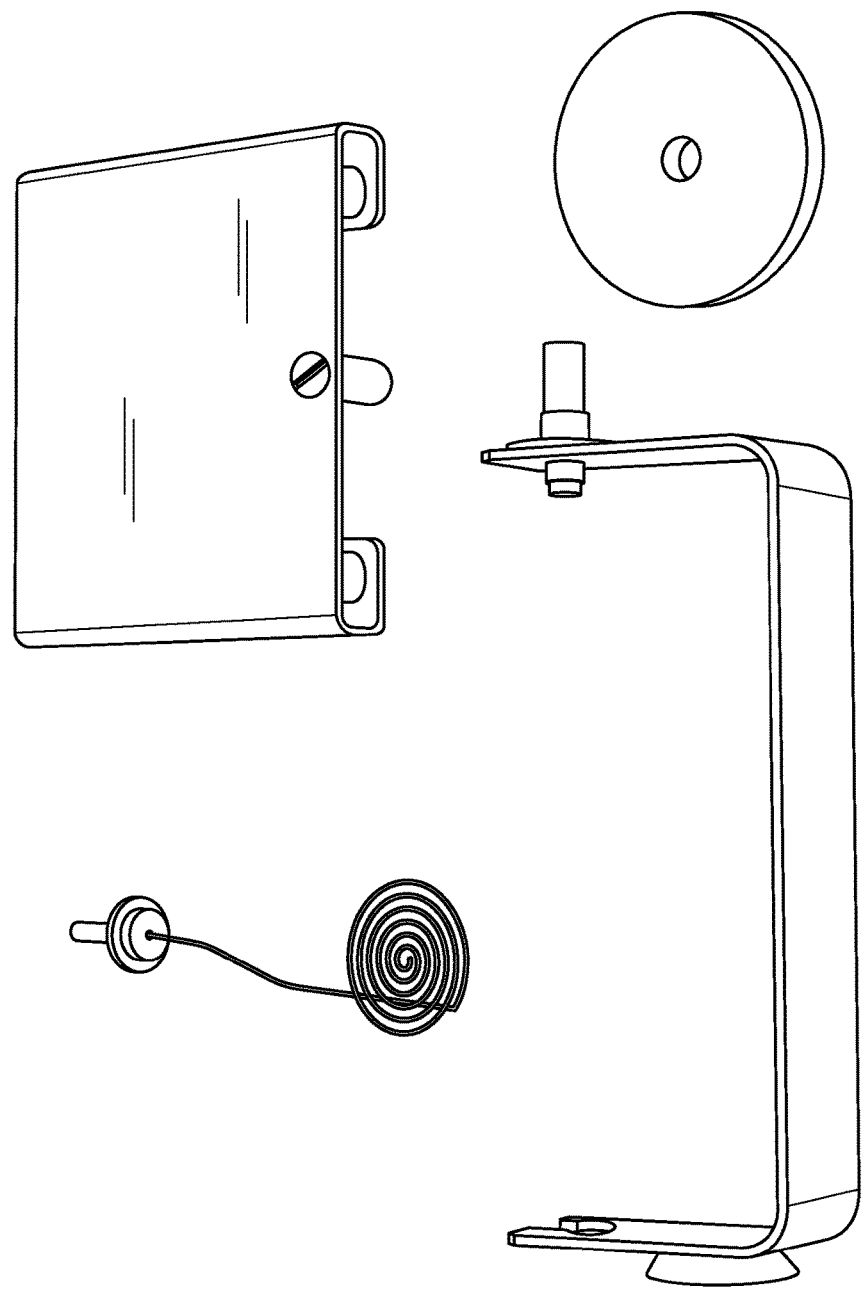
FIG. 5 is a perspective view of an unassembled density determination apparatus showing the components (clockwise starting in the upper left) gem holder, platform, suspension bracket, and suspension spacer.

The density was determined by the apparatus shown, unassembled, in FIG. 5. Although not shown in FIG. 5, the apparatus also included a thermometer to measure the suspension liquid temperature. A suspension liquid is a fluid with a density lower than that of the sample to be measured. The sample must sink in the suspension fluid to determine the sample density. Water has a density of 1 g/cm$^3$, so most unfilled polymers require some other suspension fluid such as isopropyl alcohol, density=0.8808 g/cm$^3$. A Mettler AT400 balance (Mettler-Toledo LLC, Columbus, Ohio) was also used.

The density of a limestone-filled HDPE bottle was measured. After taring the balance to zero, the dry solid sample was weighed after placing it in the cup of the Mettler balance. The dry weight was 0.3833 g. After weighing the dry sample and before removing the sample from the cup, the balance was tared again. The sample was removed from the cup and placed on the gem holder in the suspension fluid. The sample was weighed providing the weight with a negative number (−0.3287 g). The number was converted to its absolute value (0.3287 g); the positive value is the sample buoyancy. The sample density was calculated by multiplying the dry weight (0.3833 g) by the sample buoyancy (0.3287 g) by the suspension fluid density (0.8808 g/cc), which equaled 1.0272 g/cc.

Example 3

Formulations

Core-layer formulation 36 comprised FORMOSA PLASTICS® FORMOLENE® HB5502F HDPE hexene copolymer which was used as polyethylene base resin. In some examples, core-formulation 36 comprised Versalite (A) or Versalite (B). Reference is hereby made to U.S. patent application Ser. No. 14/462,073, filed Aug. 18, 2014 and titled POLYMERIC MATERIAL FOR AN INSULATED CONTAINER for disclosure relating to various formulations of VERSALITE in accordance with the present disclosure, which application is hereby incorporated herein by reference in its entirety. In further examples, LLDPE comprised DOW® DOWLEX™ 2045G LLDPE (available from The Dow Chemical Company), electron beam modified to have long-chain branching and a melt index of about 0.2 or 0.13 g/10 min. In still further examples, the polyethylene base resin was blended with HYDROCEROL® CF 40E as a chemical blowing agent and Heritage Plastics HT6000 LLDPE talc as another nucleating agent. In still yet further examples, $N_2$ was used as a blowing agent. The blowing agent was used at levels between about 0.02 lbs/h to about 0.15 lbs/h. A rotary extrusion blow-molding machine (available from Wilmington Machinery of Wilmington, N.C.) was used in accordance with the present disclosure. The RPM speed of this machine was at levels between about 5 RPM to about 75 RPM. The various formulations are shown below in Table 7.

The blowing agent, $N_2$, was injected into molten core-layer formulation 36 to expand the molten formulation and reduce the density of the mixture of polymer and nucleating agent. The resulting expanded formulation was then extruded through a die head to establish a core parison and to form a multi-layer tube. The tube was molded to form a multi-layer container according to the present disclosure.

The formulations of different insulative cellular non-aromatic polymeric material formulations in this Example are shown in Table 7.

TABLE 7

Comparison of different insulative cellular non-aromatic polymeric material formulations of Example 3.

| Trial [#] | Formosa 5502F | Ampacet 102823 [0.2 MI] | Ampacet 102823 [0.13 MI] | Versalite | CF-40E | HT6000 | $N_2$ [lbs/hr] | Processing [RPM] |
|---|---|---|---|---|---|---|---|---|
| 7.0.0 | 100% | 0% | 0% | 0% | 0% | 0% | 0 | 20 |
| 7.0.5 | 100% | 0% | 0% | 0% | 0% | 0% | 0.132 | 20 |
| 7.1.0 | 98.8% | 0% | 0% | 0% | 0.2% | 1.0% | 0.132 | 20 |
| 7.2.0 | 49.7% | 49.7% | 0% | 0% | 0.1% | 0.5% | 0.132 | 20 |
| 7.3.0 | 0% | 0% | 0% | 100% (B) | 0% | 0% | 0.132 | 12 |
| 7.3.1 | 0% | 0% | 0% | 100% (B) | 0% | 0% | 0.132 | 24 |
| 7.4.0 | 0% | 0% | 0% | 100% (A) | 0% | 0% | 0.132 | 12 |
| 7.4.1 | 0% | 0% | 0% | 100% (A) | 0% | 0% | 0.132 | 24 |
| 7.4.2 | 0% | 0% | 0% | 100% (A) | 0% | 0% | 0.132 | 36 |
| 7.4.3 | 0% | 99.4% | 0% | 0% | 0.1% | 0.5% | 0.132 | 18 |
| 7.4.4 | 0% | 99.4% | 0% | 0% | 0.1% | 0.5% | 0.132 | 36 |
| 7.5.0 | 0% | 99.4% | 0% | 0% | 0.1% | 0.5% | 0.132 | 20 |
| 7.5.1 | 0% | 99.4% | 0% | 0% | 0.1% | 0.5% | 0.132 | 75 |
| 7.6.0 | 0% | 74.55% | 0% | 24.85% | 0.1% | 0.5% | 0.132 | 20 |
| 7.7.0 | 0% | 0% | 99.4% | 0% | 0.1% | 0.5% | 0.07 | 20 |
| 7.7.1 | 0% | 0% | 99.4% | 0% | 0.1% | 0.5% | 0.07 | 20 |
| Pre-7.8.0 Purge | 100% | 0% | 0% | 0% | 0% | | 0.07 | 20 |
| 7.8.0 | 99.4% | 0% | 0% | 0% | 0.1% | 0.5% | 0.07 | 11 |
| 7.8.1 | 99.4% | 0% | 0% | 0% | 0.1% | 0.5% | 0.035 | 11 |
| 7.9.0A | 99.4% | 0% | 0% | 0% | 0.1% | 0.5% | 0.035 | 11 |
| 7.9.0B | 99.4% | 0% | 0% | 0% | 0.1% | 0.5% | 0.035 | 19 |
| 7.9.1 | 99.4% | 0% | 0% | 0% | 0.1% | 0.5% | 0.07 | 18 |
| 7.9.2A | 99.4% | 0% | 0% | 0% | 0.1% | 0.5% | 0.05 | 18 |
| 7.9.2B | 99.4% | 0% | 0% | 0% | 0.1% | 0.5% | 0.05 | 11 |
| 7.10A | 0% | 0% | 99.4% | 0% | 0.1% | 0.5% | 0.02 | 9 |
| 7.10B | 0% | 0% | 99.4% | 0% | 0.1% | 0.5% | 0.02 | 25 |
| 7.10C | 0% | 0% | 99.4% | 0% | 0.1% | 0.5% | 0.05 | 25 |
| 7.11A | 84.5% | 0% | 14.9% | 0% | 0.1% | 0.5% | 0.03 | 18 |
| 7.9 | 99% | 0% | 0% | 0% | 1% | 0% | 0.05 | * |
| 7.10 | 98.7% | 0% | 0% | 0% | 1% | 0.3% | 0.05 | * |
| 7.11 | 98.45% | 0% | 0% | 0% | 1.25% | 0.3% | 0.05 | * |
| 7.12 | 98.75% | 0% | 0% | 0% | 1.25% | 0% | 0.05 | * |
| 7.20 | 99.4% | 0% | 0% | 0% | 0.10% | 0.5% | 0.07 | * |
| 7.21 | 99.3% | 0% | 0% | 0% | 0.20% | 0.5% | 0.07 | * |

* Data not available

Example 4

Parison Densities, Bottle Densities, Weight, Top Load Performance, and Thickness for Formulations of Example 3

Containers formed according to Table 7 were subjected to a series of measurements and performance tests including core parison density (ρ) measurements, container density (ρ) measurements, weight measurements, thickness measurements, and top load force performance measurements. The results are shown below in Table 8.

Density was determined by the apparatus and methods described in Example 2. Top load performance was measured by methods described in Example 7.

TABLE 8

Parison densities, container densities, weights, top load performance, and bottle sidewall thicknesses of different insulative cellular non-aromatic polymeric material formulations of Example 3.

| Trial [#] | Parison Density [g/cc] | Container Density [g/cc] | Weight [g] | Top Load [lbs-F] | Thickness [mils] |
|---|---|---|---|---|---|
| 7.0.0 | 0.95 | 0.95 | 60.3 | 133 | 42.3 |
| 7.0.5 | 0.90 | * | * | * | * |
| 7.1.0 | 0.70 | * | * | * | * |
| 7.2.0 | 0.60 | * | * | * | * |
| 7.3.0 | 0.70 | * | * | * | * |
| 7.3.1 | 0.58 | * | * | * | * |
| 7.4.0 | 0.56 | * | * | * | * |
| 7.4.1 | 0.57 | * | * | * | * |
| 7.4.2 | 0.57 | * | * | * | * |
| 7.4.3 | 0.47 | * | * | * | * |
| 7.4.4 | 0.42 | * | * | * | * |
| 7.5.0 | 0.43 | * | * | * | * |
| 7.5.1 | 0.51 | * | * | * | * |
| 7.6.0 | 0.55 | 0.58 | * | * | * |
| 7.7.0 | 0.40 | * | * | * | * |
| 7.7.1 | 0.41 | 0.64 | * | * | * |
| Pre-7.8.0 Purge | * | 0.62 | * | * | * |
| 7.8.0 | 0.42 | * | * | * | * |
| 7.8.1 | 0.42 | * | * | * | * |
| 7.9.0A | 0.41 | 0.62 | 30.7 | 31 | 38.1 |
| 7.9.0B | 0.51 | 0.73 | 49.0 | 87 | 43.1 |
| 7.9.1 | * | * | * | * | * |
| 7.9.2A | 0.43 | 0.68 | 41.9 | 56 | 40.4 |
| 7.9.2B | * | * | * | * | * |
| 7.10A | 0.48 | 0.51 | * | * | * |
| 7.10B | 0.61 | 0.81 | * | * | * |
| 7.10C | 0.66 | * | * | * | * |

TABLE 8-continued

Parison densities, container densities, weights, top load performance, and bottle sidewall thicknesses of different insulative cellular non-aromatic polymeric material formulations of Example 3.

| Trial [#] | Parison Density [g/cc] | Container Density [g/cc] | Weight [g] | Top Load [lbs-F] | Thickness [mils] |
|---|---|---|---|---|---|
| 7.11A | 0.52 | 0.72 | * | * | * |
| 7.9 | 0.43 | 0.74 | 56 | * | * |
| 7.10 | 0.43 | 0.73 | 56 | * | * |
| 7.11 | 0.43 | 0.73 | 56 | * | * |
| 7.12 | 0.42 | 0.73 | 56 | * | * |
| 7.20 | * | 0.683 | 56 | * | * |
| 7.21 | * | 0.701 | 56 | * | * |

* Data not available

Example 5

Molding Parameters Used to Form Containers

Core layer 18 is comprised FORMOSA PLASTICS® FORMOLENE® HB5502F HDPE hexene copolymer as a polyethylene base resin. The polyethylene base resin was blended with HYDROCEROL® CF 40E as a chemical blowing agent and nucleating agent, Heritage Plastics HT6000 LLDPE Based Talc Concentrate as an additional nucleating agent. $N_2$ was used as a blowing agent. The percentages were about:

| | |
|---|---|
| 99.4% | FORMOLENE ® HB5502F HDPE hexene copolymer |
| 0.1% | HYDROCEROL ® CF 40E |
| 0.5% | Heritage Plastics HT6000 LLDPE Based Talc Concentrate |

The HDPE and nucleating agents were added to an extruder hopper and blended to provide a formulation. The formulation was then heated in the extruder to form a molten formulation. The blowing agent was then added to the molten formulation at a rate of about:

| | |
|---|---|
| 0.04 | lbs/h |

The blowing agent, $N_2$ was injected into the molten formulation to expand the molten formulation and reduce the density of the mixture of polymer and nucleating agent. The resulting expanded formulation was then extruded through a die head to establish a parison, also called tube.

A mold was closed around the tube and a blow needle was inserted into a space formed in the tube. During inserting the needle, the mold moved away from the die head. In some examples, vacuum was applied to the mold and in others no vacuum was applied to the mold. Vacuum caused the pressure to decrease to $P_{VAC}$, which is between about 0 inches Hg and about 29 inches Hg. Pressurized gas, in some examples air, was pumped into a space formed in the tube to cause the tube to expand and take on the shape of the mold. In the next step, the mold was opened to reveal a container.

Parameters that were varied were cycle time, gas pressure, and vacuum. Cycle time is an amount of time between closing the mold around the tube and opening the mold to reveal a container. In some examples, cycle time was varied between 14 and 18 seconds. In further examples, gas pressure varied between about 40 psi and about 60 psi. In still further examples, pressurized gas was about room temperature.

TABLE 9

Molding parameters used to form containers of Example 5.

| Run [#] | Cycle [s] | Air [psi] | Vacuum |
|---|---|---|---|
| 8.1.1 | 14 | 40 | Off |
| 8.1.2 | 14 | 40 | On |
| 8.1.3 | 14 | 60 | Off |
| 8.1.4 | 14 | 60 | On |
| 8.1.5 | 15 | 40 | Off |
| 8.1.6 | 15 | 40 | On |
| 8.1.7 | 15 | 60 | Off |
| 8.1.8 | 15 | 60 | On |
| 8.1.9 | 16 | 40 | Off |
| 8.1.10 | 16 | 40 | On |
| 8.1.11 | 16 | 60 | Off |
| 8.1.12 | 16 | 60 | On |
| 8.1.13 | 17 | 40 | Off |
| 8.1.1 | 17 | 40 | On |
| 8.1.2 | 17 | 60 | Off |
| 8.1.3 | 17 | 60 | On |
| 8.1.4 | 18 | 40 | Off |
| 8.1.5 | 18 | 40 | On |
| 8.1.6 | 18 | 60 | Off |
| 8.1.7 | 18 | 60 | On |

Example 6

Drop Test Measurements
General Procedure

Drop testing determines a likelihood of container survival due to a drop or impact to the container. Containers were subjected to a drop testing procedure based on ASTM D2463 (Standard Test Method for Drop Impact Resistance of Blow-Molded Thermoplastic Containers), which is incorporated by reference herein in its entirety.

The drop test was performed according to the following procedure. A bucket was filled with tap water. The water in the bucket was allowed to condition for at least 24 hours at about room temperature and about 75% relative humidity. The container was filled with water from the bucket and closed off with, for example, a lid. The filled, capped containers were then subjected to the following procedure: (a) the filled, capped container was located at about five feet above a hard surface such as concrete or tile; (b) the filled, capped container was then oriented such that a bottom of the filled, capped container was arranged to lie in a substantially parallel relation to the hard surface; (c) each of five or ten capped, filled containers were dropped; (d) upon impact, each filled, capped container was examined for any break or shattering of the wall that causes water to leak out of the bottle; and (d) the total number of bottles showing any sign of leakage after the drop test were counted as failures.

Example 7

Top Load Measurements
General Procedure

Top load testing determines how much force a container can withstand before the container fails or necks in to form an hourglass shape. Various containers were subjected to top load testing. An Instron tester, such as and generally consistent with an Instron Series 5500 Load Frame, may be used to determine top load performance.

The top load test was generally performed according to the following procedure. A container was placed on a flat surface such that the floor of the container was arranged to lie in a substantially parallel relation to the flat surface. A crosshead of the Instron tester applied a compressive force to the top of the neck of the container. A load transducer, mounted in series with the container, measured the applied load. Containers were tested until they failed or necked in to form an hourglass shape. Once failure or necking was observed, the value shown on Instron tester was recorded.

Example 8

Parison Densities, Bottle Densities, Weight, Top Load Performance, Thickness, and Drop Test Results for Formulations of Example 5

Containers formed according to Table 9 were subjected to a series of measurements and performance tests including core parison density ($\rho$) measurements, container density ($\rho$) measurements, weight measurements, thickness measurements, top load force performance measurements, and drop testing. The results are shown below in Table 10.

Density was determined by the apparatus and methods described in Example 2. Drop tests were conducted by methods described in Example 6. Top load performance was measured by methods described in Example 7.

TABLE 10

Parison densities, bottle densities, weight, top load performance, bottle side wall thicknesses, and drop test results of different insulative cellular non-aromatic polymeric material formulations of Example 5.

| Run [#] | Parison Density [g/cc] | Container Density [g/cc] | Weight [g] | Thickness [mils] | Top Load [lbs-F] | Drop Test [Pass %] |
|---|---|---|---|---|---|---|
| 8.1.1 | 0.546 | 0.748 | 52.8 | 43.8 | 109.0 | 40 |
| 8.1.2 | 0.570 | 0.795 | 53.8 | 44.6 | 107.5 | 80 |
| 8.1.3 | 0.542 | 0.706 | 51.2 | 44.0 | 111.4 | 20 |
| 8.1.4 | 0.538 | 0.724 | 51.8 | 46.6 | 105.3 | 20 |
| 8.1.5 | 0.553 | 0.792 | 52.0 | 42.8 | 107.0 | 60 |
| 8.1.6 | 0.559 | 0.789 | 52.4 | 42.9 | 107.5 | 40 |
| 8.1.7 | 0.542 | 0.844 | 53.5 | 40.0 | 108.8 | 80 |
| 8.1.8 | 0.550 | 0.798 | 52.6 | 39.1 | 106.8 | 100 |
| 8.1.9 | 0.536 | 0.649 | 48.8 | 45.1 | 102.8 | 0 |
| 8.1.10 | 0.549 | 0.788 | 51.4 | 42.3 | 102.7 | 60 |
| 8.1.11 | 0.540 | 0.825 | 52.1 | 38.7 | 107.1 | 100 |
| 8.1.12 | 0.555 | 0.840 | 51.5 | 39.2 | 103.1 | 80 |
| 8.1.13 | 0.548 | 0.791 | 49.8 | 40.7 | 97.1 | 100 |
| 8.1.14 | 0.544 | 0.789 | 50.0 | 40.4 | 95.0 | 100 |
| 8.1.15 | 0.543 | 0.716 | 47.3 | 40.0 | 91.4 | 0 |
| 8.1.16 | 0.548 | 0.707 | 47.5 | 40.1 | 89.4 | 20 |
| 8.1.17 | 0.546 | 0.806 | 49.7 | 38.4 | 93.1 | 60 |
| 8.1.18 | 0.540 | 0.792 | 50.1 | 40.2 | 94.5 | 80 |
| 8.1.19 | 0.533 | 0.833 | 49.0 | 35.3 | 94.9 | 100 |
| 8.1.20 | 0.547 | 0.829 | 48.8 | 36.1 | 92.6 | 80 |

Example 9

Formulations Comprising Electron Beam Modified HDPE

Core-layer formulation 36 comprised FORMOSA PLASTICS® FORMOLENE® HB5502F HDPE hexene copolymer as a first material of a polyethylene base resin. EQUISTAR® ALATHON® H5520 HDPE copolymer (available from Lyondell Chemical Company), electron beam modified to have long-chain branching and a melt index of about 0.75 g/10 min, was used as a second material of the polyethylene base resin. The polyethylene base resin was blended with HYDROCEROL® CF 40E as a chemical blowing agent and nucleating agent. $N_2$ was used as a blowing agent. The blowing agent was used at levels between about 0.03 lbs/h to about 0.11 lbs/h.

The blowing agent, $N_2$, was injected into the molten formulation to expand the molten formulation and reduce the density of the mixture of polymer and nucleating agent. The resulting expanded formulation was then extruded through a die head to establish a core parison. The core parison, also called tube, was molded to form a container according to the present disclosure.

TABLE 11

Comparison of different insulative cellular non-aromatic polymeric material formulations of Example 9.

| Run [#] | Formosa [%] | E-Beam HDPE [%] | Chemical Blowing Agent [%] | Nitrogen [lbs/h] |
|---|---|---|---|---|
| 8.2.1 | 25 | 75 | 0.1 | 0.035 |
| 8.2.2 | 25 | 75 | 0.5 | 0.07 |
| 8.2.3 | 25 | 75 | 1.0 | 0.105 |
| 8.2.4 | 50 | 50 | 0.1 | 0.07 |
| 8.2.5 | 50 | 50 | 0.5 | 0.105 |
| 8.2.6 | 50 | 50 | 1.0 | 0.035 |
| 8.2.7 | 75 | 25 | 0.1 | 0.105 |
| 8.2.8 | 75 | 25 | 0.5 | 0.035 |
| 8.2.9 | 75 | 25 | 1.0 | 0.07 |

Example 10

Parison Densities, Bottle Densities, Weight, Top Load Performance, and Thickness for Formulations of Example 9

Containers formed according to Table 11 were subjected to a series of measurements and performance tests including core parison density ($\rho$) measurements, container density ($\rho$) measurements, weight measurements, thickness measurements, and top load force performance measurements. The results are shown below in Table 12.

Density was determined by the apparatus and methods described in Example 2. Drop tests were conducted by methods described in Example 6. Top load performance was measured by methods described in Example 7.

TABLE 12

Parison densities, bottle densities, weight, top load performance, and bottle side wall thicknesses of different insulative cellular non-aromatic polymeric material formulations of Example 9.

| Run [#] | Parison Density [g/cc] | Container Density [g/cc] | Weight [g] | Thickness [mils] | Top Load [lbs-F] | Drop Test [Pass] |
|---|---|---|---|---|---|---|
| 8.2.1 | 0.560 | 0.821 | 43.1 | 33.8 | 78.0 | 0.0 |
| 8.2.2 | 0.401 | 0.681 | * | * | * | * |
| 8.2.3 | 0.693 | 0.676 | * | * | * | * |
| 8.2.4 | 0.407 | 0.658 | 35.7 | 28.7 | 42.8 | 0.0 |
| 8.2.5 | 0.565 | 0.650 | * | * | * | * |
| 8.2.6 | 0.494 | 0.723 | 41.3 | 34.1 | 70.2 | 0.0 |
| 8.2.7 | 0.360 | 0.387 | * | * | * | * |
| 8.2.8 | 0.496 | 0.743 | 41.6 | 33.2 | 71.2 | 0.0 |
| 8.2.9 | 0.422 | 0.378 | * | * | * | * |

* Data not available

Example 11

Formulations Comprising Electron Beam Modified LLDPE

Core-layer formulation 36 comprises FORMOSA PLASTICS® FORMOLENE® HB5502F HDPE hexene copolymer as a first material of a polyethylene base resin. DOW® DOWLEX™ 2045G LLDPE (available from The Dow Chemical Company), electron beam modified to have long-chain branching and a melt index of about 0.15 g/10 min, is used as a second material of a second polyethylene base resin. The polyethylene base resin is blended with HYDROCEROL® CF 40E as a chemical blowing agent and nucleating agent and Heritage Plastics HT6000 LLDPE Based Talc Concentrate as an additional nucleating agent. $N_2$ is used as a blowing agent.

The blowing agent, $N_2$, is injected into the molten formulation to expand the molten formulation and reduce the density of the mixture of polymer and nucleating agent. The resulting expanded formulation is then extruded through a die head to establish a core parison. The tube is molded to form a container according to the present disclosure.

TABLE 13

Comparison of different insulative cellular non-aromatic polymeric material formulations of Example 11.

| Run [#] | Formosa [%] | E-Beam LLDPE [%] | Chemical Blowing Agent [%] | $N_2$ [lbs/h] | HT6000 [%] |
|---|---|---|---|---|---|
| 8.3.1 | 55 | 45 | 0.1 | 0.035 | 0.25 |
| 8.3.2 | 55 | 45 | 0.5 | 0.07 | 0.5 |
| 8.3.3 | 55 | 45 | 1.0 | 0.105 | 1 |
| 8.3.4 | 70 | 30 | 0.1 | 0.07 | 1 |
| 8.3.5 | 70 | 30 | 0.5 | 0.105 | 0.25 |
| 8.3.6 | 70 | 30 | 1.0 | 0.035 | 0.5 |
| 8.3.7 | 85 | 15 | 0.1 | 0.105 | 0.5 |
| 8.3.8 | 85 | 15 | 0.5 | 0.035 | 0.01 |
| 8.3.9 | 85 | 15 | 1.0 | 0.07 | 0.25 |

Example 12

Formulations Using Virgin and Regrind HDPE

Core-layer formulation 36 comprised FORMOSA PLASTICS® FORMOLENE® HB5502F HDPE hexene copolymer as a first material of a polyethylene base resin. In some examples, the FORMOSA PLASTICS® FORMOLENE® HB5502F HDPE hexene copolymer comprises various amounts of virgin and regrind materials. The polyethylene base resin was blended with HYDROCEROL® CF 40E as a chemical blowing agent and nucleating agent and Heritage Plastics HT6000 LLDPE Based Talc Concentrate as an additional nucleating agent. $N_2$ was used as a blowing agent. The percentages were about:

| | |
|---|---|
| 99.4% | FORMOLENE ® HB5502F HDPE hexene copolymer |
| 0.1% | HYDROCEROL ® CF 40E |
| 0.5% | Heritage Plastics HT6000 LLDPE Based Talc Concentrate |

The HDPE and nucleating agents were added to an extruder hopper and blended to provide a formulation. The formulation was then heated in the extruder to form a molten formulation. The blowing agent was then added to the molten formulation at a rate of about:

| | |
|---|---|
| 0.04 | lbs/h |

The blowing agent, $N_2$ was injected into the molten formulation to expand the molten formulation and reduce the density of the mixture of polymer and nucleating agent. The resulting expanded formulation was then extruded through a die head to establish a parison.

A mold was closed around the tube and a blow needle was inserted into a space formed in the tube. During inserting the needle, the mold moved away from the die head. Vacuum was applied to the mold and caused the pressure to decrease to $P_{VAC}$, which is between about 0 inches Hg and about 29 inches Hg. Pressurized gas, in some examples air, was pumped into a space formed in the tube to cause the tube to expand and take on the shape of the mold. The pressurized gas in this example was about 40 psi and about room temperature. In the next step, the mold was opened to reveal a container. Cycle time is an amount of time between closing the mold around the tube and opening the mold to reveal a container. The cycle time in this example was between 14 and 16 second. In one example, cycle time was 15 seconds.

TABLE 14

Virgin/regrind percentages and molding parameters used to form containers of Example 12.

| | Virgin HDPE [%] | Regrind HDPE [%] | Cycle Time [s] |
|---|---|---|---|
| 9.1.Control | 100 | 0 | 15 |
| 9.1.1 | 80 | 20 | 14 |
| 9.1.2 | 80 | 20 | 15 |
| 9.1.3 | 80 | 20 | 16 |
| 9.1.4 | 60 | 40 | 14 |
| 9.1.5 | 60 | 40 | 15 |
| 9.1.6 | 60 | 40 | 16 |
| 9.1.7 | 40 | 60 | 14 |
| 9.1.8 | 40 | 60 | 15 |
| 9.1.9 | 40 | 60 | 16 |
| 9.1.10 | 20 | 80 | 14 |
| 9.1.11 | 20 | 80 | 15 |
| 9.1.12 | 20 | 80 | 16 |

Example 13

Parison Densities, Bottle Densities, Weight, Top Load Performance, and Thickness for Formulations of Example 12

Containers formed according to Table 14 were subjected to a series of measurements and performance tests including core parison density (ρ) measurements, container density (ρ) measurements, weight measurements, thickness measurements, top load force performance measurements, and drop testing. The results are shown below in Table 15.

Density was determined by the apparatus and methods described in Example 2. Drop tests were conducted by methods described in Example 6. Top load performance was measured by methods described in Example 7.

TABLE 15

Parison densities, bottle densities, weights, top load performance, and bottle side wall thicknesses of different insulative cellular non-aromatic polymeric material formulations of Example 12.

| Run [#] | Parison Density [g/cc] | Container Density [g/cc] | Weight [g] | Thickness [mils] | Top Load [lbs-F] | Drop Test [Pass %] |
|---|---|---|---|---|---|---|
| 9.1.Control | 0.617 | 0.757 | 51.6 | 43.8 | 95.3 | 20 |
| 9.1.1 | 0.524 | 0.769 | 53.6 | 42.7 | 98.0 | 0 |
| 9.1.2 | 0.493 | 0.728 | 51.5 | 43.2 | 96.2 | 40 |
| 9.1.3 | 0.499 | 0.747 | 50.2 | 43.0 | 91.4 | 40 |
| 9.1.4 | 0.519 | 0.747 | 52.4 | 44.3 | 93.9 | 20 |
| 9.1.5 | 0.531 | 0.751 | 51.0 | 43.1 | 92.8 | 0 |
| 9.1.6 | 0.523 | 0.742 | 49.6 | 41.1 | 88.9 | 0 |
| 9.1.7 | 0.493 | 0.718 | 52.0 | 44.0 | 90.9 | 20 |
| 9.1.8 | 0.435 | 0.697 | 49.8 | 43.3 | 81.6 | 0 |
| 9.1.9 | 0.444 | 0.682 | 47.3 | 42.0 | 76.1 | 20 |
| 9.1.10 | 0.442 | 0.690 | 50.1 | 44.4 | 83.9 | 0 |
| 9.1.11 | 0.483 | 0.726 | 49.3 | 42.4 | 85.5 | 0 |
| 9.1.12 | 0.493 | 0.728 | 47.7 | 39.8 | 80.7 | 0 |

Example 14

Formulations Using Virgin and Regrind HDPE

Core-layer formulation 36 comprised FORMOSA PLASTICS® FORMOLENE® HB5502F HDPE hexene copolymer as a first material of a polyethylene base resin. DOW® DOWLEX™ 2045G LLDPE (available from The Dow Chemical Company), electron beam modified to have long-chain branching and a melt index of about 0.15 g/10 min, was used as a second material of a second polyethylene base resin. The polyethylene base resin was blended with HYDROCEROL® CF 40E as a Chemical Blowing Agent (CBA) and nucleating agent and Heritage Plastics HT6000 LLDPE Based Talc Concentrate as an additional nucleating agent. $N_2$ was used as a blowing agent.

The blowing agent, $N_2$ was injected into the molten formulation at a rate between about 0.03 and 0.11 lbs/h to expand the molten formulation and reduce the density of the mixture of polymer and nucleating agent. The resulting expanded formulation was then extruded through a die head to establish a core parison.

A mold was closed around the tube and a blow needle was inserted into a space formed in the tube. During inserting the needle, the mold moved away from the die head. Vacuum was applied to the mold and caused the pressure to decrease to $P_{VAC}$, which is between about 0 inches Hg and about 29 inches Hg. Pressurized gas, in some examples air, was pumped into a space formed in the tube to cause the tube to expand and take on the shape of the mold. The pressurized gas in this example was about 40 psi and about room temperature. In the next step, the mold was opened to reveal a container. Cycle time is an amount of time between closing the mold around the tube and opening the mold to reveal a container. The cycle time in this example was between 14 and 16 second. In one example, cycle time was 15 seconds.

TABLE 16

Comparison of different insulative cellular non-aromatic polymeric material formulations of Example 14.

| Run [#] | Formosa [%] | E-Beam LLDPE [%] | CBA [%] | Nitrogen [lbs/h] |
|---|---|---|---|---|
| 9.2.1 | 25 | 75 | 0.1 | 0.035 |
| 9.2.2 | 25 | 75 | 0.5 | 0.07 |
| 9.2.3 | 25 | 75 | 1.0 | 0.105 |
| 9.2.4 | 50 | 50 | 0.1 | 0.07 |
| 9.2.5 | 50 | 50 | 0.5 | 0.105 |
| 9.2.6 | 50 | 50 | 1.0 | 0.035 |
| 9.2.7 | 75 | 25 | 0.1 | 0.105 |
| 9.2.8 | 75 | 25 | 0.5 | 0.035 |
| 9.2.9 | 75 | 25 | 1.0 | 0.07 |

Example 15

Parison Densities, Bottle Densities, Weight, Top Load Performance, and Thickness for Formulations of Example 14

Containers formed according to Table 16 were subjected to a series of measurements and performance tests including core parison density (ρ) measurements, container density (ρ) measurements, weight measurements, thickness measurements, top load force performance measurements, and drop testing. The results are shown below in Table 17.

Density was determined by the apparatus and methods described in Example 2. Drop tests were conducted by methods described in Example 6. Top load performance was measured by methods described in Example 7.

TABLE 17

Parison densities, bottle Densities, weight, top load performance, and bottle side wall thicknesses of different insulative cellular non-aromatic polymeric material formulations of Example 14.

| Run [#] | Parison Density [g/cc] | Container Density [g/cc] | Weight [g] | Thickness [mils] | Top Load [lbs-F] | Drop Test [Pass %] |
|---|---|---|---|---|---|---|
| 9.2.1 | 0.688 | 0.760 | 42.6 | 36.6 | 28.3 | 0 |
| 9.2.2 | 0.529 | 0.401 | * | * | * | * |
| 9.2.3 | 0.474 | 0.587 | * | * | * | * |
| 9.2.4 | 0.432 | 0.661 | 40.7 | 38.0 | 35.8 | 0 |
| 9.2.5 | 0.478 | 0.647 | * | * | * | * |
| 9.2.6 | 0.527 | 0.768 | * | * | * | * |
| 9.2.7 | 0.371 | 0.503 | * | * | * | * |
| 9.2.8 | 0.555 | 0.802 | 47.1 | 41.5 | 74.0 | 40 |
| 9.2.9 | 0.432 | 0.419 | * | * | * | * |

* Data not available

Example 16

Formulations Using Virgin and Second Pass Regrind HDPE

Core-layer formulation 36 comprised FORMOSA PLASTICS® FORMOLENE® HB5502F HDPE hexene copolymer as a first material of a polyethylene base resin. In some examples, the FORMOSA PLASTICS® FORMOLENE® HB5502F HDPE hexene copolymer comprises various amounts of virgin and second pass regrind material. Second pass regrind material may be, for example, material prepared previously in Table 14 which included first pass regrind. The polyethylene base resin was blended with HYDROCEROL® CF 40E as a chemical blowing agent and nucleating agent and Heritage Plastics HT6000 LLDPE Based Talc Concentrate as an additional nucleating agent. $N_2$ was used as a blowing agent. The percentages were about:

| 99.4% | FORMOLENE ® HB5502F HDPE hexene copolymer |
| 0.1% | HYDROCEROL ® CF 40E |
| 0.5% | Heritage Plastics HT6000 LLDPE Based Talc Concentrate |

The HDPE and nucleating agents were added to an extruder hopper and blended to provide a formulation. The formulation was then heated in the extruder to form a molten formulation. The blowing agent was then added to the molten formulation at a rate of about:

0.04 lbs/h

The blowing agent, $N_2$ was injected into the molten formulation to expand the molten formulation and reduce the density of the mixture of polymer and nucleating agent. The resulting expanded formulation was then extruded through a die head to establish a parison.

A mold was closed around the tube and a blow needle was inserted into a space formed in the tube. During inserting the needle, the mold moved away from the die head. Vacuum was applied to the mold and caused the pressure to decrease to $P_{VAC}$, which is between about 0 inches Hg and about 29 inches Hg. Pressurized gas, in some examples air, was pumped into a space formed in the tube to cause the tube to expand and take on the shape of the mold. The pressurized gas in this example was about 40 psi and about room temperature. In the next step, the mold was opened to reveal a container. Cycle time is an amount of time between closing the mold around the tube and opening the mold to reveal a container. The cycle time in this example was between 14 and 16 second. In one example, cycle time was 15 seconds.

TABLE 18

Virgin/second pass regrind percentages and molding parameters used to form containers of Example 16. Table 14 formulations were run through Table 18.

| Run [#] | Virgin [%] | Second Pass Regrind [%] | Cycle Time [s] |
|---|---|---|---|
| 9.3.1 | 80 | 20 | 14 |
| 9.3.2 | 80 | 20 | 15 |
| 9.3.3 | 80 | 20 | 16 |
| 9.3.4 | 60 | 40 | 14 |
| 9.3.5 | 60 | 40 | 15 |
| 9.3.6 | 60 | 40 | 16 |
| 9.3.7 | 40 | 60 | 14 |
| 9.3.8 | 40 | 60 | 15 |
| 9.3.9 | 40 | 60 | 16 |
| 9.3.10 | 20 | 80 | 14 |
| 9.3.11 | 20 | 80 | 15 |
| 9.3.12 | 20 | 80 | 16 |
| 9.3.13 | 0 | 100 | 14 |
| 9.3.14 | 0 | 100 | 15 |
| 9.3.15 | 0 | 100 | 16 |

Example 17

Parison Densities, Bottle Densities, Weight, Top Load Performance, and Thickness for Formulations of Example 16

Containers formed according to Table 21 were subjected to a series of measurements and performance tests including core parison density ($\rho$) measurements, container density ($\rho$) measurements, weight measurements, thickness measurements, top load force measurements, and drop testing. The results are shown below in Table 22.

Density was determined by the apparatus and methods described in Example 2. Drop tests were conducted by methods described in Example 6. Top load performance was measured by methods described in Example 7.

TABLE 19

Parison densities, bottle densities, weight, top load performance, and bottle side wall thicknesses of different insulative cellular non-aromatic polymeric material formulations of Example 16.

| Run [#] | Parison Density [g/cc] | Container Density [g/cc] | Weight [g] | Thickness [mils] | Top Load [lbs-F] | Drop Test [Pass, %] |
|---|---|---|---|---|---|---|
| 9.3.1 | 0.536 | 0.773 | 52.7 | 44.1 | 105.4 | 20 |
| 9.3.2 | 0.502 | 0.764 | 52.3 | 43.9 | 111.5 | 40 |
| 9.3.3 | 0.496 | 0.778 | 50.4 | 41.0 | 104.9 | 0 |
| 9.3.4 | * | * | * | * | * | * |
| 9.3.5 | * | * | * | * | * | * |
| 9.3.6 | * | * | * | * | * | * |
| 9.3.7 | * | * | * | * | * | * |
| 9.3.8 | * | * | * | * | * | * |
| 9.3.9 | * | * | * | * | * | * |
| 9.3.10 | * | * | * | * | * | * |
| 9.3.11 | * | * | * | * | * | * |
| 9.3.12 | * | * | * | * | * | * |
| 9.3.13 | * | * | * | * | * | * |
| 9.3.14 | * | * | * | * | * | * |
| 9.3.15 | * | * | * | * | * | * |

* Data not available

Example 18

Throughput Study

Core-layer formulation 36 comprised FORMOSA PLASTICS® FORMOLENE® HB5502F HDPE hexene copolymer as a first material of a polyethylene base resin. In some examples, the FORMOSA PLASTICS® FORMOLENE® HB5502F HDPE hexene copolymer comprises various amounts of virgin and second pass regrind material. The polyethylene base resin was blended with HYDROCEROL® CF 40E as a chemical blowing agent and nucleating agent and Heritage Plastics HT6000 LLDPE Based Talc Concentrate as an additional nucleating agent. $N_2$ was used as a blowing agent. The percentages were about:

| | |
|---|---|
| 99.4% | FORMOLENE ® HB5502F HDPE hexene copolymer |
| 0.1% | HYDROCEROL ® CF 40E |
| 0.5% | Heritage Plastics HT6000 LLDPE Based Talc Concentrate |

The HDPE and nucleating agents were added to an extruder hopper and blended to provide a formulation. The formulation was then heated in the extruder to form a molten formulation. The blowing agent was then added to the molten formulation at a rate of about:

0.04 lbs/h

Containers were prepared according to the present disclosure. The molding machine 52 was a rotary extrusion blow-molding machine available from Wilmington Machinery of Wilmington, N.C. The RPM speed of this machine was at levels between about 5 RPM to about 75 RPM.

Containers were subjected to a series of measurements and performance tests including core parison density ($\rho$) measurements, container density ($\rho$) measurements, weight measurements, thickness measurements, top load force measurements, and drop testing. The results are shown below in Table 23.

Density was determined by the apparatus and methods described in Example 2. Drop tests were conducted by methods described in Example 6. Top load performance was measured by methods described in Example 7.

TABLE 20

Parison densities, bottle densities, weight, top load performance, and bottle side wall thicknesses of insulative cellular non-aromatic polymeric material formulations formed at different RPM levels.

| Run [#] | RPM | Parison $\rho$ [g/cm$^3$] | Bottle $\rho$ [g/cm$^3$] | Weight [g] | Thickness [mils] | Top Load [lbs-F] | Drop Test [Pass %] |
|---|---|---|---|---|---|---|---|
| 9.4.5 | 48 | 0.711 | 0.892 | 54.5 | 41.2 | 87.562 | 100 |
| 9.4.1 | 36 | 0.660 | 0.842 | 50.2 | 37.7 | 92.696 | 100 |
| 9.4.1A | 36 | 0.638 | 0.780 | 51.5 | 43.6 | 89.578 | 100 |

TABLE 20-continued

Parison densities, bottle densities, weight, top load performance, and bottle side wall thicknesses of insulative cellular non-aromatic polymeric material formulations formed at different RPM levels.

| Run [#] | RPM | Parison ρ [g/cm³] | Bottle ρ [g/cm³] | Weight [g] | Thickness [mils] | Top Load [lbs-F] | Drop Test [Pass %] |
|---|---|---|---|---|---|---|---|
| 9.4.2 | 27 | 0.577 | 0.817 | 53.4 | 42.1 | 105.806 | 100 |
| 9.4.3 | 18 | 0.495 | 0.756 | 45.0 | 37.0 | 73.94 | 20 |
| 9.4.4 | 11 | 0.396 | 0.601 | 32.0 | 30.7 | 36.764 | 0 |

Example 19

Formulations

Outer-layer formulation 32 comprised about 95% to about 100% MARLEX® HHM 5502BN HDPE (available from Chevron Phillips Chemical Company) and about 0% to about 5% COLORTECH® 11933-19 Titanium Oxide Colorant (available from COLORTECH® a PPM Company). Inner-layer formulation 28 comprised about 100% Marlex® HHM 5502BN HDPE (available from Chevron Phillips Chemical Company).

Core-layer formulation 36 comprised about 100% Marlex® HHM 5502BN HDPE (available from Chevron Phillips Chemical Company) as a first material of a polyethylene base resin. EQUISTAR® ALATHON® H5520 HDPE copolymer (available from Lyondell Chemical Company), electron beam modified to have long-chain branching and a melt index of about 0.75 g/10 min, was used as a second material of the polyethylene base resin. The polyethylene base resin was blended with HYDROCEROL® CF 40E as a chemical blowing agent and Heritage Plastics HT6000 LLDPE talc as another nucleating agent. $N_2$ was used as a blowing agent.

The blowing agent, $N_2$, was injected into the molten formulation at levels between about 0.01 lbs/h to about 0.15 lbs/h to expand the molten formulation and reduce the density of the mixture of polymer and nucleating agent. The resulting expanded formulation was then extruded through a die head to establish a core parison. Inner and outer layers were extruded through the die head, locating the expanded formulation therebetween, to form a multi-layer tube. The multi-layer tube was molded to form a container according to the present disclosure.

TABLE 21

Comparison of different insulative cellular non-aromatic polymeric material formulations of Example 19.

| Sample ID | Core Layer [%] | | | | Outer[%] | | Inner[%] | Process $N_2$ |
|---|---|---|---|---|---|---|---|---|
| | Chevron | Alathon | CBA | HT6000 | Chevron | Color | Chevron | [kg/h] |
| 10.A | 100 | 0 | 0 | 0 | 100 | 0 | 100 | 0 |
| 10.B | 98.75 | 0 | 0.75 | 0.50 | 100 | 0 | 100 | 0.017 |
| 10.C | 79.20 | 19.80 | 0.50 | 0.50 | 100 | 0 | 100 | 0.011 |
| 10.E | 0 | 0 | 0 | 0 | 100 | 0 | 100 | 0 |
| 10.F | 0 | 0 | 0 | 0 | 95 | 5 | 100 | 0 |
| 10.G | 99.20 | 0 | 0.20 | 0.60 | 95 | 5 | 100 | 0.011 |
| 10.H | 99.20 | 0 | 0.20 | 0.60 | 100 | 0 | 100 | 0.007 |

Example 20

Densities, Weights, and Layer Thicknesses for Formulations of Example 19

Multi-layer containers formed according to Table 21 were subjected to a series of measurements including container the average of several density measurements, weight measurements (ρ), and thickness measurements. The results are shown below in Table 25.

Density was determined by the apparatus and methods described in Example 2.

TABLE 22

Densities, weights, top load performance, and layer thicknesses of insulative cellular non-aromatic polymeric material formulations of Example 19.

| Sample ID | Weight [g] | ρ [g/cc] | Core [mil] | Outer [mil] | Inner [mil] |
|---|---|---|---|---|---|
| 10.A | 45.1 | 0.916 | 43.2 | * | * |
| 10.B | 35.9 | 0.735 | 36.9 | 4.3 | 5.1 |
| 10.C | 36.0 | 0.712 | 38.0 | 4.4 | 4.6 |
| 10.E | 22.9 | 0.938 | 36.9 | * | * |
| 10.F | 23.2 | 0.941 | 37.5 | * | * |
| 10.G | 16.0 | 0.649 | 26.3 | 3.7 | 4.9 |
| 10.H | 16.9 | 0.638 | 27.7 | 4.7 | 3.2 |

* Data not available

Example 21

Rigidity Test

General Procedure

Rigidity testing determines how resistant containers are to deformation. Various multi-layer containers 11, 211, 311 in accordance with the present disclosure were subjected to rigidity testing. Each multi-layer container was placed in a rigidity tester as shown in FIG. 10 and tested to determine rigidity. Testing involved placing a multi-layer container in a rigidity tester 602 as shown in FIG. 10 in two orientations. The rigidity tester included a stationary cylindrical stop 602 on a left side and a movable anvil 604 and force gauge 606 on a right side. The movable anvil 604 was generally T-shaped as shown in FIG. 10. For each orientation, the side wall of multi-layer container 11, 211, 311 was deformed about midway of the multi-layer container 11, 211, 311. The side wall was deformed about 0.25 inches over a 10 second interval and the force required to do so was recorded in pounds-Force. The first orientation placed a mold seam of multi-layer container in alignment to engage movable anvil 604 (0 Degrees). The second orientation rotated multi-layer container so that the seam was about 90 degrees away from movable anvil 604 (90 Degrees). The second orientation is reported for rigidity measurements herein.

Example 22

Top Load Performance, Rigidity, and Drop Test Results for Formulations of Example 19

Multi-layer containers formed according to Table 21 were subjected to a series of measurements and performance tests including top load force performance measurements, rigidity measurements, and drop testing. The results are shown below in Table 23.

Drop tests were conducted by methods described in Example 6. Top load performance was measured by methods described in Example 7. Rigidity was measured by methods described in Example 21.

TABLE 23

Drop Test Results, Rigidity, and Top Load Performance of insulative cellular non-aromatic polymeric material formulations of Example 19.

| Sample ID | Drop [Pass, %] | Rigidity [kg-F] | Top Load [lbF] |
|---|---|---|---|
| 10.A | 100 | 1.879 | 62.3 |
| 10.B | 100 | 1.145 | 63.0 |
| 10.C | 100 | 1.208 | 58.7 |
| 10.E | 100 | 1.096 | 104.4 |
| 10.F | 100 | 1.086 | 98.6 |
| 10.G | 100 | 0.817 | 58.6 |
| 10.H | 100 | 0.921 | 63.9 |

Example 23

Formulations

Outer-layer formulation 32 comprised about 75% to about 100% Marlex® HHM 5502BN HDPE (available from Chevron Phillips Chemical Company), about 5% COL-ORTECH® 11933-19 Titanium Oxide Colorant (available from COLORTECH® a PPM Company), and about 0% to about 20% Hyperform® HPR-803i (available from Milliken Chemical) as a reinforcing fiber. Inner-layer formulation 28 comprised about 85% to 100% Marlex® HHM 5502BN HDPE (available from Chevron Phillips Chemical Company) and about 0% to about 20% Hyperform® HPR-803i (available from Milliken Chemical) as a reinforcing fiber.

Core-layer formulation 36 comprised about 98% to about 100 Marlex® HHM 5502BN HDPE (available from Chevron Phillips Chemical Company) which was used as a polyethylene base resin. The polyethylene base resin was blended with HYDROCEROL® CF 40E as a chemical blowing agent and nucleating agent and Heritage Plastics HT6000 LLDPE talc as another nucleating agent. $N_2$ was used as a blowing agent.

The blowing agent, $N_2$, was injected into the molten formulation at levels of about 11 kg/h to expand the molten formulation and reduce the density of the mixture of polymer and nucleating agent. The resulting expanded formulation was then extruded through a die head to establish a core parison. Inner and outer layers were extruded through the die head, locating the expanded formulation therebetween, to form a multi-layer tube. The multi-layer tube was molded to form a container according to the present disclosure.

TABLE 24

Comparison of different insulative cellular non-aromatic polymeric material formulations of Example 23.

| Trial | Core Layer [%] | | | Outer [%] | | | Inner [%] | |
|---|---|---|---|---|---|---|---|---|
| ID | Chevron | CBA | HT6000 | Chevron | Color | Fiber | Chevron | Fiber |
| Control | 100 | 0 | 0 | 95 | 5 | 0 | 100 | 0 |
| DOE 1-1 | 100 | 0.10 | 0.30 | 95 | 5 | 0 | 100 | 0 |
| DOE 1-2 | 100 | 0.10 | 0.30 | 95 | 5 | 0 | 100 | 0 |
| DOE 1-3 | 100 | 0.10 | 0.30 | 95 | 5 | 0 | 100 | 0 |
| DOE 1-4 | 98.4 | 0.10 | 1.50 | 95 | 5 | 0 | 100 | 0 |
| DOE 1-5 | 98.4 | 0.10 | 1.50 | 95 | 5 | 0 | 100 | 0 |
| DOE 1-6 | 98.4 | 0.10 | 1.50 | 95 | 5 | 0 | 100 | 0 |
| DOE 1-7 | 99.2 | 0.50 | 0.30 | 95 | 5 | 0 | 100 | 0 |
| DOE 1-8 | 99.2 | 0.50 | 0.30 | 95 | 5 | 0 | 100 | 0 |
| DOE 1-9 | 99.2 | 0.50 | 0.30 | 95 | 5 | 0 | 100 | 0 |
| DOE 1-10 | 98.0 | 0.50 | 1.50 | 95 | 5 | 0 | 100 | 0 |
| DOE 1-10A (Dual Fiber) | 98.0 | 0.50 | 1.50 | 80 | 5 | 15 | 85 | 15 |
| DOE 1-11 | 98.0 | 0.50 | 1.50 | 95 | 5 | 0 | 100 | 0 |
| DOE 1-12 | 98.0 | 0.50 | 1.50 | 95 | 5 | 0 | 100 | 0 |
| DOE 1-1 10% | 99.6 | 0.10 | 0.30 | 85 | 5 | 10 | 100 | 0 |
| DOE 1-1 15% | 99.6 | 0.10 | 0.30 | 80 | 5 | 15 | 100 | 0 |
| DOE 1-1 20% | 99.6 | 0.10 | 0.30 | 75 | 5 | 20 | 100 | 0 |

Example 24

Densities, Weights, Layer Thicknesses, and Visual Scores for Formulations of Example 23

Multi-layer containers formed according to Table 24 were subjected to a series of measurements including visual score (determined according to Example 30), container density ($\rho$) measurements, weight measurements, and thickness measurements. The results are shown below in Table 25.

Density was determined by the apparatus and methods described in Example 2.

TABLE 25

Visual score, densities, Weight, Top Load Performance, and Layer Thicknesses of insulative cellular non-aromatic polymeric material formulations of Example 23.

| Trial ID | Average Visual Score Max 12 | Physical Weight [g] | Physical Density [g/cc] | Wall Thickness Avg. [mils] | Wall Thickness Min [mils] | Wall Thickness Max [mils] |
|---|---|---|---|---|---|---|
| Control | 12 | 23.0 | 0.934 | 0.032 | 0.019 | 0.044 |
| DOE 1-1 | 11.35 | 17.1 | 0.710 | 0.039 | 0.025 | 0.062 |
| DOE 1-2 | 11.65 | 16.9 | 0.734 | 0.032 | 0.021 | 0.056 |
| DOE 1-3 | 11.25 | 17.1 | 0.760 | 0.030 | 0.022 | 0.055 |
| DOE 1-4 | 11.4 | 17.7 | 0.644 | 0.036 | 0.025 | 0.064 |
| DOE 1-5 | 11.35 | 17.2 | 0.685 | 0.033 | 0.022 | 0.057 |
| DOE 1-6 | 11.5 | 16.8 | 0.744 | 0.030 | 0.020 | 0.050 |
| DOE 1-7 | 10.35 | 17.4 | 0.612 | 0.037 | 0.025 | 0.065 |
| DOE 1-8 | 10.8 | 17.3 | 0.697 | 0.034 | 0.023 | 0.059 |
| DOE 1-9 | 10.9 | 17.1 | 0.760 | 0.030 | 0.021 | 0.052 |
| DOE 1-10 | 10.7 | 17.0 | 0.625 | 0.038 | 0.024 | 0.060 |
| DOE 1-10A | 11.25 | 17.0 | 0.479 | 0.047 | 0.031 | 0.070 |
| DOE 1-11 | 10.5 | 17.1 | 0.693 | 0.032 | 0.021 | 0.051 |
| DOE 1-12 | 11.6 | 17.5 | 0.784 | 0.029 | 0.022 | 0.044 |
| DOE 1-1 10% | 10.8 | 17.0 | 0.624 | 0.040 | 0.018 | 0.063 |
| DOE 1-1 15% | 10.3 | 17.5 | 0.656 | 0.034 | 0.020 | 0.056 |
| DOE 1-1 20% | 9 | 17.1 | 0.665 | 0.034 | 0.023 | 0.055 |

Example 25

Top Load Performance, Rigidity, Drop Test Results, and Cap Application and Removal for Formulations of Example 23

Multi-layer containers formed according to Table 24 were subjected to a series of measurements and performance tests including top load force performance measurements, rigidity measurements, drop testing, and cap application and removal. The results are shown below in Table 26.

Drop tests were conducted by methods described in Example 6. In some examples, the method described in Example 6 was followed with the exception of replacing water with shampoo. Top load performance was measured by methods described in Example 7. In some examples, the method described in Example 7 was performed with a container that was closed with a cap. In other examples, the method in Example 7 was performed with a container without a cap. Rigidity was measured by methods described in Example 21. The forces required to remove and apply caps to the containers were measured. Containers having caps were subjected to application and removal testing based on ASTM D3473-88 (Standard Test Methods for Lifting Force Required to Remove Certain Child-Resistant Snap Caps) and ASTM D3480-88 (Standard Test Methods for Downward Force Required to Open or Activate Child-Resistant Snap-Engagement Packages), each of which is incorporated by reference herein in its entirety.

TABLE 26

Drop test results, rigidity, top load performance, and cap application and removal of insulative cellular non-aromatic polymeric material formulations of Example 23.

| Trial ID | Water Drop Pass [%] | Rigidity [kg-F] | Top Load Uncapped [N] | Top Load Capped [N] | Cap Removal [lb-f] | Cap Removal [N] | Cap Application [lb-f] | Cap Application [N] |
|---|---|---|---|---|---|---|---|---|
| Control | 100 | 1.82 | 343 | 495 | 26 | 117 | 20 | 91 |
| DOE 1-1 | 70 | 1.43 | 184 | * | 17 | 74 | 20 | 89 |
| DOE 1-2 | 80 | 1.04 | 162 | * | 16 | 73 | 27 | 118 |
| DOE 1-3 | 70 | 0.90 | 149 | * | 18 | 79 | 25 | 113 |
| DOE 1-4 | 90 | 1.28 | 194 | * | 17 | 76 | 22 | 100 |
| DOE 1-5 | 100 | 1.01 | 167 | 243 | 17 | 77 | 25 | 109 |
| DOE 1-6 | 80 | 0.88 | 150 | * | 18 | 79 | 28 | 125 |
| DOE 1-7 | 60 | 1.16 | 180 | * | 18 | 81 | 26 | 114 |
| DOE 1-8 | 100 | 1.07 | 167 | 239 | 18 | 79 | 28 | 125 |
| DOE 1-9 | 100 | 0.88 | 151 | * | 17 | 74 | 21 | 95 |
| DOE 1-10 | 100 | 1.32 | 197 | 271 | 18 | 79 | 24 | 107 |
| DOE 1-10A | 60 | 1.87 | 245 | * | 17 | 77 | 22 | 96 |
| DOE 1-11 | 100 | 0.99 | 173 | 260 | 18 | 78 | 26 | 116 |
| DOE 1-12 | 100 | 0.88 | 165 | * | 18 | 79 | 24 | 106 |
| DOE 1-1 10% | 100 | 1.34 | 209 | 309 | 18 | 79 | 26 | 116 |
| DOE 1-1 15% | 90 | 1.15 | 207 | * | 19 | 85 | 36 | 161 |
| DOE 1-1 20% | 90 | 1.15 | 212 | * | 19 | 85 | 26 | 117 |

* Data not available

Example 26

Visual Score

General Procedure

Containers were given scores based on a set of twelve observable factors. Each time a container lacked an observable factor, one point was awarded. Thus, a container lacking all observable factors obtained a best score of 12. The observable factors included: 1) presence of holes, 2) the presence of foreign material, 3) whether the container was malformed, 4) engraving on the container, 5) undesirable appearance of the container, 6) undesirable color of the container, 7) presence of odor in the container, 8) neck top of the container lacking smoothness, 9) neck bore of the container lacking smoothness, 10) whether the container had a rocker bottom defect, 11) undesirable finish quality, and 12) undesirable parting line. In some examples, several containers were formed, tested, and the scores were averaged.

Example 27

Multi-Layer Tubes Comprising Various Amounts of Chemical Blowing Agent and Formed at Various Temperatures Outer-layer formulation 32 comprised about 85% Marlex® HHM 5502BN HDPE (available from Chevron Phillips Chemical Company), about 5% Ampacet 112761 White Polyethylene Masterbatch (available from Ampacet Corporation) as a coloring agent, and about 10% of a reinforcing fiber blend of about 15% Hyperform® HPR-803i (available from Milliken Chemical) and about 85% Braskem F020HC High Crystallinity Polypropylene (available from Braskem). Inner-layer formulation 28 comprised about 100% Marlex® HHM 5502BN HDPE (available from Chevron Phillips Chemical Company). Core-layer formulation 36 comprised between about 99.2% and about 99.6% Marlex® HHM 5502BN HDPE (available from Chevron Phillips Chemical Company), as shown in Table 30, which was used as a polyethylene base resin. The polyethylene base resin was blended with between about 0.1% and about 0.5% HYDROCEROL® CF 40E as a chemical blowing agent (CBA) and nucleating agent, as shown in Table 27, and about 0.3% Heritage Plastics HT6000 LLDPE talc as another nucleating agent. $N_2$ was used as a blowing agent and was injected into the rest of the molten core-layer formulation 36 at a level of about 0.044 kg/h.

The extruder head temperature was varied between about 180° C. and about 190° C., and the core layer extruder barrel temperature was varied between about 180° C. and about 190° C., as shown in Table 27. The inner and outer layer extruder barrel temperatures were both 190° C. The resulting expanded core-layer formulation 36 was extruded through a die head to establish a core parison. Inner and outer layers were extruded through the die head, locating the expanded formulation therebetween, to form a multi-layer tube. The layers were extruded such that the inner layer provided about 6% of the thickness of the entire tube, the outer layer provided about 6% of the thickness of the entire tube, and the core layer provided about 88% of the thickness of the entire tube. For each formulation, density was measured for six tubes according to the procedure of Example 2, as shown in Table 28 as Density. The average of the six densities for each formulation is shown as Average Density in Table 31. The melt temperature for each formulation was also determined and is reported in Table 31 as Melt Temp.

TABLE 27

Amount of CBA, amount of HDPE, head temperature, and barrel temperature for tubes of Example 27.

| Trial [#] | CBA [%] | HDPE [%] | Head Temp [° C.] | Barrel Temp [° C.] |
|---|---|---|---|---|
| 12.A.0 | 0.10 | 99.6 | 180 | 180 |
| 12.A.1 | 0.50 | 99.2 | 180 | 180 |
| 12.A.2 | 0.10 | 99.6 | 190 | 180 |
| 12.A.3 | 0.50 | 99.2 | 190 | 180 |
| 12.A.4 | 0.10 | 99.6 | 180 | 190 |
| 12.A.5 | 0.50 | 99.2 | 180 | 190 |
| 12.A.6 | 0.10 | 99.6 | 190 | 190 |
| 12.A.7 | 0.50 | 99.2 | 190 | 190 |

TABLE 28

Density, average density, and melt temperature for tubes of Example 27.

| Trial [#] | Density [g/cm$^3$] | Average Density [g/cm$^3$] | Melt Temp [° C.] |
|---|---|---|---|
| 12.A.0a | 0.488 | 0.493 | 180 |
| 12.A.0b | 0.499 | | |
| 12.A.0c | 0.486 | | |
| 12.A.0d | 0.495 | | |
| 12.A.0e | 0.494 | | |
| 12.A.0f | 0.498 | | |
| 12.A.1a | 0.491 | 0.509 | 180 |
| 12.A.1b | 0.514 | | |
| 12.A.1c | 0.509 | | |
| 12.A.1d | 0.517 | | |
| 12.A.1e | 0.510 | | |
| 12.A.1f | 0.511 | | |
| 12.A.2a | 0.484 | 0.480 | 180 |
| 12.A.2b | 0.486 | | |
| 12.A.2c | 0.470 | | |
| 12.A.2d | 0.486 | | |
| 12.A.2e | 0.474 | | |
| 12.A.2f | 0.482 | | |
| 12.A.3a | 0.500 | 0.504 | 181 |
| 12.A.3b | 0.499 | | |
| 12.A.3c | 0.503 | | |
| 12.A.3d | 0.508 | | |
| 12.A.3e | 0.504 | | |
| 12.A.3f | 0.509 | | |
| 12.A.4a | 0.495 | 0.500 | 190 |
| 12.A.4b | 0.505 | | |
| 12.A.4c | 0.493 | | |
| 12.A.4d | 0.507 | | |
| 12.A.4e | 0.494 | | |
| 12.A.4f | 0.505 | | |
| 12.A.5a | 0.498 | 0.500 | 190 |
| 12.A.5b | 0.506 | | |
| 12.A.5c | 0.486 | | |
| 12.A.5d | 0.507 | | |
| 12.A.5e | 0.495 | | |
| 12.A.5f | 0.510 | | |
| 12.A.6a | 0.484 | 0.492 | 189 |
| 12.A.6b | 0.494 | | |
| 12.A.6c | 0.494 | | |
| 12.A.6d | 0.494 | | |
| 12.A.6e | 0.492 | | |
| 12.A.6f | 0.493 | | |
| 12.A.7a | 0.512 | 0.514 | 190 |
| 12.A.7b | 0.523 | | |
| 12.A.7c | 0.511 | | |
| 12.A.7d | 0.520 | | |
| 12.A.7e | 0.490 | | |
| 12.A.7f | 0.526 | | |

Example 28

Multi-Layer Tubes Formed at Various $N_2$ Flow Rates

Outer-layer formulation 32 comprised about 85% Marlex® HHM 5502BN HDPE (available from Chevron Phillips Chemical Company), about 5% Ampacet 112761 White Polyethylene Masterbatch (available from Ampacet Corporation) as a coloring agent, and about 10% of a reinforcing fiber blend of about 15% Hyperform® HPR-803i (available from Milliken Chemical) and about 85% Braskem F020HC High Crystallinity Polypropylene (available from Braskem). Inner-layer formulation 28 comprised about 100% Marlex® HHM 5502BN HDPE (available from Chevron Phillips Chemical Company).

Core-layer formulation 36 comprised about 99.6% Marlex® HHM 5502BN HDPE (available from Chevron Phillips Chemical Company), which was used as a polyethylene base resin. The polyethylene base resin was blended with about 0.1% HYDROCEROL® CF 40E as a chemical blowing agent and nucleating agent and about 0.3% Heritage Plastics HT6000 LLDPE talc as another nucleating agent. $N_2$ was used as a blowing agent and was injected into the rest of the molten core-layer formulation 36 at a level between about 0.034 kg/h and about 0.104 kg/h, as shown in Table 29.

The extruder head temperature was about 190° C., and the core layer extruder barrel temperature was about 180° C. The inner and outer layer extruder barrel temperatures were both 190° C. The resulting expanded core-layer formulation 36 was extruded through a die head to establish a core parison. Inner and outer layers were extruded through the die head, locating the expanded formulation therebetween, to form a multi-layer tube. The layers were extruded such that the inner layer provided about 6% of the thickness of the entire tube, the outer layer provided about 6% of the thickness of the entire tube, and the core layer provided about 88% of the thickness of the entire tube. In one embodiment, the inner layer provided about 5.8% of the thickness of the entire tube, the outer layer provided about 6.1% of the thickness of the entire tube, and the core layer provided about 88.2% of the thickness of the entire tube. In another embodiment, the inner layer provided about 5.9% of the thickness of the entire tube, the outer layer provided about 6.1% of the thickness of the entire tube, and the core layer provided about 88.0% of the thickness of the entire tube. The thicknesses for two tubes formed at each $N_2$ flow rate were measured and are described in Table 30 as Outer Layer Thickness, Core Layer Thickness, Inner Layer Thickness, and Total Thickness. For each $N_2$ flow rate, density was measured for four tubes according to the procedure of Example 2, as shown in Table 31 as Parison Density. The average of the four densities for each $N_2$ flow rate is shown as Average Density in Table 31. The melt temperature for each formulation was also determined and is reported in Table 31 as Melt Temp.

TABLE 29

$N_2$ flow rate for tubes of Example 28.

| Trial [#] | $N_2$ Flow Rate [kg/h] |
|---|---|
| 12.B.0 | 0.034 |
| 12.B.1 | 0.044 |
| 12.B.2 | 0.054 |
| 12.B.3 | 0.064 |
| 12.B.4 | 0.074 |
| 12.B.5 | 0.084 |
| 12.B.6 | 0.094 |
| 12.B.7 | 0.104 |

TABLE 30

Outer layer thickness, core layer thickness, inner layer thickness, and total thickness for tubes of Example 28.

| Trial [#] | Outer Layer Thickness [mils] [%] | Core Layer Thickness [mils] [%] | Inner Layer Thickness [mils] [%] | Total Thickness [mils] |
|---|---|---|---|---|
| 12.B.0a | 7.18 (6.0) | 104.24 (86.8) | 8.63 (7.2) | 120.05 |
| 12.B.0b | 6.87 (6.1) | 98.98 (87.4) | 7.44 (6.6) | 113.29 |
| 12.B.1a | 5.46 (4.6) | 106.51 (89.0) | 7.67 (6.4) | 119.64 |
| 12.B.1b | 6.39 (5.4) | 103.43 (87.7) | 8.06 (6.8) | 117.88 |
| 12.B.2a | 6.93 (5.5) | 110.55 (87.6) | 8.76 (6.9) | 126.24 |
| 12.B.2b | 7.25 (5.5) | 114.98 (87.9) | 8.52 (6.5) | 130.75 |
| 12.B.3a | 7.77 (5.8) | 119.12 (88.6) | 7.54 (5.6) | 134.43 |
| 12.B.3b | 7.00 (5.2) | 118.8 (88.7) | 8.07 (6.0) | 133.87 |
| 12.B.4a | 8.79 (6.7) | 115.64 (87.4) | 7.28 (5.5) | 131.71 |
| 12.B.4b | 7.62 (5.5) | 123.04 (89.5) | 6.85 (5.0) | 137.51 |
| 12.B.5a | 8.03 (5.8) | 122.68 (89.4) | 6.56 (4.8) | 137.27 |
| 12.B.5b | 6.81 (5.1) | 119.64 (89.8) | 6.82 (5.1) | 133.27 |
| 12.B.6a | 7.07 (5.2) | 120.52 (89.2) | 7.50 (5.6) | 135.09 |
| 12.B.6b | 6.95 (4.9) | 128.6 (91.2) | 5.43 (3.9) | 140.98 |
| 12.B.7a | 6.60 (6.7) | 84.9 (86.8) | 6.33 (6.5) | 97.83 |
| 12.B.7b | 8.51 (9.1) | 76.01 (81.6) | 8.65 (9.3) | 93.17 |

TABLE 31

Density, average density, and melt temp for tubes of Example 28.

| Trial [#] | Density [g/cm³] | Average Density [g/cm³] | Melt Temp [° C.] |
|---|---|---|---|
| 12.B.0a | 0.554 | 0.542 | 180 |
| 12.B.0b | 0.537 | | |
| 12.B.0c | 0.538 | | |
| 12.B.0d | 0.540 | | |
| 12.B.1a | 0.506 | 0.508 | 180 |
| 12.B.1b | 0.505 | | |
| 12.B.1c | 0.513 | | |
| 12.B.1d | 0.508 | | |
| 12.B.2a | 0.466 | 0.470 | 180 |
| 12.B.2b | 0.472 | | |
| 12.B.2c | 0.472 | | |
| 12.B.2d | 0.468 | | |
| 12.B.3a | 0.425 | 0.431 | 180 |
| 12.B.3b | 0.430 | | |
| 12.B.3c | 0.434 | | |
| 12.B.3d | 0.435 | | |
| 12.B.4a | 0.401 | 0.408 | 180 |
| 12.B.4b | 0.407 | | |
| 12.B.4c | 0.411 | | |
| 12.B.4d | 0.414 | | |
| 12.B.5a | 0.379 | 0.374 | 180 |
| 12.B.5b | 0.370 | | |
| 12.B.5c | 0.372 | | |
| 12.B.5d | 0.375 | | |
| 12.B.6a | 0.393 | 0.398 | 180 |
| 12.B.6b | 0.393 | | |
| 12.B.6c | 0.401 | | |
| 12.B.6d | 0.405 | | |
| 12.B.7a | 0.559 | 0.544 | 180 |
| 12.B.7b | 0.541 | | |
| 12.B.7c | 0.537 | | |
| 12.B.7d | 0.540 | | |

Example 31

Side Drop Test Measurements
General Procedure

Side drop testing determines a likelihood of container survival due to a drop or impact to the container. Containers were subjected to a side drop testing procedure based on ASTM D2463 (Standard Test Method for Drop Impact Resistance of Blow-Molded Thermoplastic Containers), which is incorporated by reference herein in its entirety.

The side drop test was performed according to the following procedure. A bottle was filled with tap water. The water in the bucket was allowed to condition for at least 24 hours at about room temperature and about 75% relative humidity. The container was filled with water from the bucket and closed off with, for example, a lid. The filled, capped containers were then subjected to the following procedure: (a) the filled, capped container was located at about five feet above a hard surface such as concrete or tile; (b) the filled, capped container was then oriented such that a side of the filled, capped container was arranged to lie in a substantially parallel relation to the hard surface; (c) each of five or ten capped, filled containers were dropped; (d) upon impact, each filled, capped container was examined for any break or shattering of the wall that causes water to leak out of the bottle; and (d) the total number of bottles showing any sign of leakage after the drop test were counted as failures.

Example 32

Formulations and Test Results for Tubes with about 6% Inner/Outer Layer Thickness and Bottles Formed Therefrom Outer-layer formulation 32 comprised about 85% Marlex® HHM 5502BN HDPE (available from Chevron Phillips Chemical Company), about 5% Ampacet 112761 White Polyethylene Masterbatch (available from Ampacet Corporation) as a coloring agent, and about 10% of a reinforcing fiber blend of about 15% Hyperform® HPR-803i (available from Milliken Chemical) and about 85% Braskem F020HC High Crystallinity Polypropylene (available from Braskem). Inner-layer formulation 28 comprised about 100% Marlex® HHM 5502BN HDPE (available from Chevron Phillips Chemical Company).

Core-layer formulation 36 comprised about 99.6% Marlex® HHM 5502BN HDPE (available from Chevron Phillips Chemical Company), which was used as a polyethylene base resin. The polyethylene base resin was blended with about 0.1% HYDROCEROL® CF 40E as a chemical blowing agent and nucleating agent and about 0.3% Heritage Plastics HT6000 LLDPE talc as another nucleating agent. $N_2$ was used as a blowing agent and was injected into the rest of the molten core-layer formulation 36 at levels between about 0.034 kg/h and about 0.104 kg/h as shown in Table 32.

The extruder head temperature was about 190° C., and the core layer extruder barrel temperature was about 180° C. The inner and outer layer extruder barrel temperatures were both 190° C. The resulting expanded core-layer formulation 36 was extruded through a die head to establish a core parison. Inner and outer layers were extruded through the die head, locating the expanded formulation therebetween, to form a multi-layer tube. The layers were extruded such that the inner layer provided about 6% of the thickness of the entire tube, the outer layer provided about 6% of the thickness of the entire tube, and the core layer provided about 88% of the thickness of the entire tube. In one embodiment, the inner layer provided about 6.1% of the thickness of the entire tube, the outer layer provided about 5.8% of the thickness of the entire tube, and the core layer provided about 88.2% of the thickness of the entire tube. For each $N_2$ flow rate, the mean density of several tubes was measured according to the procedure of Example 2 and is shown below in Table 32 as Average Tube Density.

For tubes where tube density was not measured, a mold was closed around the tube and a blow needle was inserted into a space formed in the tube. During inserting the needle, the mold was moved away from the die head. Vacuum was applied to the mold and caused the pressure to decrease to $P_{VAC}$, which was about 27 inches Hg. Pressurized air was pumped into a space formed in the tube to cause the tube to expand and take on the shape of the mold. The pressurized air in this example was delivered at about 2.5 bar and at about 2° C. In the next step, the mold was opened to reveal a container, also referred to as a bottle. Cycle time is as an amount of time between closing the mold around the tube and opening the mold to reveal a container. The cycle time in this example was about 10 seconds. After molding, the inner layer of the bottle provided about 10% of the thickness of the entire bottle, the outer layer of the bottle provided about 10% of the thickness of the entire bottle, and the core layer of the bottle provided about 80% of the thickness of the entire bottle. In one embodiment, the inner layer of the bottle provided about 7.9% of the thickness of the entire bottle, the outer layer of the bottle provided about 9.9% of the thickness of the entire bottle, and the core layer of the bottle provided about 82.2% of the thickness of the entire bottle. In this embodiment, blow molding caused the inner layer's contribution to bottle thickness to increase by 30.6%, the outer layer's contribution to bottle thickness to increase by 71.6%, and the core layer's contribution to bottle thickness to decrease by 6.8%. For each $N_2$ flow rate, mean density of several bottles was measured according to the procedure of Example 2, mean rigidity of several bottles was measured according to the procedure of Example 21, the bottom drop test was performed according to the procedure of Example 6 (five bottles were dropped for each set of parameters), and the side drop test was performed according to the procedure of Example 31 (five bottles were dropped for each set of parameters). The results are shown below in Table 32 for each $N_2$ flow rate and labeled as Average Bottle Density, Rigidity, Bottom Drop Test Pass Rate, and Side Drop Test Pass Rate, respectively.

TABLE 32

$N_2$ flow rate, average tube density, average bottle density, rigidity, bottom drop test pass rate, and side drop test pass rate for tubes and bottles of Example 32.

| Trial [#] | $N_2$ Flow Rate [kg/h] | Average Tube Density [g/cm³] | Average Bottle Density [g/cm³] | Rigidity [kgF] | Bottom Drop Test Pass Rate [%] | Side Drop Test Pass Rate [%] |
|---|---|---|---|---|---|---|
| 13.A.1 | 0.034 | 0.542 | 0.705 | * | 60 | 60 |
| 13.A.2 | 0.044 | 0.508 | 0.674 | * | 100 | 100 |
| 13.A.3 | 0.054 | 0.470 | 0.674 | * | 100 | 100 |
| 13.A.4 | 0.064 | 0.431 | 0.616 | * | 0 | 100 |
| 13.A.5 | 0.074 | 0.408 | 0.574 | * | 40 | 100 |
| 13.A.6 | 0.084 | 0.374 | 0.553 | 2.310 | 0 | 40 |
| 13.A.7 | 0.094 | 0.398 | 0.572 | 2.448 | 0 | 0 |
| 13.A.8 | 0.104 | 0.544 | 0.622 | * | 0 | 0 |

* Data not available

Example 33

Formulations and Test Results for Tubes with about 12% Inner/Outer Skin Thickness Outer-layer formulation 32 comprised about 85% Marlex® HHM 5502BN HDPE (available from Chevron Phillips Chemical Company), about 5% Ampacet 112761 White Polyethylene Masterbatch (available from Ampacet Corporation) as a coloring agent, and about 10% of a reinforcing fiber blend of about 15% Hyperform® HPR-803i (available from Milliken Chemical) and about 85% Braskem F020HC High Crystallinity Polypropylene (available from Braskem).

Inner-layer formulation 28 comprised about 100% Marlex® HHM 5502BN HDPE (available from Chevron Phillips Chemical Company).

Core-layer formulation 36 comprised about 99.6% Marlex® HHM 5502BN HDPE (available from Chevron Phillips Chemical Company), which was used as a polyethylene base resin. The polyethylene base resin was blended with about 0.1% HYDROCEROL® CF 40E as a chemical blowing agent and nucleating agent and about 0.3% Heritage Plastics HT6000 LLDPE talc as another nucleating agent. $N_2$ was used as a blowing agent and was injected into the rest of the molten core-layer formulation 36 at levels between about 0.044 kg/h and about 0.114 kg/h as shown in Table 33. The extruder head temperature was about 190° C., and the core layer extruder barrel temperature was about 180° C. The inner and outer layer extruder barrel temperatures were both 190° C. The resulting expanded core-layer formulation 36 was extruded through a die head to establish a core parison. Inner and outer layers were extruded through the die head, locating the expanded formulation therebetween, to form a multi-layer tube. The layers were extruded such that the inner layer provided about 12% of the thickness of the entire tube, the outer layer provided about 12% of the thickness of the entire tube, and the core layer provided about 76% of the thickness of the entire tube. In one embodiment, the inner layer provided about 10.9% of the thickness of the entire tube, the outer layer provided about 11.1% of the thickness of the entire tube, and the core layer provided about 78.0% of the thickness of the entire tube. For each $N_2$ flow rate, average outer, core, and inner layer thicknesses of the tubes were measured and are shown in Table 33. Also, for each $N_2$ flow rate, density was measured for four tubes according to the procedure of Example 2 and is shown in Table 34 as Density. The average of the four densities for each $N_2$ flow rate is shown as Average Density in Table 34.

TABLE 33

$N_2$ flow rate, outer layer thickness, core layer thickness, inner layer thickness, and total thickness for tubes of Example 33.

| Trial [#] | $N_2$ Flow Rate [kg/h] | Outer Layer Thickness [mils] [%] | Core Layer Thickness [mils] [%] | Inner Layer Thickness [mils] [%] | Total Thickness [mils] |
|---|---|---|---|---|---|
| 13.B.0.1 | 0.044 | 14.29 (12.3) | 86.21 (74.5) | 15.29 (13.2) | 115.79 |
| 13.B.1.1 | 0.054 | 13.79 (11.1) | 98.07 (78.8) | 12.54 (10.1) | 124.4 |
| 13.B.2.1 | 0.064 | 13.04 (10.8) | 93.23 (77.3) | 14.29 (11.9) | 120.56 |
| 13.B.3.1 | 0.074 | 13.37 (10.8) | 97.92 (79.3) | 12.2 (9.9) | 123.49 |
| 13.B.4.1 | 0.084 | 13.12 (9.9) | 105.76 (79.7) | 13.79 (10.4) | 132.67 |
| 13.B.5.1 | 0.094 | 13.70 (11.3) | 94.82 (78.2) | 12.7 (10.5) | 121.22 |
| 13.B.6.1 | 0.104 | 13.62 (11.8) | 90.23 (78.3) | 11.36 (9.9) | 115.21 |
| 13.B.7.1 | 0.114 | 13.46 (11.0) | 95.15 (77.5) | 14.13 (11.5) | 122.74 |

TABLE 34

Density and average density for tubes of Example 33.

| Trial [#] | Density [g/cm³] | Average Density [g/cm³] |
|---|---|---|
| 13.B.0.1a | 0.567 | 0.563 |
| 13.B.0.1b | 0.553 | |
| 13.B.0.1c | 0.571 | |
| 13.B.0.1d | 0.559 | |
| 13.B.1.1a | 0.539 | 0.529 |
| 13.B.1.1b | 0.534 | |
| 13.B.1.1c | 0.517 | |
| 13.B.1.1d | 0.526 | |
| 13.B.2.1a | 0.507 | 0.500 |
| 13.B.2.1b | 0.503 | |
| 13.B.2.1c | 0.487 | |
| 13.B.2.1d | 0.502 | |
| 13.B.3.1a | 0.484 | 0.479 |
| 13.B.3.1b | 0.479 | |
| 13.B.3.1c | 0.478 | |
| 13.B.3.1d | 0.476 | |
| 13.B.4.1a | 0.437 | 0.431 |
| 13.B.4.1b | 0.428 | |
| 13.B.4.1c | 0.431 | |
| 13.B.4.1d | 0.427 | |
| 13.B.5.1a | 0.430 | 0.432 |
| 13.B.5.1b | 0.421 | |
| 13.B.5.1c | 0.445 | |
| 13.B.5.1d | 0.433 | |
| 13.B.6.1a | 0.491 | 0.489 |
| 13.B.6.1b | 0.466 | |
| 13.B.6.1c | 0.497 | |
| 13.B.6.1d | 0.502 | |
| 13.B.7.1a | 0.528 | 0.494 |
| 13.B.7.1b | 0.525 | |
| 13.B.7.1c | 0.464 | |
| 13.B.7.1d | 0.460 | |

Example 35

Formulations and Test Results for Tubes with about 18% Inner/Outer Skin Thickness Outer-layer formulation 32 comprised about 85% Marlex® HHM 5502BN HDPE (available from Chevron Phillips Chemical Company), about 5% Ampacet 112761 White Polyethylene Masterbatch (available from Ampacet Corporation) as a coloring agent, and about 10% of a reinforcing fiber blend of about 15% Hyperform® HPR-803i (available from Milliken Chemical) and about 85% Braskem F020HC High Crystallinity Polypropylene (available from Braskem). Inner-layer formulation 28 comprised about 100% Marlex® HHM 5502BN HDPE (available from Chevron Phillips Chemical Company).

Core-layer formulation 36 comprised about 99.6% Marlex® HHM 5502BN HDPE (available from Chevron Phillips Chemical Company), which was used as a polyethylene base resin. The polyethylene base resin was blended with about 0.1% HYDROCEROL® CF 40E as a chemical blowing agent and nucleating agent and about 0.3% Heritage Plastics HT6000 LLDPE talc as another nucleating agent. $N_2$ was used as a blowing agent and was injected into the rest of the molten core-layer formulation 36 at levels between about 0.044 kg/h and about 0.124 kg/h as shown in Table 43.

The extruder head temperature was about 190° C., and the core layer extruder barrel temperature was about 180° C. The inner and outer layer extruder barrel temperatures were both 190° C. The resulting expanded core-layer formulation 36 was extruded through a die head to establish a core parison. Inner and outer layers were extruded through the die head, locating the expanded formulation therebetween, to form a multi-layer tube. The layers were extruded such that the inner layer provided about 18% of the thickness of the entire tube, the outer layer provided about 18% of the thickness of the entire tube, and the core layer provided about 64% of the thickness of the entire tube. In one embodiment, the inner layer provided about 15.1% of the thickness of the entire tube, the outer layer provided about 17.1% of the thickness of the entire tube, and the core layer provided about 67.8% of the thickness of the entire tube. For each $N_2$ flow rate, average outer, core, and inner layer thicknesses of the tubes were measured and are shown in Table 35. Also, for each of $N_2$ flow rate, density was measured for four tubes according to the procedure of Example 2 and is shown in Table 35 as Density. The average of the four densities for each $N_2$ flow rate is shown as Average Density in Table 36.

TABLE 35

$N_2$ flow rate, outer layer thickness, core layer thickness, inner layer thickness and total thickness for tubes of Example 35.

| Trial [#] | $N_2$ Flow Rate [kg/h] | Outer Layer Thickness [mils] [%] | Core Layer Thickness [mils] [%] | Inner Layer Thickness [mils] [%] | Total Thickness [mils] |
|---|---|---|---|---|---|
| 13.C.0.1 | 0.044 | 25.32 (20.5) | 75.52 (61.2) | 22.64 (18.3) | 123.48 |
| 13.C.1.1 | 0.054 | 21.47 (16.8) | 84.05 (65.8) | 22.14 (17.3) | 127.66 |
| 13.C.2.1 | 0.074 | 18.13 (14.5) | 91.65 (73.1) | 15.54 (12.4) | 125.32 |
| 13.C.3.1 | 0.084 | 18.48 (14.5) | 89.08 (69.8) | 20.1 (15.7) | 127.66 |
| 13.C.4.1 | 0.094 | 18.63 (15.6) | 83.14 (69.7) | 17.46 (14.6) | 119.23 |
| 13.C.5.1 | 0.104 | 19.47 (17.3) | 77.6 (68.8) | 15.72 (13.9) | 112.79 |
| 13.C.6.1 | 0.114 | 20.56 (19.3) | 71.17 (66.9) | 14.62 (13.7) | 106.35 |
| 13.C.7.1 | 0.124 | 19.63 (23.0) | 49.96 (58.6) | 15.71 (18.4) | 85.3 |
| 13.C.8.1 | 0.064 | 19.55 (15.5) | 87.64 (69.6) | 18.8 (14.9) | 125.99 |

TABLE 36

Density and average density for tubes of Example 35.

| Trial [#] | Density [g/cm³] | Average Density [g/cm³] |
|---|---|---|
| 13.C.0.1a | 0.601 | 0.605 |
| 13.C.0.1b | 0.599 | |
| 13.C.0.1c | 0.608 | |
| 13.C.0.1d | 0.610 | |
| 13.C.1.1a | 0.582 | 0.575 |
| 13.C.1.1b | 0.561 | |
| 13.C.1.1c | 0.579 | |
| 13.C.1.1d | 0.579 | |
| 13.C.2.1a | 0.514 | 0.512 |
| 13.C.2.1b | 0.533 | |
| 13.C.2.1c | 0.500 | |
| 13.C.2.1d | 0.500 | |
| 13.C.3.1a | 0.490 | 0.482 |
| 13.C.3.1b | 0.491 | |
| 13.C.3.1c | 0.477 | |
| 13.C.3.1d | 0.468 | |
| 13.C.4.1a | 0.442 | 0.504 |
| 13.C.4.1b | 0.517 | |
| 13.C.4.1c | 0.501 | |
| 13.C.4.1d | 0.555 | |
| 13.C.5.1a | 0.474 | 0.518 |
| 13.C.5.1b | 0.581 | |
| 13.C.5.1c | 0.460 | |
| 13.C.5.1d | 0.555 | |
| 13.C.6.1a | 0.503 | 0.576 |
| 13.C.6.1b | 0.627 | |
| 13.C.6.1c | 0.531 | |
| 13.C.6.1d | 0.644 | |
| 13.C.7.1a | 0.610 | 0.506 |
| 13.C.7.1b | 0.469 | |
| 13.C.7.1c | 0.538 | |
| 13.C.7.1d | 0.406 | |
| 13.C.8.1a | 0.496 | 0.496 |
| 13.C.8.1b | 0.494 | |
| 13.C.8.1c | 0.485 | |
| 13.C.8.1d | 0.508 | |

Example 37

Formulations and Test Results for Tubes with Various Amounts of Reinforcing Fiber Outer-layer formulation 32 comprised between about 75% and about 95% Marlex® HHM 5502BN HDPE (available from Chevron Phillips Chemical Company), about 5% Ampacet 112761 White Polyethylene Masterbatch (available from Ampacet Corporation) as a coloring agent, and between about 0% and about 20% of a reinforcing fiber blend of about 15% Hyperform® HPR-803i (available from Milliken Chemical) and about 85% Braskem F020HC High Crystallinity Polypropylene (available from Braskem). Inner-layer formulation 28 comprised between about 80% and about 100% Marlex® HHM 5502BN HDPE (available from Chevron Phillips Chemical Company) and between about 0% and about 20% of a reinforcing fiber blend of about 15% Hyperform® HPR-803i (available from Milliken Chemical) and about 85% Braskem F020HC High Crystallinity Polypropylene (available from Braskem). Amounts of reinforcing fiber and HDPE for formulations made in this example are described in Table 48.

Core-layer formulation 36 comprised about 99.6% Marlex® HHM 5502BN HDPE (available from Chevron Phillips Chemical Company), which was used as a polyethylene base resin. The polyethylene base resin was blended with about 0.1% HYDROCEROL® CF 40E as a chemical blowing agent and nucleating agent and about 0.3% Heritage Plastics HT6000 LLDPE talc as another nucleating agent. $N_2$ was used as a blowing agent and was injected into the rest of the molten core-layer formulation 36 at a level of corresponding to about 0.266% saturation.

The extruder head temperature was about 190° C., and the core layer extruder barrel temperature was about 180° C. The inner and outer layer extruder barrel temperatures were both 190° C. The resulting expanded core-layer formulation 36 was extruded through a die head to establish a core parison. Inner and outer layers were extruded through the die head, locating the expanded formulation therebetween, to form a multi-layer tube. The layers were extruded such that the inner layer provided between about 8% and about 12% of the thickness of the entire tube, the outer layer provided between about 8% and about 12% of the thickness of the entire tube, and the core layer provided between about 76% and about of 84% the thickness of the entire tube. The layer thicknesses for several tubes of each formulation were measured and the mean values of these thicknesses for each tube are described in Table 37 as Outer Layer Thickness, Core Layer Thickness, Inner Layer Thickness, and Total Thickness. Outer, core, and inner layer thicknesses of several tubes of each formulation were measured and are shown in Table 38. Also, for each formulation, density was measured for several tubes according to the procedure of Example 2 and the average of the four densities for each formulation is shown as Average Density in Table 38.

TABLE 37

Compositions of outer and inner layers of tubes of Example 37.

| Trial [#] | Outer Layer | | Inner Layer | |
|---|---|---|---|---|
| | Reinforcing Fiber Blend [%] | HDPE [%] | Reinforcing Fiber [%] | HDPE [%] |
| 13.D.1.1 | 10 | 85 | 0 | 100 |
| 13.D.2.1 | 10 | 85 | 0 | 100 |
| 13.D.3.1 | 0 | 95 | 0 | 100 |
| 13.D.4.1 | 0 | 95 | 0 | 100 |
| 13.D.5.1 | 20 | 75 | 0 | 100 |
| 13.D.6.1 | 20 | 75 | 20 | 80 |

TABLE 38

Outer layer thickness, core layer thickness, inner layer thickness, total thickness, and average density for tubes of Example 37.

| Trial [#] | Outer Layer Thickness [mils] [%] | Core Layer Thickness [mils] [%] | Inner Layer Thickness [mils] [%] | Total Thickness [mils] | Average Density |
|---|---|---|---|---|---|
| 13.D.1.1 | 12.37 (10.2) | 96.01 (79.3) | 12.62 (10.4) | 121 | 0.457 |
| 13.D.2.1 | 13.04 (10.4) | 101.43 (80.8) | 11.04 (8.8) | 125.51 | 0.406 |
| 13.D.3.1 | 10.03 (8.1) | 102.67 (82.5) | 11.7 (9.4) | 124.4 | 0.397 |
| 13.D.4.1 | 12.7 (12.0) | 81.6 (77.0) | 11.64 (11.0) | 105.94 | 0.468 |
| 13.D.5.1 | (about 12) | (about 76) | (about 12) | * | * |
| 13.D.6.1 | (about 12) | (about 76) | (about 12) | * | * |

* Data not available

Example 39

Formulations and Test Results for Bottles with Varying Inner/Outer Layer Thickness Outer-layer formulation 32 comprised about 85% Marlex® HHM 5502BN HDPE (available from Chevron Phillips Chemical Company), about 5% Ampacet 112761 White Polyethylene Masterbatch (available from Ampacet Corporation) as a coloring agent, and about 10% of a reinforcing fiber blend of about 15% Hyperform® HPR-803i (available from Milliken Chemical) and about 85% Braskem F020HC High Crystallinity Polypropylene (available from Braskem).

Inner-layer formulation 28 comprised about 100% Marlex® HHM 5502BN HDPE (available from Chevron Phillips Chemical Company).

Core-layer formulation 36 comprised about 99.6% Marlex® HHM 5502BN HDPE (available from Chevron Phillips Chemical Company), which was used as a polyethylene base resin. The polyethylene base resin was blended with about 0.1% HYDROCEROL® CF 40E as a chemical blowing agent and nucleating agent and about 0.3% Heritage Plastics HT6000 LLDPE talc as another nucleating agent. $N_2$ was used as a blowing agent and was injected into the rest of the molten core-layer formulation 36 at a level of corresponding to about 0.266% saturation.

The extruder head temperature was about 190° C., and the core layer extruder barrel temperature was about 180° C. The inner and outer layer extruder barrel temperatures were both 190° C. The resulting expanded core-layer formulation 36 was extruded through a die head to establish a core parison. Inner and outer layers were extruded through the die head, locating the expanded formulation therebetween, to form a multi-layer tube. The layers were extruded such that the inner layer provided between about 8% and about 14% of the thickness of the entire tube, the outer layer provided between about 8% and about 14% of the thickness of the entire tube, and the core layer provided between about 72% to about 84% of the thickness of the entire tube. The thicknesses for the tubes of each formulation are described in Table 39 as Outer Layer Thickness and Inner Layer Thickness.

A mold was closed around the tube and a blow needle was inserted into a space formed in the tube. During inserting the needle, the mold was moved away from the die head. Vacuum was applied to the mold and caused the pressure to decrease to $P_{VAC}$, which was about 27 inches Hg. Pressurized air was pumped into a space formed in the tube to cause the tube to expand and take on the shape of the mold. The pressurized air in this example was delivered at about 2.5 bar and at about 2° C. In the next step, the mold was opened to reveal a container, also referred to as a bottle. Cycle time is an amount of time between closing the mold around the tube and opening the mold to reveal a container. The cycle time in this example was about 10 seconds. For set of parameters, density was measured for several bottles according to the procedure of Example 2 the average of the several densities for each set of parameters is shown as Average Bottle Density in Table 39. Mean weight of several bottles was measured and is shown in Table 55. For each set of parameters, the top load capacity of several bottles was measured according to the procedure of Example 7, mean rigidity of several bottles was measured according to the procedure of Example 21, the bottom drop test was performed according to the procedure of Example 6 (five bottles were dropped for each set of parameters), and the side drop test was performed according to the procedure of Example 31 (five bottles were dropped for each set of parameters). The results are shown below in Table 40 for each formulation and are labeled as Top Load Capacity, Rigidity, Bottom Drop Test Pass Rate, and Side Drop Test Pass Rate, respectively.

TABLE 39

Outer layer thickness, core layer thickness, average bottle density, and average bottle weight for bottles of Example 39.

| Trial [#] | Outer Layer Thickness [%] | Inner Layer Thickness [%] | Average Bottle Density [g/cm$^3$] | Average Bottle Weight [g] |
|---|---|---|---|---|
| 13.E.0 | 11.2 | 10.9 | 0.692 | 17.26 |
| 13.E.1 | 8 | 8 | 0.583 | 17.12 |
| 13.E.2 | 8 | 11 | 0.610 | 17.29 |
| 13.E.3 | 8 | 14 | 0.688 | 17.14 |
| 13.E.4 | 11 | 8 | 0.609 | 17.19 |
| 13.E.5 | 11 | 11 | 0.638 | 17.11 |
| 13.E.6 | 11 | 14 | 0.654 | 16.82 |
| 13.E.7 | 14 | 8 | 0.642 | 17.13 |
| 13.E.8 | 14 | 11 | 0.674 | 17.35 |
| 13.E.9 | 14 | 14 | 0.684 | 16.84 |

TABLE 40

Top load capacity, rigidity, bottom drop test result, and side drop test result of bottles of Example 39.

| Trial [#] | Top Load Capacity [lbs-F] | Rigidity [kgF] | Bottom Drop Test Pass Rate [%] | Side Drop Test Pass Rate [%] |
|---|---|---|---|---|
| 13.E.0 | 38.680 | 2.614 | 100 | 50 |
| 13.E.1 | 34.070 | 1.936 | 100 | 100 |
| 13.E.2 | 32.330 | 2.624 | 100 | 30 |
| 13.E.3 | 30.510 | 2.237 | 100 | 50 |
| 13.E.4 | 28.830 | 2.143 | 100 | 50 |
| 13.E.5 | 29.340 | 2.467 | 60 | 60 |
| 13.E.6 | 35.840 | 2.043 | 100 | 80 |
| 13.E.7 | 38.810 | 2.321 | 100 | 90 |
| 13.E.8 | 43.740 | 2.323 | 100 | 70 |
| 13.E.9 | 45.250 | 2.325 | 100 | 80 |

Example 40

Formulations and Test Results for Tubes with Varying $N_2$ Saturation

Outer-layer formulation 32 comprised about 75% Marlex® HHM 5502BN HDPE (available from Chevron Phillips Chemical Company), about 5% Ampacet 112761 White Polyethylene Masterbatch (available from Ampacet Corporation) as a coloring agent, and about 20% of a reinforcing fiber blend of about 15% Hyperform® HPR-803i (available from Milliken Chemical) and about 85% Braskem F020HC High Crystallinity Polypropylene (available from Braskem). Inner-layer formulation 28 comprised about 100% Marlex® HHM 5502BN HDPE (available from Chevron Phillips Chemical Company).

Core-layer formulation 36 comprised about 99.6% Marlex® HHM 5502BN HDPE (available from Chevron Phillips Chemical Company), which was used as a polyethylene base resin. The polyethylene base resin was blended with about 0.1% HYDROCEROL® CF 40E as a chemical blowing agent and nucleating agent and about 0.3% Heritage Plastics HT6000 LLDPE talc as another nucleating agent. $N_2$ was used as a blowing agent and was injected into the rest of the molten core-layer formulation 36 at a level between about 0.045 kg/h and about 0.070 kg/h, corresponding to between about 0.20% and about 0.30% as shown in Table 41.

The extruder head temperature was about 190° C., and the core layer extruder barrel temperature was about 180° C. The inner and outer layer extruder barrel temperatures were both 190° C. The resulting expanded core-layer formulation 36 was extruded through a die head to establish a core parison. The core layer extruder was operated at 13 RPM. Inner and outer layers were extruded through the die head, locating the expanded formulation therebetween, to form a multi-layer tube. The layers were extruded such that the inner layer provided about 11% of the thickness of the entire tube, the outer layer provided about 14% of the thickness of the entire tube, and the core layer provided about 75% of the thickness of the entire tube. The layer thicknesses for several tubes of flow rate were measured and the mean values of these thicknesses for each tube are described in Table 41 as Inner Layer Thickness and Outer Layer Thickness.

TABLE 41

$N_2$ saturation, $N_2$ flow rate, inner layer thickness, and outer layer thickness, and total thickness for tubes of Example 40.

| Trial [#] | $N_2$ Saturation [%] | $N_2$ Flow Rate [kg/h] | Inner Layer Thickness [%] | Outer Layer Thickness [mils] [%] |
|---|---|---|---|---|
| 14.A.1 | 0.20 | 0.045 | 11.65 | 16.55 |
| 14.A.2 | 0.22 | 0.0495 | 11.55 | 16.15 |
| 14.A.3 | 0.24 | 0.054 | 11.65 | 16.55 |
| 14.A.4 | 0.26 | 0.0585 | * | * |
| 14.A.5 | 0.28 | 0.0629 | * | * |
| 14.A.6 | 0.30 | 0.069 | * | * |

* Data not available

Example 41

Formulations and Test Results for Tubes with Varying $N_2$ Saturation

Outer-layer formulation 32 comprised about 75% Marlex® HHM 5502BN HDPE (available from Chevron Phillips Chemical Company), about 5% Ampacet 112761 White Polyethylene Masterbatch (available from Ampacet Corporation) as a coloring agent, and about 20% of a reinforcing fiber blend of about 15% Hyperform® HPR-803i (available from Milliken Chemical) and about 85% Braskem F020HC High Crystallinity Polypropylene (available from Braskem). Inner-layer formulation 28 comprised about 100% Marlex® HHM 5502BN HDPE (available from Chevron Phillips Chemical Company).

Core-layer formulation 36 comprised about 99.6% Marlex® HHM 5502BN HDPE (available from Chevron Phillips Chemical Company), which was used as a polyethylene base resin. The polyethylene base resin was blended with about 0.1% HYDROCEROL® CF 40E as a chemical blowing agent and nucleating agent and about 0.3% Heritage Plastics HT6000 LLDPE talc as another nucleating agent. $N_2$ was used as a blowing agent and was injected into the rest of the molten core-layer formulation 36 at a level between about 0.045 kg/h and about 0.070 kg/h, corresponding to between about 0.20% and about 0.30% as shown in Table 42.

The extruder head temperature was about 190° C., and the core layer extruder barrel temperature was about 180° C. The inner and outer layer extruder barrel temperatures were both 190° C. The resulting expanded core-layer formulation 36 was extruded through a die head to establish a core parison. The core layer extruder was operated at 13 RPM. Inner and outer layers were extruded through the die head, locating the expanded formulation therebetween, to form a multi-layer tube. The inner layer extruder was operated at 20 rpm and the outer layer extruded was operated at 34 rpm such that the inner layer provided about 8% of the thickness of the entire tube, the outer layer provided about 14% of the thickness of the entire tube, and the core layer provided about 78% of the thickness of the entire tube. The layer thicknesses for several tubes of flow rate were measured and the mean values of these thicknesses for each tube are described in Table 42 as Inner Layer Thickness and Outer Layer Thickness.

TABLE 42

$N_2$ saturation, $N_2$ flow rate, inner layer thickness, and outer layer thickness, and total thickness for tubes of Example 41.

| Trial [#] | $N_2$ Saturation [%] | $N_2$ Flow Rate [kg/h] | Inner Layer Thickness [%] | Outer Layer Thickness [mils] [%] |
|---|---|---|---|---|
| 14.A.7 | 0.20 | 0.045 | 7.30 | 16.85 |
| 14.A.8 | 0.22 | 0.0495 | 9.05 | 15.15 |
| 14.A.9 | 0.24 | 0.054 | 8.85 | 17.2 |
| 14.A.10 | 0.26 | 0.0585 | 11.8 | 18.9 |
| 14.A.11 | 0.28 | 0.0629 | * | * |
| 14.A.12 | 0.30 | 0.069 | * | * |

* Data not available

Example 42

Formulations and Test Results for Bottles with Varying Process Aid

Outer-layer formulation 32 comprised between about 72% and about 75% of a base resin blend of 50% Marlex® HHM 5502BN HDPE (available from Chevron Phillips Chemical Company) and 50% DOW LLDPE 50041 Polyethylene, Low Density (available from the Dow Chemical Company) about 5% Ampacet 112761 White Polyethylene Masterbatch (available from Ampacet Corporation) as a coloring agent, about 20% of a reinforcing fiber blend of about 15% Hyperform® HPR-803i (available from Milliken Chemical) and about 85% Braskem F020HC High Crystallinity Polypropylene (available from Braskem), and between about 0% and about 3% of an Ampacet 102823 as a process aid. Inner-layer formulation 28 comprised about 100% Marlex® HHM 5502BN HDPE (available from Chevron Phillips Chemical Company). The outer-layer formulation is further described in Table 63.

Core-layer formulation 36 comprised between about 99.6% and about 99.9% Marlex® HHM 5502BN HDPE (available from Chevron Phillips Chemical Company), which was used as a polyethylene base resin. The polyethylene base resin was blended with between about 0.1% and about 0.3% HYDROCEROL® CF 40E as a chemical blowing agent and nucleating agent and between about 0.1% and about 0.3% Heritage Plastics HT6000 LLDPE talc as another nucleating agent. $N_2$ was used as a blowing agent and was injected into the rest of the molten core-layer formulation 36 at a level between about 0.060 kg/h. The core-layer formulation is further described in Table 43.

The extruder head temperature was about 190° C., and the core layer extruder barrel temperature was about 180° C. The inner and outer layer extruder barrel temperatures were both 190° C. The resulting expanded core-layer formulation 36 was extruded through a die head to establish a core parison. The core layer extruder was operated at 13 RPM. Inner and outer layers were extruded through the die head, locating the expanded formulation therebetween, to form a multi-layer tube. The inner layer extruder was operated at 20 rpm and the outer layer extruded was operated at 34 rpm such that the inner layer provided about 8% of the thickness of the entire tube, the outer layer provided about 14% of the thickness of the entire tube, and the core layer provided about 78% of the thickness of the entire tube.

A mold was closed around the tube and a blow needle was inserted into a space formed in the tube. During inserting the needle, the mold was moved away from the die head. Vacuum was applied to the mold and caused the pressure to decrease to $P_{VAC}$, which was about 27 inches Hg. Pressurized air was pumped into a space formed in the tube to cause the tube to expand and take on the shape of the mold. The pressurized air in this example was delivered at about 2.5 bar and at about 2° C. In the next step, the mold was opened to reveal a container, also referred to as a bottle. Cycle time is an amount of time between closing the mold around the tube and opening the mold to reveal a container. The cycle time in this example was about 10 seconds. For each $N_2$ flow rate, the weight of ten bottles was measured. The average of the ten weights for each $N_2$ flow rate is shown as Average Bottle Weight in Table 44. The target bottle weight was 17 g. Also, for each $N_2$ flow rate, density was measured for three bottles according to the procedure of Example 2 and is shown in Table 44 as Bottle Density. The mean of the three densities for each $N_2$ flow rate is shown as Average Bottle Density in Table 44. The target bottle density was 0.6 g/cm³. For each $N_2$ flow rate, the top load capacity of three bottles was measured according to the procedure of Example 7, the mean of the three top load capacities was determined, the rigidity of three other bottles was measured according to the procedure of Example 6, the mean of the three rigidities was determined and the bottom drop test was performed according to the procedure of Example 6 (ten bottles were dropped for each set of parameters). The results are shown below in Table 45 for each $N_2$ flow rate and are labeled as Top Load Capacity, Average Top Load capacity, Rigidity, Average Rigidity, and Bottom Drop Test Pass Rate, respectively. The target top load capacity was greater than 150 N, and the target rigidity was 1.

TABLE 43

Amounts base resin blend, process aid, HDPE, talc, and chemical blowing agent for bottles of Example 42.

| | Outer Layer | | | | |
|---|---|---|---|---|---|
| | Base resin | | Core Layer | | |
| Trial [#] | blend [%] | 102823 [%] | 5502BN [%] | HT6000 [%] | CF 40E [%] |
| 14.B.1 | 75 | 0 | 99.6 | 0.3 | 0.1 |
| 14.B.2 | 75 | 0 | 99.9 | 0 | 0.1 |
| 14.B.3 | 75 | 0 | 99.7 | 0 | 0.3 |
| 14.B.4 | 72 | 3 | 99.6 | 0.3 | 0.1 |
| 14.B.5 | 72 | 3 | 99.9 | 0 | 0.1 |
| 14.B.6 | 72 | 3 | 99.7 | 0 | 0.3 |
| 14.B.7 | 75 | 0 | 99.9 | 0 | 0.1 |

TABLE 44

Average bottle weight, bottle density, and average bottle density for bottles of Example 42.

| Trial [#] | Average Bottle Weight [g] | Bottle density [g/cm³] | Average Bottle density [g/cm³] |
|---|---|---|---|
| 14.B.1a | 17.1 ± 0.3 | 0.672 | 0.68 |
| 14.B.1b | | 0.683 | |
| 14.B.1c | | 0.690 | |
| 14.B.2a | 17.0 ± 0.1 | 0.669 | 0.67 |
| 14.B.2b | | 0.678 | |
| 14.B.2c | | 0.676 | |
| 14.B.3a | 17.1 ± 0.2 | 0.665 | 0.67 |
| 14.B.3b | | 0.675 | |
| 14.B.3c | | 0.669 | |
| 14.B.4a | 17.0 ± 0.4 | 0.670 | 0.67 |
| 14.B.4b | | 0.676 | |
| 14.B.4c | | 0.676 | |
| 14.B.5a | 17.2 ± 0.2 | 0.681 | 0.68 |
| 14.B.5b | | 0.670 | |
| 14.B.5c | | 0.674 | |
| 14.B.6a | 17.0 ± 0.2 | 0.672 | 0.67 |
| 14.B.6b | | 0.665 | |
| 14.B.6c | | 0.667 | |
| 14.B.7a | 17.1 ± 0.2 | 0.657 | 0.65 |
| 14.B.7b | | 0.655 | |
| 14.B.7c | | 0.648 | |

TABLE 45

Top load capacity, average top load capacity, rigidity, average rigidity, and bottom drop test pass rate for bottles of Example 42.

| Trial [#] | Top Load Capacity [lb] | Average Top Load Capacity [N] | Rigidity [kgF] | Average Rigidity [kgF] | Bottom Drop Test Pass Rate [%] |
|---|---|---|---|---|---|
| 14.B.1a | 45.82 | 201.5 | 1.1 | 1.13 | 100 |
| 14.B.1b | 45.67 | | 1.12 | | |
| 14.B.1c | 44.4 | | 1.17 | | |
| 14.B.2a | 41.61 | 194.2 | 1.36 | 1.25 | 100 |
| 14.B.2b | 44.81 | | 1.12 | | |
| 14.B.2c | 44.57 | | 1.26 | | |
| 14.B.3a | 43.95 | 197.0 | 1.29 | 1.21 | 100 |
| 14.B.3b | 44.68 | | 1.07 | | |
| 14.B.3c | 44.23 | | 1.26 | | |
| 14.B.4a | 43.83 | 192.5 | 1.22 | 1.22 | 100 |
| 14.B.4b | 43.42 | | 1.2 | | |
| 14.B.4c | 42.58 | | 1.24 | | |
| 14.B.5a | 43.23 | 194.8 | 1.26 | 1.22 | 100 |
| 14.B.5b | 43.45 | | 1.16 | | |
| 14.B.5c | 44.72 | | 1.24 | | |
| 14.B.6a | 42.79 | 195.8 | 1.20 | 1.17 | 100 |
| 14.B.6b | 44.49 | | 1.13 | | |
| 14.B.6c | 44.75 | | 1.18 | | |
| 14.B.7a | 37.52 | 170.5 | 1.08 | 1.11 | 100 |
| 14.B.7b | 38.64 | | 1.09 | | |
| 14.B.7c | 38.86 | | 1.15 | | |

Example 43

Formulation and Test Results for Bottles with 50% Regrind

Outer-layer formulation 32 comprised about 75% Marlex® HHM 5502BN HDPE (available from Chevron Phillips Chemical Company), about 5% Ampacet 112761 White Polyethylene Masterbatch (available from Ampacet Corporation) as a coloring agent, and about 20% of a reinforcing fiber blend of about 15% Hyperform® HPR-803i (available from Milliken Chemical) and about 85% Braskem F020HC High Crystallinity Polypropylene (available from Braskem). Inner-layer formulation 28 comprised about 100% Marlex® HHM 5502BN HDPE (available from Chevron Phillips Chemical Company).

Core-layer formulation 36 comprised about 50% first-pass regrind material and about 50% of a formulation comprising about 99.6% Marlex® HHM 5502BN HDPE (available from Chevron Phillips Chemical Company), which was used as a polyethylene base resin, blended with about 0.1% HYDROCEROL® CF 40E as a chemical blowing agent and nucleating agent, and about 0.3% Heritage Plastics HT6000 LLDPE talc as another nucleating agent. $N_2$ was used as a blowing agent and was injected into the rest of the molten core-layer formulation 36 at a level between that led to 0.22% $N_2$ saturation.

The extruder head temperature was about 190° C., and the core layer extruder barrel temperature was about 180° C. The inner and outer layer extruder barrel temperatures were both 190° C. The resulting expanded core-layer formulation 36 was extruded through a die head to establish a core parison. Inner and outer layers were extruded through the die head, locating the expanded formulation therebetween, to form a multi-layer tube. The layers were extruded such that the inner layer provided about 11% of the thickness of the entire tube, the outer layer provided about 14% of the thickness of the entire tube, and the core layer provided about 75% of the thickness of the entire tube. A mold was closed around the tube and a blow needle was inserted into a space formed in the tube. During inserting the needle, the mold was moved away from the die head. Vacuum was applied to the mold and caused the pressure to decrease to $P_{VAC}$, which was about 27 inches Hg. Pressurized air was pumped into a space formed in the tube to cause the tube to expand and take on the shape of the mold. The pressurized air in this example was delivered at about 2.5 bar and at about 2° C. In the next step, the mold was opened to reveal a container, also referred to as a bottle. Cycle time is an amount of time between closing the mold around the tube and opening the mold to reveal a container. The cycle time in this example was about 10 seconds. The weights of three bottles were measured to be 17.25 g, 17.16 g, and 17.39 g leading to an average weight of 17.3 g. The target bottle weight was 17 g. Also, density was measured for three bottles according to the procedure of Example 2 to be 0.689 g/cm³, 0.676 g/cm³, and 0.680 g/cm³ leading to an average density of 0.682 g/cm³. The target bottle density was 0.6 g/cm³. The top load capacity of three bottles was measured according to the procedure of Example 7 to be 50.4 lbs-F, 49.1 lbs-F, and 47.9 lbs-F leading to an average top load capacity of 218.5 N. The bottom drop test was performed according to the procedure of Example 6 (ten bottles were dropped for each set of parameters) as all bottles passed the drop test.

Example 44

Formulation and Test Results for Bottles Various Amounts of Fiber

Outer-layer formulation 32 comprised about 87% to about 92% Marlex® HHM 5502BN HDPE (available from Chevron Phillips Chemical Company), about 5% Ampacet 112761 White Polyethylene Masterbatch (available from Ampacet Corporation) as a coloring agent, and about 3% to about 8% Hyperform® HPR-803i (available from Milliken Chemical) as shown in Table 66. Inner-layer formulation 28 comprised about 100% Marlex® HHM 5502BN HDPE (available from Chevron Phillips Chemical Company).

Core-layer formulation 36 comprised about 99.6% Marlex® HHM 5502BN HDPE (available from Chevron Phillips Chemical Company), which was used as a polyethylene base resin. The polyethylene base resin was blended with about 0.1% HYDROCEROL® CF 40E as a chemical blowing agent and nucleating agent and between about 0.3% Heritage Plastics HT6000 LLDPE talc as another nucleating agent. $N_2$ was used as a blowing agent and was injected into the rest of the molten core-layer formulation 36 at a level between that led to about 0.22% $N_2$ saturation.

The extruder head temperature was about 190° C., and the core layer extruder barrel temperature was about 180° C. The inner and outer layer extruder barrel temperatures were both 190° C. The resulting expanded core-layer formulation 36 was extruded through a die head to establish a core parison. Inner and outer layers were extruded through the die head, locating the expanded formulation therebetween, to form a multi-layer tube. The layers were extruded such that the inner layer provided about 11% of the thickness of the entire tube, the outer layer provided about 14% of the thickness of the entire tube, and the core layer provided about 75% of the thickness of the entire tube.

A mold was closed around the tube and a blow needle was inserted into a space formed in the tube. During inserting the needle, the mold was moved away from the die head. Vacuum was applied to the mold and caused the pressure to decrease to $P_{VAC}$, which was about 27 inches Hg. Pressurized air was pumped into a space formed in the tube to cause the tube to expand and take on the shape of the mold. The pressurized air in this example was delivered at about 2.5 bar and at about 2° C. In the next step, the mold was opened to reveal a container, also referred to as a bottle. Cycle time is an amount of time between closing the mold around the tube and opening the mold to reveal a container. The cycle time in this example was about 10 seconds. For formulation, the weight of three bottles was measured and is shown in Table 46 as Bottle Weight. The target bottle weight was 17 g. Also, for each formulation, density was measured for three bottles according to the procedure of Example 2 and is shown in Table 66 as Bottle density. The target bottle density was 0.6 g/cm³. For each formulation, the top load capacity of three bottles was measured according to the procedure of Example 7 and is shown in Table 46 as Top Load Capacity. The target top load capacity was greater than 150 N, and the target rigidity was 1.

TABLE 46

Amount of fiber formulation, bottle weight, bottle density, and top load capacity for bottles of Example 44.

| Trial [#] | HPR-803i [%] | Bottle Weight [g] | Bottle density [g/cm³] | Top Load Capacity [N] |
|---|---|---|---|---|
| 15.B.1a | 7.5 | 17.1 | 0.679 | 221.30 |
| 15.B.1b |  | 17.1 | 0.681 | 222.23 |
| 15.B.1c |  | 17.3 | 0.674 | 222.99 |
| 15.B.2a | 5 | 16.7 | 0.667 | 209.24 |
| 15.B.2b |  | 16.9 | 0.664 | 196.03 |
| 15.B.2c |  | 16.7 | 0.671 | 215.47 |
| 15.B.3a | 3 | 17.2 | 0.693 | 208.62 |
| 15.B.3b |  | 17.0 | 0.680 | 204.62 |
| 15.B.3c |  | 17.2 | 0.688 | 204.80 |

Example 45

Formulations and Test Results for Bottles with Various Amounts of Regrind

Outer-layer formulation 32 comprised about 75% Marlex® HHM 5502BN HDPE (available from Chevron Phillips Chemical Company), about 12.5% Braskem Polypropylene Inspire 6025N (available from Braskem), about 5% Ampacet 112761 White Polyethylene Masterbatch (available from Ampacet Corporation) as a coloring agent, and about 7.5% Hyperform® HPR-803i (available from Milliken Chemical). Inner-layer formulation 28 comprised about 100% Marlex® HHM 5502BN HDPE (available from Chevron Phillips Chemical Company).

Core-layer formulation 36 comprised between about 0% and about 50% first-pass regrind material, as shown in Table 47, and between about 100% and about 50% of a formulation comprising about 99.6% Marlex® HHM 5502BN HDPE (available from Chevron Phillips Chemical Company), which was used as a polyethylene base resin, blended with about 0.1% HYDROCEROL® CF 40E as a chemical blowing agent and nucleating agent, and about 0.3% Heritage Plastics HT6000 LLDPE talc as another nucleating agent. $N_2$ was used as a blowing agent and was injected into the rest of the molten core-layer formulation 36 at a level between that led to 0.22% $N_2$ saturation.

The extruder head temperature was about 190° C., and the core layer extruder barrel temperature was about 180° C. The inner and outer layer extruder barrel temperatures were both 190° C. The resulting expanded core-layer formulation 36 was extruded through a die head to establish a core parison. Inner and outer layers were extruded through the die head, locating the expanded formulation therebetween, to form a multi-layer tube. The layers were extruded such that the inner layer provided about 11% of the thickness of the entire tube, the outer layer provided about 14% of the thickness of the entire tube, and the core layer provided about 75% of the thickness of the entire tube.

A mold was closed around the tube and a blow needle was inserted into a space formed in the tube. During inserting the needle, the mold was moved away from the die head. Vacuum was applied to the mold and caused the pressure to decrease to $P_{VAC}$, which was about 27 inches Hg. Pressurized air was pumped into a space formed in the tube to cause the tube to expand and take on the shape of the mold. The pressurized air in this example was delivered at about 2.5 bar and at about 2° C. In the next step, the mold was opened to reveal a container, also referred to as a bottle. Cycle time is an amount of time between closing the mold around the tube and opening the mold to reveal a container. The cycle time in this example was about 10 seconds. For each formulation, the weights of several bottles were measured. The average of the weights for each $N_2$ flow rate is shown as Average Bottle Weight in Table 47. The target bottle weight was 17 g. Also, for each formulation, density was measured for several bottles according to the procedure of Example 2. The mean of the densities for each formulation is shown as Average Bottle Density in Table 47. The target bottle density was 0.6 g/cm³. For each formulation, the top load capacity of three bottles was measured according to the procedure of Example 7, the mean of the three top load capacities was determined, the rigidity of three other bottles was measured according to the procedure of Example 6, the mean of the three rigidities was determined, and the bottom drop test was performed according to the procedure of Example 6 (ten bottles were dropped for each set of parameters). The results are shown below in Table 48 for each formulation and are labeled as Top Load Capacity, Average Top Load Capacity, Rigidity, Average rigidity, and Bottom Drop Test Pass Rate, respectively. The target top load capacity was greater than 150 N, and the target rigidity was 1.

TABLE 47

Amount of regrind, average bottle weight, bottle density, and average bottle density for bottles of Example 45.

| Trial [#] | Regrind [%] | Average Bottle Weight [g] | Average Bottle Density [g/cm³] |
|---|---|---|---|
| 16.A.1 | 0 | 17.3 ± 4 | 0.685 ± 0.008 |
| 16.B.1 | 25 | 17.2 ± 2 | 0.690 ± 0.004 |
| 16.B.2 | 50 | 17.4 ± 2 | 0.670 ± 0.015 |

TABLE 48

Top load capacity, average top load capacity, rigidity, average rigidity, and bottom drop test pass rate for bottles of Example 45.

| Trial [#] | Top Load Capacity [N] | Average Top Load Capacity [N] | Rigidity [kgF] | Average Rigidity [kgF] | Bottom Drop Test Pass Rate [%] |
|---|---|---|---|---|---|
| 16.A.1a | 208.977 | 215.83 | 2.76 | 215.83 | 100 |
| 16.A.1b | 218.407 | | 1.942 | | |
| 16.A.1c | 220.097 | | 2.928 | | |
| 16.B.1a | 217.740 | 215.78 | 3.386 | 215.78 | 100 |
| 16.B.1b | 217.740 | | 3.334 | | |
| 16.B.1c | 211.869 | | 2.744 | | |
| 16.B.2a | 220.142 | 217.55 | 2.252 | 217.55 | 100 |
| 16.B.2b | 216.450 | | 2.354 | | |
| 16.B.2c | 216.050 | | 2.366 | | |

Example 46

Formulations and Test Results for Bottles with Various Amounts of Regrind

Outer-layer formulation 32 comprised about 75% Marlex® HHM 5502BN HDPE (available from Chevron Phillips Chemical Company), about 12.5% Braskem Polypropylene Inspire 6025N (available from Braskem), about 5% Ampacet 112761 White Polyethylene Masterbatch (available from Ampacet Corporation) as a coloring agent, and about 7.5% Hyperform® HPR-803i (available from Milliken Chemical). Inner-layer formulation 28 comprised about 100% Marlex® HHM 5502BN HDPE (available from Chevron Phillips Chemical Company).

Core-layer formulation 36 comprised between about 0% and about 50% regrind material, as shown in Table 49, and between about 100% and about 50% of a formulation comprising about 99.6% Marlex® HHM 5502BN HDPE (available from Chevron Phillips Chemical Company), which was used as a polyethylene base resin, blended with about 0.1% HYDROCEROL® CF 40E as a chemical blowing agent and nucleating agent, and about 0.3% Heritage Plastics HT6000 LLDPE talc as another nucleating agent. Several stages of bottles production were performed using different amounts of multiple-pass regrind, as shown in Table 49. First pass regrind was obtained from bottles made of virgin material (stage 0), second pass regrind was obtained from bottles made of material from stage 1, third pass regrind was obtained from bottles made of material from stage 2, fourth pass regrind was obtained from bottles made of material from stage 3, fifth pass regrind was obtained from bottles made of material from stage 4, and sixth pass regrind was obtained from bottles made of material from stage 5. $N_2$ was used as a blowing agent and was injected into the rest of the molten core-layer formulation 36 at a level between that led to 0.22% $N_2$ saturation.

The extruder head temperature was about 190° C., and the core layer extruder barrel temperature was about 180° C. The inner and outer layer extruder barrel temperatures were both 190° C. The resulting expanded core-layer formulation 36 was extruded through a die head to establish a core parison. Inner and outer layers were extruded through the die head, locating the expanded formulation therebetween, to form a multi-layer tube. The layers were extruded such that the inner layer provided about 14% of the thickness of the entire tube, the outer layer provided about 14% of the thickness of the entire tube, and the core layer provided about 72% of the thickness of the entire tube.

A mold was closed around the tube and a blow needle was inserted into a space formed in the tube. During inserting the needle, the mold was moved away from the die head. Vacuum was applied to the mold and caused the pressure to decrease to $P_{VAC}$, which was about 27 inches Hg. Pressurized air was pumped into a space formed in the tube to cause the tube to expand and take on the shape of the mold. The pressurized air in this example was delivered at about 2.5 bar and at about 2° C. In the next step, the mold was opened to reveal a container, also referred to as a bottle. Cycle time is an amount of time between closing the mold around the tube and opening the mold to reveal a container. The cycle time in this example was about 10 seconds.

TABLE 49

Pass level of regrind material used in different stages of production of bottles of Example 46.

| | Regrind Stage | | | | | | |
|---|---|---|---|---|---|---|---|
| | Stage 0 | Stage 1 | Stage 2 | Stage 3 | Stage 4 | Stage 5 | Stage 6 |
| Virgin | 100.00% | 50.00% | 50.00% | 50.00% | 50.00% | 50.00% | 50.00% |
| 1st Pass | | 50.00% | 25.00% | 25.00% | 25.00% | 25.00% | 25.00% |
| 2nd Pass | | | 25.00% | 12.50% | 12.50% | 12.50% | 12.50% |
| 3rd Pass | | | | 12.50% | 6.25% | 6.25% | 6.25% |
| 4th Pass | | | | | 6.25% | 3.13% | 3.13% |
| 5th Pass | | | | | | 3.13% | 1.56% |
| 6th Pass | | | | | | | 1.56% |

The bottles formed in stages 0-6, as shown in Table 49, were subjected to Differential Scanning calorimetry (DSC), Fourier Transmission Near Infrared (FTIR), and Melt Flow Index.

DSC results are shown in FIGS. 14-22 and Tables 50-51. DSC was performed using Netzsch Instruments DSC 204 F1 Phoenix. 4 mm round samples were punched from a standard die or pellets were cut to fit in sample pans. Both were weighed to 0.001 mg. Samples were placed in aluminum DSC sample pans and lidded. The DSC cycle was as follows:

1. Preparation: Cool to −100° C.,
2. First Heat: Heat to 250° C.,
3. Cooling: Cool to −100° C.,
4. Second Heat: Heat to 250° C.

All heating and cooling cycles performed at a rate of 10° C./min in an inert atmosphere of $N_2$. The resulting data was analyzed using Proteus 61 software from Netzsch Instruments. All iterations, regrind and bottles, showed 2 melting peaks on first heat: Between 133° C. and 140° C., indicating HDPE and between 165° C. and 166° C., indicating PP. All iterations, regrind and bottles, showed 3 crystallization peaks: Between 79° C. and 82° C., indicating HDPE, between 112° C. and 115° C., indicating HDPE, between 128° C. and 130° C., indicating nucleated PP. All iterations, regrind and bottles, showed 2 melting peaks on second heat: Between 134° C. and 137° C., indicating HDPE and between 165° C. and 168° C., indicating PP. Crystallinities varied by iteration and stage, ranging from 202 J/g in the Lab Line sample to 136 J/g in T 1D samples.

TABLE 50

DSC results for the bottles from Example 46.

| | | First Heat | | | Cooling | | | | Second Heat | | |
|---|---|---|---|---|---|---|---|---|---|---|---|
| | | Peak Melt (HDPE) (° C.) | Crystal-linity (J/g) | Other Melt (PP) (° C.) | Crystal-lization (HDPE) (° C.) | Crystal-linity (J/g) | Crystal-lization (° C.) | Crystal-lization (PP) (° C.) | Peak Melt (HDPE) (° C.) | Crystal-linity (J/g) | Other Melt (PP) (° C.) |
| Sample | | | | | | | | | | | |
| T1A | #1 | 133.1 | 162.3 | 164.7 | 114.4 | 189.3 | 81.1 | 130.3 | 133.9 | 184.1 | 165.2 |
| | #2 | 134.4 | 148.8 | 166.4 | 113.4 | 180.9 | 81.9 | 129.1 | 135.1 | 176.2 | 167.7 |
| | #3 | 134.5 | 155.1 | 166.2 | 113.9 | 181.2 | 80.2 | 129.0 | 135.1 | 178.5 | 166.4 |
| | Ave | 134.0 | 155.4 | 165.8 | 113.9 | 183.8 | 81.1 | 129.5 | 134.7 | 179.6 | 166.4 |
| | Range | 1.4 | 13.5 | 1.7 | 1.0 | 8.4 | 1.7 | 1.3 | 1.2 | 7.9 | 2.5 |
| T1B | #1 | NA | NA | NA | NA | NA | NA | NA | NA | NA | NA |
| | #2 | 134.8 | 147.3 | 165.2 | 114.1 | 167.6 | 81.30 | 129.5 | 135.0 | 166.1 | 165.4 |
| | #3 | 133.7 | 149.5 | 166.4 | 113.4 | 181.1 | 82.4 | 128.5 | 134.9 | 182.7 | 166.5 |
| | Ave | 134.3 | 148.4 | 165.8 | 113.8 | 174.4 | 81.9 | 129.0 | 135.0 | 174.4 | 166.0 |
| | Range | 1.1 | 2 2 | 1.2 | 0.7 | 13.5 | 1.1 | 1.0 | 0.1 | 16.6 | 1.1 |
| T1C | #1 | NA | NA | NA | NA | NA | NA | NA | NA | NA | NA |
| | #2 | 134.4 | 153.3 | 166.2 | 113.7 | 183.9 | 82.1 | 128.8 | 135.4 | 178.8 | 166.2 |
| | #3 | 133.8 | 154.2 | 165.8 | 114.4 | 179.6 | 80.7 | 129.1 | 134.7 | 179.2 | 166.1 |
| | Ave | 134.1 | 153.8 | 166.0 | 114.1 | 181.8 | 81.4 | 129.0 | 135.1 | 179.0 | 166.2 |
| | Range | 0.6 | 0.9 | 0.4 | 0.7 | 4.3 | 1.4 | 0.3 | 0.7 | 0.4 | 0.1 |
| T1D | #1 | 135.2 | 146.1 | 165.6 | 114.0 | 165.3 | 82.4 | 129.7 | 134.5 | 158.3 | 165.0 |
| | #2 | 134.7 | 143.8 | 165.7 | 112.9 | 167.6 | 81.6 | 129.9 | 136.4 | 159.8 | 165.6 |
| | #3 | 133.9 | 136.6 | 166.3 | 113.2 | 173.4 | 80.6 | 128.5 | 134.8 | 167.9 | 166.4 |
| | Ave | 134.6 | 142.2 | 165.9 | 113.4 | 168.8 | 81.5 | 129.4 | 135.2 | 162.0 | 165.7 |
| | Range | 1.3 | 9.5 | 0.7 | 1.1 | 8.1 | 1.8 | 1.4 | 1.9 | 9.6 | 1.4 |
| Lab Line | #1 | NA | NA | NA | NA | NA | NA | NA | NA | NA | NA |
| | #2 | 133.0 | 158.0 | NA | 113.6 | 182.4 | 81.8 | NA | 135.5 | 191.4 | NA |
| | #3 | 133.9 | 161.5 | NA | 113.1 | 202.4 | 80.3 | NA | 135.5 | 193.2 | NA |
| | Ave | 133.5 | 159.8 | NA | 113.4 | 192.4 | 81.1 | NA | 135.5 | 192.3 | NA |
| | Range | 0.9 | 3.5 | NA | 0.5 | 20.0 | 1.5 | NA | 0.0 | 1.8 | NA |

TABLE 51

DSC results for the bottles from Example 46.

| | | First Heat | | | Cooling | | | | Second Heat | | |
|---|---|---|---|---|---|---|---|---|---|---|---|
| | | Peak Melt (HDPE) (° C.) | Crystal-linity (J/g) | Other Melt (PP) (° C.) | Crystal-lization (HDPE) (° C.) | Crystal-linity (J/g) | Crystal-lization (° C.) | Crystal-lization (PP) (° C.) | Peak Melt (HDPE) (° C.) | Crystal-linity (J/g) | Other Melt (PP) (° C.) |
| Sample | | | | | | | | | | | |
| Stage 0 Rg | #1 | 135.3 | 168.7 | 165.8 | 114.8 | 169.6 | 80.5 | 129.9 | 134.1 | 165.8 | 165.6 |
| | #2 | 138.1 | 187.3 | 165.1 | 112.8 | 179.4 | 79.2 | 129.1 | 135.9 | 181.9 | 165.7 |
| | #3 | 138.4 | 185.8 | 165.4 | 112.6 | 183.2 | 80.0 | 128.7 | 136.5 | 181.9 | 165.8 |
| | Ave | 137.3 | 180.6 | 165.4 | 113.4 | 177.4 | 79.9 | 129.2 | 135.5 | 176.5 | 165.7 |
| | Range | 3.1 | 18.6 | 0.7 | 2.2 | 13.6 | 1.3 | 1.2 | 2.4 | 16.1 | 0.2 |
| Stage 1 Rg | #1 | 132.9 | 149.8 | 166.2 | 115.2 | 169.4 | 81.6 | 129.7 | 134.1 | 170.2 | 165.0 |
| | #2 | 137.8 | 160.7 | 165.7 | 114.0 | 173.2 | 80.1 | 129.9 | 135.2 | 168.6 | 165.8 |
| | #3 | 139.7 | 168.2 | 165.7 | 112.3 | 174.4 | 80.4 | 127.7 | 135.9 | 174.1 | 165.1 |
| | Ave | 136.8 | 159.6 | 165.9 | 113.8 | 172.3 | 80.7 | 129.1 | 135.1 | 171.0 | 165.3 |
| | Range | 6.8 | 18.4 | 0.5 | 2.9 | 5.0 | 1.5 | 2.2 | 1.8 | 5.5 | 0.8 |

TABLE 51-continued

DSC results for the bottles from Example 46.

| | | First Heat | | | Cooling | | | | Second Heat | | |
| | | Peak Melt (HDPE) (° C.) | Crystal-linity (J/g) | Other Melt (PP) (° C.) | Crystal-lization (HDPE) (° C.) | Crystal-linity (J/g) | Crystal-lization (° C.) | Crystal-lization (PP) (° C.) | Peak Melt (HDPE) (° C.) | Crystal-linity (J/g) | Other Melt (PP) (° C.) |
| Sample | | | | | | | | | | | |
| --- | --- | --- | --- | --- | --- | --- | --- | --- | --- | --- | --- |
| Stage 2 Rg | #1 | 136.5 | 154.9 | 165.8 | 114.8 | 143.4 | NA | 129.5 | 134.5 | 159.1 | 166.0 |
| | #2 | 135.2 | 143.5 | 165.6 | 114.5 | 164.3 | 80.5 | 129.3 | 134.2 | 163.8 | 165.6 |
| | #3 | 133.4 | 144.0 | 165.2 | 114.8 | 175.9 | 81.4 | 129.2 | 134.1 | 175.4 | 165.8 |
| | Ave | 135.0 | 147.5 | 165.5 | 114.7 | 161.2 | 81.0 | 129.3 | 134.3 | 166.1 | 165.8 |
| | Range | 3.1 | 11.4 | 0.6 | 0.3 | 32.5 | 0.9 | 0.3 | 0.4 | 16.3 | 0.4 |
| Stage 3 Rg | #1 | 133.0 | 140.1 | 165.8 | 114.8 | 168.3 | 81.9 | 128.6 | 133.9 | 161.8 | 165.7 |
| | #2 | 133.2 | 146.8 | 165.8 | 114.4 | 161.0 | 81.6 | 129.8 | 134.9 | 159.6 | 165.5 |
| | #3 | NA | NA | NA | NA | NA | NA | NA | NA | NA | NA |
| | Ave | 133.1 | 143.5 | 165.8 | 114.6 | 164.7 | 81.8 | 129.2 | 134.4 | 160.7 | 165.6 |
| | Range | 0.2 | 6.7 | 0.0 | 0.4 | 7.3 | 0.3 | 1.2 | 1.0 | 2.2 | 0.2 |

FTIR was performed using PerkinElmer spectrometer using ATR (attenuated total reflectance) method. FTIR results are shown in FIGS. 23-25. Samples were compressed on a diamond crystal to ensure proper contact. The Scanning Program Resolution was 16 scans at 2 μm with a range of 4,000 to 650 cm$^{-1}$. The resulting spectra were analyzed Spectrum software from PerkinElmer. All samples tested matched with 99.9% correlation for HDPE. Qualitative differences were observed at 1742 cm$^{-1}$, 1641 cm$^{-1}$, and 1593 cm$^{-1}$, which are usually indicative of the presence of anti-stat and slip agents, indicating that the concentration of these additives is increasing in each stage.

The melt flow was determined for each regrind stage and results are as follows: Stage 0=0.32 g/10 min, Stage 1=0.42 g/10 min, Stage 2=0.43 g/10 min, Stage 3=0.42 g/10 min. The increase from Stage 0 to Stage 1 was 30% and there were no increases after Stage 1, indicating that degradation was not occurring.

Top load testing was performed per standard procedures and no trends were apparent. Based on the results of top load testing, there is no correlation between top load performance and regrind stage used.

Example 47

Formulations and Test Results for Bottles with Different Parison Profiles

Outer-layer formulation 32 comprised about 75% Marlex® HHM 5502BN HDPE (available from Chevron Phillips Chemical Company), about 12.5% Braskem Polypropylene Inspire 6025N (available from Braskem), about 5% Ampacet 112761 White Polyethylene Masterbatch (available from Ampacet Corporation) as a coloring agent, and about 7.5% Hyperform® HPR-803i (available from Milliken Chemical). Inner-layer formulation 28 comprised about 100% Marlex® HHM 5502BN HDPE (available from Chevron Phillips Chemical Company).

Core-layer formulation 36 comprised about 99.6% Marlex® HHM 5502BN HDPE (available from Chevron Phillips Chemical Company), which was used as a polyethylene base resin, blended with about 0.1% HYDROCEROL® CF 40E as a chemical blowing agent and nucleating agent, and about 0.3% Heritage Plastics HT6000 LLDPE talc as another nucleating agent. $N_2$ was used as a blowing agent and was injected into the rest of the molten core-layer formulation 36 at a level between that led to 0.22% $N_2$ saturation.

The extruder head temperature was about 190° C., and the core layer extruder barrel temperature was about 180° C. The inner and outer layer extruder barrel temperatures were both 190° C. The resulting expanded core-layer formulation 36 was extruded through a die head to establish a core parison. Inner and outer layers were extruded through the die head, locating the expanded formulation therebetween, to form a multi-layer tube. The layers were extruded such that the inner layer provided about 11% of the thickness of the entire tube, the outer layer provided about 14% of the thickness of the entire tube, and the core layer provided about 75% of the thickness of the entire tube.

Two tube profiles, C1 and C2, were formed using parison profiles shown in FIGS. 6 and 7, respectively. Various parison thicknesses were created according to methods known in the art. The die was raised and lowered while the pin stayed stationary. Additional material was added to the bottom base and the neck of the bottle compared to other parts of the bottle.

A mold was closed around the tube and a blow needle was inserted into a space formed in the tube. During inserting the needle, the mold was moved away from the die head. Vacuum was applied to the mold and caused the pressure to decrease to $P_{VAC}$, which was about 27 inches Hg. Pressurized air was pumped into a space formed in the tube to cause the tube to expand and take on the shape of the mold. The pressurized air in this example was delivered at about 2.5 bar and at about 2° C. In the next step, the mold was opened to reveal a container, also referred to as a bottle. Cycle time is an amount of time between closing the mold around the tube and opening the mold to reveal a container. The cycle time in this example was about 10 seconds.

Thickness was measured at several locations on six bottles of each of parison profiles C1 and C2. Measurements for C1 and C2 are shown in Table 50 and 51. Minimum wall bottom thickness was measured at the center of the bottom panel using the main function on a Magna-Mike and is shown in Tables 52-53 as Min Wall Bottom. The minimum wall bottom heel thickness was measured at the transition corner where the bottom turns into the side and measure at the crown side and is shown in Tables 52-53 as Min Wall Bottom Heel. The sidewalls were measured for thickness at three different heights along the bottles. As shown in Tables 52-53, measurements labeled Bottom Sidewall were measured at 5 mm from the base, measurements labeled Mid Sidewall were measured 90.25 mm from the base, and measurements labeled Upper Sidewall were measured at 158 mm from the base. Four measurements were taken in four different spots at 90 degrees from each around the perimeter of the bottle sidewall for each height, as indicated by columns labeled A, B, C, and D as shown in Tables 52-53. A was measured at the crown side, B was measured 90 degrees clockwise from A, C was measured 90 degrees clockwise from B, and D was measured 90 degrees clockwise from C.

For each profile, the weights of six bottles were measured and are shown in Tables 52-53 as Bottle Weight. The target bottle weight was 17 g. Also, for each profile, density was measured for six bottles according to the procedure of Example 2 and is shown in Tables 52-53 as Bottle Density. The target bottle density was 0.6 g/cm$^3$. For each profile, the top load capacities of six bottles were measured according to the procedure of Example 7, and are labeled in Tables 52-53 as Top Load Capacity.

A square of the sample to be subjected to the parison cell counting method is cut out from the center of the parison. The excised square of the parison is then divided by cutting across the diagonal exposing the underlying cell structure. The cells are then visualized and counted using microscopy.

Example 49

Formulations and Test Results for Containers with Varying LDPE

Outer-layer formulation 32 comprised about 95% Dow DMDA 6400 NT7 and about 5% Ampacet 11078 as a white colorant. Inner-layer formulation 28 comprised about 100% Marlex® HHM 5502BN HDPE (available from Chevron Phillips Chemical Company). In some examples, outer-layer formulation 44 includes 2.5%

Core-layer formulation 36 comprised a percentage of DOW DMDA 6400 NT7 as shown in Tables 54-56, a

TABLE 52

Profile setting, minimum wall bottom thickness, minimum wall bottom heel thickness, and sidewall thicknesses of bottles of Example 47.

| Trial [#] | Profile | Min Wall Bottom [in] | Min Wall Bottom Heel [in] | Bottom Sidewall [in] | | | | Mid Sidewall [in] | | | | Top Sidewall [in] | | | |
|---|---|---|---|---|---|---|---|---|---|---|---|---|---|---|---|
| | | | | a | b | c | d | a | b | c | d | a | b | c | d |
| 18.C1a | C1 | 0.020 | 0.012 | 0.030 | 0.033 | 0.025 | 0.031 | 0.031 | 0.034 | 0.026 | 0.028 | 0.030 | 0.037 | 0.030 | 0.028 |
| 18.C1b | C1 | 0.018 | 0.015 | 0.024 | 0.037 | 0.024 | 0.032 | 0.030 | 0.033 | 0.024 | 0.030 | 0.029 | 0.032 | 0.035 | 0.029 |
| 18.C1c | C1 | 0.018 | 0.014 | 0.028 | 0.034 | 0.031 | 0.036 | 0.033 | 0.036 | 0.022 | 0.032 | 0.031 | 0.033 | 0.039 | 0.029 |
| 18.C1d | C1 | 0.020 | 0.014 | 0.029 | 0.031 | 0.031 | 0.036 | 0.033 | 0.035 | 0.025 | 0.029 | 0.031 | 0.032 | 0.036 | 0.029 |
| 18.C1e | C1 | 0.019 | 0.014 | 0.025 | 0.037 | 0.030 | 0.029 | 0.022 | 0.034 | 0.033 | 0.032 | 0.031 | 0.033 | 0.038 | 0.028 |
| 18.C1f | C1 | 0.017 | 0.015 | 0.032 | 0.036 | 0.030 | 0.036 | 0.031 | 0.030 | 0.026 | 0.037 | 0.034 | 0.033 | 0.031 | 0.031 |
| 18.C2a | C2 | 0.020 | 0.017 | 0.024 | 0.038 | 0.029 | 0.032 | 0.022 | 0.033 | 0.032 | 0.029 | 0.031 | 0.032 | 0.034 | 0.029 |
| 18.C2b | C2 | 0.023 | 0.017 | 0.028 | 0.038 | 0.027 | 0.032 | 0.023 | 0.034 | 0.033 | 0.032 | 0.031 | 0.035 | 0.028 | 0.036 |
| 18.C2c | C2 | 0.023 | 0.014 | 0.026 | 0.034 | 0.030 | 0.037 | 0.024 | 0.034 | 0.030 | 0.035 | 0.031 | 0.031 | 0.029 | 0.036 |
| 18.C2d | C2 | 0.021 | 0.017 | 0.035 | 0.037 | 0.035 | 0.029 | 0.034 | 0.024 | 0.034 | 0.032 | 0.032 | 0.030 | 0.028 | 0.036 |
| 18.C2e | C2 | 0.022 | 0.016 | 0.025 | 0.034 | 0.030 | 0.037 | 0.027 | 0.031 | 0.035 | 0.025 | 0.034 | 0.031 | 0.033 | 0.031 |
| 18.C2f | C2 | 0.022 | 0.014 | 0.028 | 0.034 | 0.034 | 0.032 | 0.033 | 0.023 | 0.029 | 0.031 | 0.031 | 0.030 | 0.030 | 0.034 |

TABLE 53

Bottle weight, bottle density, and top load capacity of bottles of Example 47.

| Trial [#] | Profile | Bottle Weight [g] | Bottle Density [g] | Top Load Capacity [N] |
|---|---|---|---|---|
| 18.C1a | C1 | 17.30 | 0.72 | 277.1 |
| 18.C1b | C1 | 17.00 | 0.75 | 277.4 |
| 18.C1c | C1 | 17.27 | 0.74 | 277.9 |
| 18.C1d | C1 | 17.08 | 0.73 | 277.1 |
| 18.C1e | C1 | 17.23 | 0.73 | 277.5 |
| 18.C1f | C1 | 16.99 | 0.71 | 277.1 |
| 18.C2a | C2 | 17.30 | 0.72 | 277.1 |
| 18.C2b | C2 | 17.00 | 0.75 | 277.4 |
| 18.C2c | C2 | 17.27 | 0.74 | 277.9 |
| 18.C2d | C2 | 17.08 | 0.73 | 277.1 |
| 18.C2e | C2 | 17.23 | 0.73 | 277.5 |
| 18.C2f | C2 | 16.99 | 0.71 | 277.1 |

Example 48

Parison Cell Counting Method
General Procedure

Parison cell counting is a measurement of the quality of the foam of the extruded material. The extruded material, for example a parison, is cut in cross sections and viewed with microscopy. The number of cells are counted in a given unit volume, for example cubic inches.

percentage of DOW™ LDPE 692 LDPE HEALTH+™ as shown in Tables 54-56 to form a core masterbatch that was about 98.9% of the overall formulation, about 0.1% HYDROCEROL® CF 40E as a chemical blowing agent and nucleating agent, and about 1% Heritage Plastics HT4HP talc as another nucleating agent. The N$_2$ was introduced at about 0.032 kg/h. The extruder head temperature was about 190° C., and the core layer extruder barrel temperature was about 180° C. The inner and outer layer extruder barrel temperatures were both 190° C. The resulting expanded core-layer formulation 48 was extruded through a die head to establish a core-layer parison. The core layer extruder was operated at 13 RPM. Inner and outer layers were extruded through the die head, locating the expanded formulation therebetween, to form a multi-layer tube. The inner layer extruder was operated at 20 rpm and the outer layer extruded was operated at 34 rpm such that the inner layer provided about 15% of the thickness of the entire tube, the outer layer provided about 15% of the thickness of the entire tube, and the core layer provided about 70% of the thickness of the entire tube. The multi-layer tube was blow molded to form a container, as shown for example in FIG. 12, to provide a multi-layer bottle wherein the inner layer is about 30%, the outer layer is about 30% and the core layer is about 40% of the total bottle thickness. The Top Load performance was measured according to the Top Load Method described in Example 7, and the results are shown in Table 55. The parison was analyzed using the Cell Count of Parison Method described in Example 48, and the results are shown in Table 54. Table 56 shows the bottle densities.

TABLE 54

Performance measurements of parisons comprising LDPE in the core layer

| Percentage LDPE | Parison Density (g/cm$^3$) | Cell count of parison in diagonal (per in$^3$) |
|---|---|---|
| 0 | 0.526 | 1,081,339 |
| 10 | 0.531 | 1,712,299 |
| 20 | 0.522 | 1,761,616 |
| 30 | 0.517 | 2,033,991 |
| 40 | 0.517 | 2,542,148 |
| 50 | 0.514 | 2,942,949 |
| 60 | 0.514 | 2,842,743 |
| 70 | 0.507 | 3,276,861 |
| 80 | 0.506 | 3,121,752 |
| 90 | 0.512 | 3,174,007 |
| 100 | 0.491 | 2,877,073 |

TABLE 55

Performance Measurements of Bottles formed in Example 49

| Percentage LDPE | Individual Top Load Capacity [lbs-F] | | | | | | | | | | Average Top Load Capacity [lbs-F] |
|---|---|---|---|---|---|---|---|---|---|---|---|
| 0 | 93.6 | 91.3 | 91.6 | 91.5 | 90.7 | 93.4 | 93.0 | 89.9 | 89.1 | 90.2 | 91.4 |
| 10 | 93.8 | 96.5 | 93.9 | 91.6 | 92.7 | 93.0 | 92.4 | 89.1 | 88.9 | 90.3 | 92.2 |
| 20 | 95.8 | 94.9 | 93.6 | 95.1 | 94.4 | 94.3 | 93.6 | 94.9 | 92.4 | 91.3 | 94.0 |
| 30 | 92.8 | 90.5 | 86.8 | 84.1 | 81.4 | 85.2 | 89.0 | 88.7 | 91.4 | 89.3 | 87.9 |
| 40 | 91.9 | 90.4 | 84.2 | 90.4 | 87.8 | 83.3 | 83.2 | 92.4 | 91.4 | 88.7 | 88.4 |
| 50 | 84.5 | 85.8 | 80.1 | 83.2 | 79.3 | 82.9 | 94.6 | 96.7 | 93.8 | 91.8 | 87.3 |
| 60 | 86.2 | 81.2 | 89.9 | 87.3 | 89.0 | 85.6 | 85.4 | 88.6 | 87.2 | 87.4 | 86.8 |
| 70 | 80.7 | 89.9 | 90.6 | 89.3 | 88.6 | 88.0 | 91.8 | 84.7 | 85.4 | NA | 87.7 |
| 80 | 83.7 | 84.3 | 79.4 | 79.6 | 79.7 | 82.1 | 81.1 | 84.2 | 87.2 | 85.3 | 82.7 |
| 90 | 80.9 | 80.9 | 80.9 | 78.5 | 82.5 | 77.5 | 82.2 | 82.0 | 82.4 | 81.7 | 81.0 |
| 100 | 90.6 | 84.8 | 83.1 | 92.9 | 89.1 | 86.3 | 89.6 | 95.1 | 92.2 | 89.7 | 89.3 |

TABLE 56

Bottle for bottles formed during Example 49

| Percentage LDPE | Bottle Density (g/cm$^3$) |
|---|---|
| 0 | 0.710 |
| 10 | 0.726 |
| 20 | 0.714 |
| 30 | 0.711 |
| 40 | 0.720 |
| 50 | 0.711 |
| 60 | 0.714 |
| 70 | 0.705 |
| 80 | 0.708 |
| 90 | 0.682 |
| 100 | 0.657 |

Example 50

Formulations and Test Results for Tubes with an Impact Modifier

Outer-layer formulation 32 comprised about 92.5% Dow DMDA 6400 NT7, 2.5% Vistamaxx™ available from the ExxonMobil™ Corporation, and about 5% Ampacet 11078 as a white colorant or about 95% Dow DMDA 6400 NT7 and 5% Ampacet 11078. Inner-layer formulation 28 comprised about 97.5% Marlex® HHM 5502BN HDPE (available from Chevron Phillips Chemical Company) and 2.5% Vistamaxx™ available from the ExxonMobil™ Corporation, or 100% Marlex HHM 5502BN HDPE.

Core-layer formulation 36 comprised about 98.9% DOW DMDA 6400 NT7, about 0.1% HYDROCEROL® CF 40E as a chemical blowing agent and nucleating agent, and about 1% Heritage Plastics HT4HP talc as another nucleating agent, or core-layer formulation comprised about 94.9%% DOW DMDA 6400 NT7, about 0.1% HYDROCEROL® CF 40E as a chemical blowing agent and nucleating agent, and about 1% Heritage Plastics HT4HP talc as another nucleating agent. The $N_2$ was introduced at about 0.032 kg/h. The extruder head temperature was about 190° C., and the core layer extruder barrel temperature was about 180° C. The inner and outer layer extruder barrel temperatures were both 190° C. The resulting expanded core-layer formulation 48 was extruded through a die head to establish a core-layer parison. The core layer extruder was operated at 13 RPM. Inner and outer layers were extruded through the die head, locating the expanded formulation therebetween, to form a multi-layer tube. The inner layer extruder was operated at 20 rpm and the outer layer extruded was operated at 34 rpm such that the inner layer provided about 15% of the thickness of the entire tube, the outer layer provided about 15% of the thickness of the entire tube, and the core layer provided about 70% of the thickness of the entire tube.

The multi-layer tube was blow molded to form a container, as shown for example in FIG. 12, to provide a multi-layer bottle wherein the inner layer is about 30%, the outer layer is about 30% and the core layer is about 40% of the total bottle thickness. The Top Load performance was measured according to the Top Load Method described in Example 7, and the results are shown in Table 57. The parison was analyzed using the Cell Count of Parison Method described in Example 48, and the results are shown in Table 57. Table 57 shows the parison densities, the cell count of the parison in the diagonal, the bottle density, and the top load measurement.

TABLE 57

Top load and density parameters for bottles containing Vistamaxx ™ as an impact modifier.

| Vistamaxx ™ Location | Individual Bottle Top Load Capacity [lbs-F] | | | | | | Average Top Load Capacity [lbs-F] | Parison Density (g/cm$^3$) | Cell count of parison in diagonal (per in$^3$) | Bottle Density (g/cm$^3$) |
|---|---|---|---|---|---|---|---|---|---|---|
| Core | 92.9 | 90.1 | 88.5 | 89.5 | 92.9 | 85.2 | 89.9 | 0.527 | 1.26E+06 | 0.728 |
| Skin | 80.9 | 81.9 | 80.3 | 80.0 | 78.0 | 78.8 | 80.0 | 0.541 | 1.29E+06 | NA |

The invention claimed is:

1. A method of producing a multi-layer tube, the method comprising
   extruding an inner-layer formulation to form an inner parison,
   extruding a core-layer formulation comprising a high density polyethylene (HDPE) resin to form a core parison,
   extruding an outer-layer formulation to form an outer parison,
   aligning the inner parison, the core parison, and the outer parison to cause the core parison to be located between the inner parison and the outer parison to cause the core parison to surround the inner parison and to be surrounded by the outer parison to form an extruded multi-layer tube,
   wherein the core parison has a thickness that is about 45% to about 85% of a total thickness of the multi-layer tube and
   wherein the core-layer formulation further comprises a low density polyethylene (LDPE) base resin up to about 50% by weight of the core-layer formulation.

2. The method of claim 1, wherein the HDPE resin is about 60% to about 99% by weight of the core-layer formulation.

3. The method of claim 1, wherein the core parison is about 50% to about 85% of the total thickness of the multi-layer tube.

4. The method of claim 3, wherein the multi-layer tube has a cell count in the diagonal of about 0.9×10$^6$ to about 3.5×10$^6$ cells per cubic inch.

5. The method of claim 4, wherein the core parison has a density of about 0.2 g/cm$^3$ to about 0.5 g/cm$^3$.

6. The method of claim 4, wherein the inner-layer formulation and the outer-layer formulation each comprise a different HDPE resin.

7. The method of claim 6, wherein the core-layer formulation comprises a physical blowing agent.

8. The method of claim 1, wherein the inner parison has a first thickness and the outer parison has a second thickness.

9. The method of claim 8, wherein the first thickness of the inner parison is about the same as the second thickness of the outer parison.

10. The method of claim 8, wherein the thickness of the core parison is greater than the thickness of the outer parison.

11. The method of claim 8, wherein the first thickness of the inner parison and the second thickness of the outer parison are different.

12. The method of claim 11, wherein the core-layer formulation comprises a chemical blowing agent.

13. The method of claim 1, wherein the step of extruding a core-layer formulation includes introducing a physical blowing agent to the core-layer formulation.

14. The method of claim 13, wherein the multi-layer tube has a cell count in the diagonal of about 1.2×10$^6$ to about 3.5×10$^6$ cells per cubic inch.

15. The method of claim 14, wherein the outer-layer formulation further comprises a fiber.

16. The method of claim 15, wherein the outer-layer formulation further comprises an impact modifier.

17. A method of producing a multi-layer tube, the method comprising
   extruding an inner-layer formulation to form an inner parison,
   extruding a core-layer formulation comprising an HDPE resin to form a core parison,
   extruding an outer-layer formulation to form an outer parison,
   aligning the inner parison, the core parison, and the outer parison to cause the core parison to be located between the inner parison and the outer parison to cause the core parison to surround the inner parison and to be surrounded by the outer parison to form an extruded multi-layer tube,
   wherein the core parison has a density that is less than a density of each of the inner parison and the outer parison and
   wherein the core parison has a density of about 0.2 g/cm$^3$ to about 0.5 g/cm$^3$.

18. The method of claim 17, wherein the multi-layer tube has a cell count in the diagonal of about 0.9×10$^6$ to about 3.5×10$^6$ cells per cubic inch.

19. The method of claim 18, wherein the core parison has a density of about 0.25 g/cm$^3$ to about 0.4 g/cm$^3$.

20. The method of claim 19, wherein the core-layer formulation further comprises LDPE.

21. The method of claim 20, wherein the step of extruding a core-layer formulation includes introducing a physical blowing agent to the core-layer formulation.

22. The method of claim 19, wherein the outer-layer formulation further comprises an impact modifier.

23. The method of claim 22, wherein the inner-layer formulation and the outer-layer formulation each comprise a different HDPE resin.

24. The method of claim 18, wherein the multi-layer tube has a cell count in the diagonal of about 1×10$^6$ to about 3×10$^6$ cells per cubic inch.

25. The method of claim 24, wherein the multi-layer tube has a cell count in the diagonal of about 1.2×10$^6$ to about 2.2×10$^6$ cells per cubic inch.

26. The method of claim 17, wherein the multi-layer tube has a density of about 0.6 g/cm$^3$ to about 0.8 g/cm$^3$.

27. The method of claim 26, wherein the multi-layer tube has a density of about 0.65 g/cm$^3$ to about 0.75 g/cm$^3$.

* * * * *